United States Patent
Nishida et al.

(10) Patent No.: US 6,493,624 B2
(45) Date of Patent: Dec. 10, 2002

(54) DRIVING FORCE CONTROL SYSTEM FOR FOUR-WHEEL DRIVE VEHICLES

(75) Inventors: Kenzo Nishida, Saitama-ken (JP); Norihisa Nihanda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,904

(22) Filed: Mar. 30, 2001

(65) Prior Publication Data

US 2001/0029423 A1 Oct. 11, 2001

(30) Foreign Application Priority Data

Apr. 6, 2000 (JP) .......................... 2000-105466

(51) Int. Cl.⁷ .............................. B60T 7/12; G06F 7/00
(52) U.S. Cl. .......................... 701/89; 180/233; 477/166
(58) Field of Search ........................... 701/89; 180/233, 180/247, 249; 477/63, 166, 169, 34

(56) References Cited

U.S. PATENT DOCUMENTS

| | | | |
|---|---|---|---|
| 4,921,065 A | | 5/1990 | Hamada et al. .............. 180/245 |
| 5,480,363 A | * | 1/1996 | Matsubara et al. ............ 477/63 |
| 5,484,354 A | * | 1/1996 | Vukovich et al. ............. 192/3.3 |
| 5,531,302 A | * | 7/1996 | Koenig et al. ................ 192/3.3 |
| 5,535,863 A | * | 7/1996 | Vukovich et al. ............. 192/3.3 |
| 5,697,479 A | * | 12/1997 | Kono et al. ................. 192/3.31 |
| 5,754,970 A | * | 5/1998 | Takasaki et al. ............. 180/233 |
| 5,803,197 A | * | 9/1998 | Hara et al. .................. 180/248 |
| 5,894,904 A | | 4/1999 | Yakou et al. ................ 180/247 |
| 5,947,865 A | * | 9/1999 | Watanabe et al. ............ 477/169 |
| 6,056,666 A | * | 5/2000 | Williams ..................... 180/247 |
| 6,102,831 A | * | 8/2000 | Wakahara et al. ........... 477/169 |

FOREIGN PATENT DOCUMENTS

| | | |
|---|---|---|
| DE | 34 27 725 A1 | 8/1985 |
| DE | 44 08 747 A1 | 9/1994 |
| DE | 198 00 327 A1 | 7/1998 |
| EP | 1142745 A1 * | 10/2001 ........... B60K/23/08 |

\* cited by examiner

*Primary Examiner*—William A. Cuchlinski, Jr.
*Assistant Examiner*—Olga Hernandez
(74) *Attorney, Agent, or Firm*—Armstrong, Westerman & Hattori, LLP

(57) ABSTRACT

A driving force control system for a four-wheel drive vehicle. An automatic-mode transmitted torque is calculated based on operating conditions of the vehicle. When lock mode-executing conditions including operation of a lock switch by the driver are satisfied, a lock mode in which the engagement forces of the clutches are set to a lock-mode transmitted torque, including a lockable transmitted torque which can lock the front wheels and the rear wheels to each other. Further, the lock mode transmitted torque is limited depending on a traveling condition of the vehicle such that the lock-mode transmitted torque is held below the lockable transmitted torque. When the automatic-mode transmitted torque is larger than the limited lock-mode transmitted torque during the lock-mode, the engagement forces of the clutches are set to the automatic-mode transmitted torques.

4 Claims, 33 Drawing Sheets

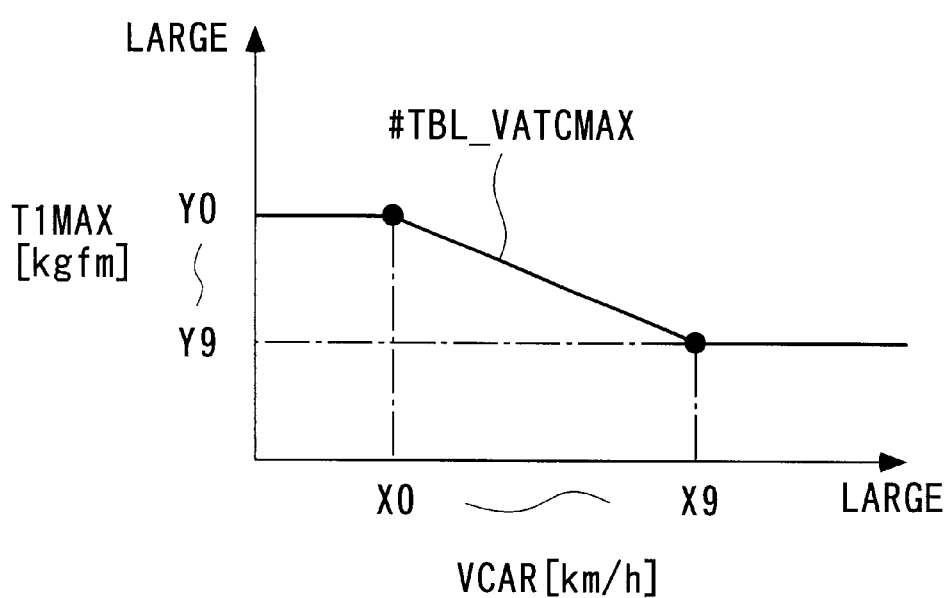
F I G. 1 7

F I G. 2 9
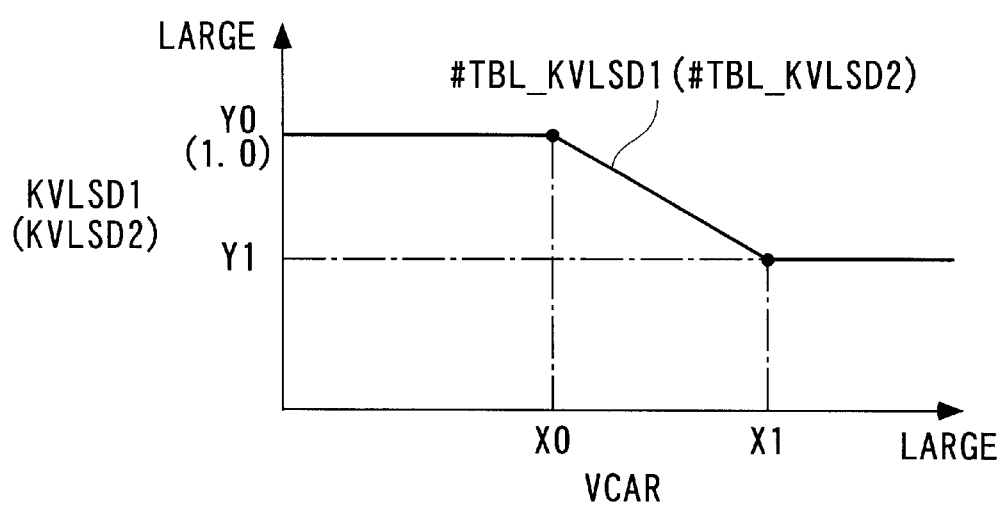

DRIVING FORCE CONTROL SYSTEM FOR FOUR-WHEEL DRIVE VEHICLES

BACKGROUND OF THE INVENTION

1. Field of the Invention

This invention relates to a driving force control system for a four-wheel drive vehicle including a pair of front wheels, and a pair of rear wheels, one of the pairs being main drive wheels, and another of the pairs being auxiliary drive wheels, the driving force control system controlling engagement forces of clutches to thereby control driving forces distributed to the auxiliary drive wheels.

2. Description of the Prior Art

This kind of driving force control system has been proposed by the present assignee, e.g. in Japanese Patent Publication (Kokai) No. 10-194005. The four-wheel drive vehicle (hereinafter simply referred to as "the vehicle") is provided with left and right electromagnetic clutches for connecting and disconnecting a propeller shaft to and from left and right rear wheels. The vehicle uses front wheels as main drive wheels and the rear wheels as auxiliary drive wheels. Further, the vehicle is provided with a lock switch. The driving force control system controls engagement forces of the respective left and right electromagnetic clutches to thereby control torques to be distributed to the rear wheels, i.e. the auxiliary drive wheels. More specifically, this system operates in an automatic mode for controlling the engagement forces of the left and right electromagnetic clutches in response to signals from various sensors, and in a lock mode for controlling the engagement forces of the clutches to a maximum engagement force which can lock the front wheels and the rear wheels to each other. The lock mode is executed e.g. when the driver operates a lock switch for the purpose of extricating the vehicle from a stuck condition on a snowy road. In the lock mode, the maximum amounts of control currents are supplied to the respective left and right electromagnetic clutches so as to control the engagement forces thereof to the maximum.

However, according to the above conventional driving force control system, after the vehicle gets unstuck from a stuck condition, the vehicle can sometimes enter a traffic-congested traveling condition in which the running of the vehicle is controlled by engine brake or foot brake, with the accelerator pedal being scarcely stepped on by the user, with its lock switch being kept ON. In such a case, since the lock mode continues to be executed, the maximum amounts of control currents continue to be supplied to the respective left and right electromagnetic clutches in spite of the fact that it is almost unnecessary to distribute the driving force delivered to the front wheels to the rear wheels, which results in waste of electric power. Further, since the engagement forces of the respective electromagnetic clutches are each controlled to the maximum engagement force, the fuel economy of the engine is degraded.

SUMMARY OF THE INVENTION

It is an object of the invention to provide a driving force control system for a four-wheel drive vehicle, which is capable of properly controlling the engagement forces of clutches such that the engagement forces are neither excessive nor short, in dependence on operating conditions of the vehicle while complying the driver's intention as much as possible, thereby making it possible to reduce the sizes of the clutches and the driving system and at the same time improve the fuel economy.

To attain the above object, the present invention provides a driving force control system for a four-wheel drive vehicle including a pair of front wheels, and a pair of rear wheels, one of the pairs being main drive wheels, and another of the pairs being auxiliary drive wheels, the driving force control system controlling engagement forces of clutches to thereby control driving forces distributed to the auxiliary drive wheels.

The driving force control system according to the invention is characterized by comprising:

automatic-mode engagement force-calculating means for calculating automatic-mode engagement forces of the clutches based on operating conditions of the vehicle;

input means for being operated by a driver;

lock mode execution means for executing a lock mode in which the engagement forces of the clutches are set to a lock-mode engagement force, including a lockable engagement force which can lock the main drive wheels and the auxiliary drive wheels to each other, when lock mode-executing conditions including operation of the input means by the driver are satisfied;

lock-mode engagement force-limiting means for limiting the lock-mode engagement force such that the lock-mode engagement force is held below the lockable engagement force in dependence on a traveling condition of the vehicle; and clutch engagement force-selecting means for selecting the calculated automatic-mode engagement forces as the engagement forces of the clutches, when the calculated automatic-mode engagement forces are larger than the limited lock-mode engagement force, during execution of the lock mode.

According to this driving force control system, the automatic-mode engagement forces are calculated based on the operating conditions of the four-wheel drive vehicle. Further, when the lock mode-executing conditions including operation of the input means by the driver are satisfied, a lock mode is executed in which the engagement forces of the clutches are set to a lock-mode engagement force, including a lockable engagement force which can lock the main drive wheels and the auxiliary drive wheels to each other. As a result, during the lock mode, it is possible to lock the main drive wheels and the auxiliary drive wheels to each other, in a manner complying with the driver's intention as much as possible. Further, the lock-mode engagement force is limited depending on a traveling condition of the vehicle, such that it is held below the lockable engagement force. As a result, when there is little necessity to distribute the driving forces to the auxiliary drive wheels, e.g. when the vehicle is in a traffic-congested traveling condition in which the running of the vehicle is controlled by engine brake or foot brake, with the accelerator pedal being scarcely stepped on, it is possible to limit the engagement forces of the clutches in the lock mode to a smaller value than the maximum engagement force according to the degree of necessity of distribution of the driving forces to the auxiliary drive wheels, thereby minimizing time during which the engagement forces of the clutches are controlled to the maximum. This not only makes it possible to save energy for driving the clutches, but also to reduce the sizes of clutches and the driving system and improve the fuel economy of the engine. Moreover, when the calculated automatic-mode engagement forces are larger than the limited lock-mode engagement force, the engagement forces of the clutches are set to the automatic-mode engagement force. As a result, it is possible to comply with the driver's intention as much as possible and at the same time distribute the driving force actually required by the four-wheel drive vehicle to the auxiliary drive wheels, such that the engagement forces of the clutches are controlled to be neither excessive nor short during execution of the lock mode.

Preferably, the driving force control system includes means for detecting a vehicle speed of the vehicle, and the lock-mode engagement force-limiting means limits the lock-mode engagement force such that the lock-mode engagement force become smaller as the vehicle speed of the vehicle is higher.

According to this preferred embodiment, the lock-mode engagement force is limited to a smaller value as the vehicle speed is higher, i.e. as the main drive wheels are less prone to slip. In other words, as the main drive wheels are less prone to slip, there is less necessity of distributing the driving forces to the auxiliary drive wheels, and therefore, the lock-mode engagement force is limited to a smaller value. Thus, the clutches can be operated efficiently according to the driving forces required for driving the auxiliary drive wheels in the lock mode.

Preferably, the driving force control system further comprises driving force-calculating means for calculating a driving force of the main drive wheels, and the lock-mode engagement force-limiting means limits the lock-mode engagement force such that the lock-mode engagement force becomes smaller as the calculated driving force of the main drive wheels is smaller.

According to this preferred embodiment, the lock-mode engagement force is limited such that the lock-mode engagement force becomes smaller as the driving force of the main drive wheels is smaller, i.e. as the driving force required for driving the auxiliary drive wheels is smaller. Thus, the clutches can be operated efficiently according to the driving forces required for driving the auxiliary drive wheels in the lock mode.

The above and other objects, features, and advantages of the invention will become more apparent from the following detailed description taken in conjunction with the accompanying drawings.

BRIEF DESCRIPTION OF THE DRAWINGS

FIG. 17 is a diagram showing an example of a VCAR-T1MAX table;

FIG. 29 is a diagram showing an example of a VCAR-KVLSD1 table;

DETAILED DESCRIPTION OF THE PREFERRED EMBODIMENT

The invention will now be described in detail with reference to the drawings showing an embodiment thereof.

Figure 1:
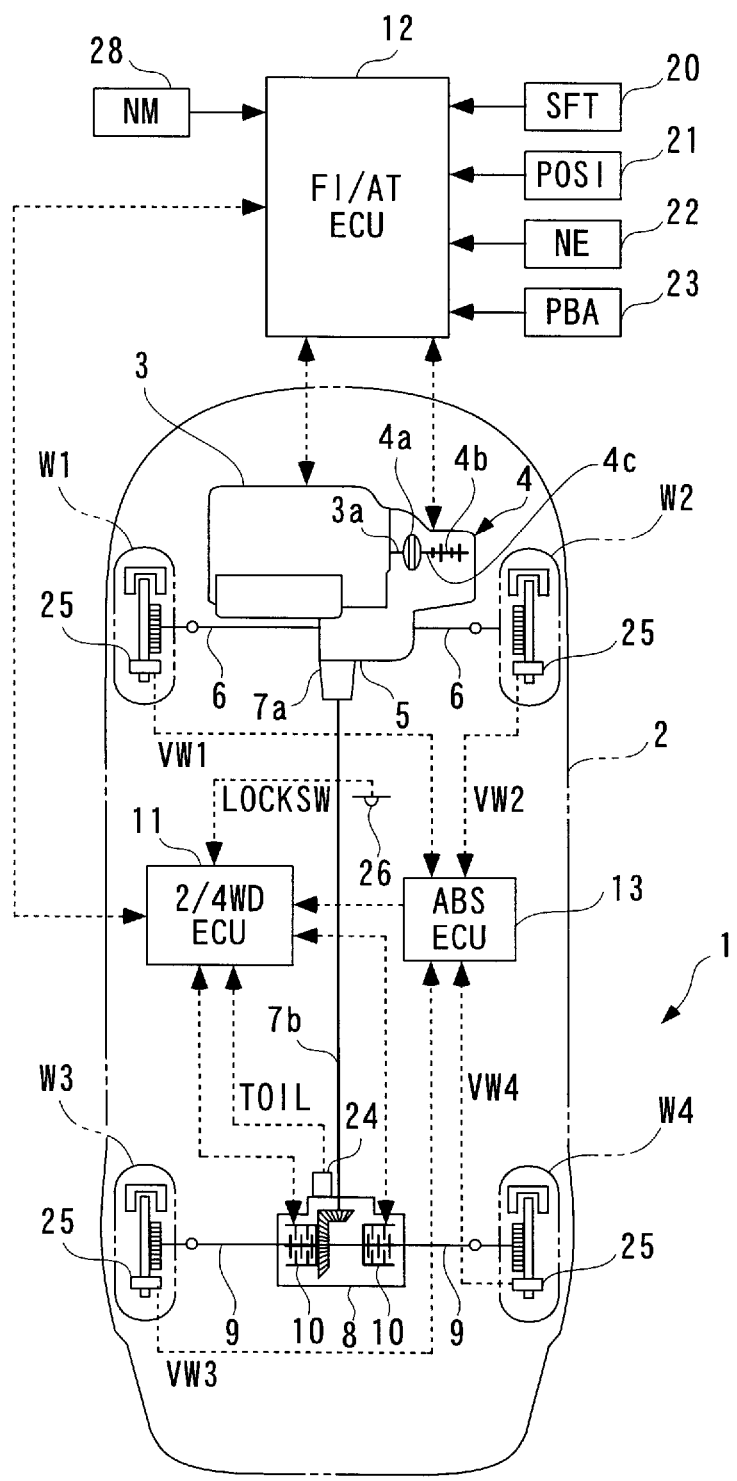
FIG. 1 is a view schematically showing the whole arrangement of a four-wheel drive vehicle incorporating a driving force control system according to an embodiment of the invention.

FIG. 1 schematically shows the whole arrangement of a four-wheel drive vehicle 2 incorporating a driving force control system 1 according to an embodiment of the invention. As shown in the figure, the four-wheel drive vehicle 2 (hereinafter simply referred to as "the vehicle 2") includes an engine 3 transversely mounted in a front portion thereof and an automatic transmission 4 integrally arranged with the engine 3.

The automatic transmission 4 is comprised of a torque converter 4a connected to an output shaft 3a of the engine 3, a shift lever, not shown, which is capable of selecting any one of the eight shift positions of "1, 2, 3, D4, D5, N, R, and P", and a gear mechanism 4b, partly shown, which can be shifted to any of six gear positions having respective change gear ratios, i.e. first to fifth speed positions and a reverse gear position. In the automatic transmission, when the shift position is set to "1" to "D5", and "R", the gear position of the automatic transmission 4 is switched to the first speed position, a range of the first and second speed positions, a range of the first to third speed positions, a range of the first to fourth speed positions, a range of the first to fifth speed positions, and the reverse gear position, respectively.

The automatic transmission 4 has a gear position sensor 20 and a shift position sensor 21 mounted therein. The gear position sensor 20 detects a gear position, and delivers a signal SFT indicative of the detected gear position to an FI/AT•ECU 12, referred to hereinafter. More specifically, the gear position signal SFT assumes any one of values (hereinafter referred to as "SFT values") of "1" to "5", and "6", for the first to fifth speed positions and the reverse gear position, respectively.

On the other hand, the shift position sensor 21 senses a selected shift position and delivers a shift position signal POSI indicative of the sensed shift position to the FI/AT•ECU 12. More specifically, the shift position signal POSI assumes a value of "1" for the shift position of "N" or "P", a value of "2" for the shift position of "R", and values of 3 to 7 for the respective shift positions of "1" to "D5" (hereinafter, the value of the shift position signal POSI will be referred to as "the POSI value"). Further, when the automatic transmission 4 is in "no-position" (state in which the shift position of the automatic transmission 4 cannot be identified since the shift lever is located between shift positions), the POSI value is "0".

The above FI/AT•ECU 12 is formed or implemented by a microcomputer including a RAM, a ROM, a CPU, and an I/O interface, none of which are shown, and controls the operation of the engine 3 and that of the automatic transmission 4. Connected to this FI/AT•ECU 12 are an engine rotational speed sensor 22 and an intake pipe absolute pressure sensor 23. The respective sensors 22, 23 sense an engine rotational speed NE and an intake pipe absolute pressure PBA, and deliver signals indicative of the sensed engine rotational speed NE (parameter indicative of an operating condition of the vehicle) and intake pipe absolute pressure PBA (parameter indicative of an operating condition of the vehicle) to the FI/AT•ECU 12.

The engine 3 has the output shaft 3a thereof connected to left and right front wheels W1, W2 as main drive wheels via the automatic transmission 4, a front differential 5 and front drive shafts 6, 6. Further, the output shaft 3a is connected to left and right rear wheels W3, W4 as auxiliary drive wheels via the automatic transmission 4, the front differential 5, a transfer 7a, a propeller shaft 7b, a rear differential 8, and left and right rear drive shafts 9, 9.

Further, connected to the FI/AT ECU 12 is a main shaft rotational speed sensor 28 for detecting a rotational speed NM of a main shaft 4c of the automatic transmission 4. The FI/AT ECU 12 uses the engine rotational speed NE and the main shaft rotational speed NM, respectively, as an input rotational speed of a torque converter 4a and an output rotational speed of the same to calculate an output/input rotational speed ratio ETR (ETR=NM/NE) of the torque converter 4a.

The rear differential 8 includes left and right electromagnetic clutches (clutches) 10, 10. Each of the electromagnetic clutches 10, 10 connects and disconnects the propeller shaft 7b to and from a corresponding one of the rear drive shafts 9 associated therewith. When the electromagnetic clutches 10, 10 disconnect the propeller shaft 7b from the rear drive shafts 9, all the drive torque from the engine 3 is transmitted to the front wheels W1, W2, whereby the vehicle is set to a front-wheel drive mode. On the other hand, when the electromagnetic clutches 10, 10 connect the propeller shaft 7b to the rear drive shafts 9, 9, the drive torque of the engine 3 is also transmitted or distributed to the rear wheels W3, W4, whereby the vehicle is set to a four-wheel drive mode. Further, the electromagnetic clutches 10, 10 are configured such that the engagement force of each of them is continuously changed in response to a drive signal (current pulse) from a 2/4WD•ECU 11, referred to hereinafter, whereby drive torques transmitted to the left and right rear wheels W3, W4 are controlled independently of each other.

The rear differential 8 is provided with an oil temperature sensor 24 which senses a temperature (oil temperature) TOIL of lubricating oil lubricating the electromagnetic clutches 10, 10, and delivers a signal indicative of the sensed oil temperature TOIL to the 2/4WD•ECU 11.

Further, a wheel speed sensor 25 is mounted to each of the front and rear wheels W1 to W4. The four wheel speed sensors 25 sense wheel speeds VW1 to VW4 of the wheels W1 to W4, respectively, and deliver signals indicative of the sensed wheel speeds VW1 to VW4 to an ABS•ECU 13. The ABS•ECU 13 is formed by a microcomputer, similarly to the FI/AT•ECU 12 described above, and carries out anti-lock control of the front and rear wheels W1 to W4.

On a dashboard, not shown, there is provided a lock switch 26 as input means. The lock switch 26 is operated by the driver when he wants to lock the rear differential 8 so that a large drive torque can be transmitted to the rear wheels W3, W4 e.g. for extrication of the vehicle from a stuck condition on a snowy road. The lock switch 26 is formed by a momentary switch and continues delivering a lock switch signal LOCKSW to the 2/4WD•ECU 11 so long as it is being depressed. Further, during a lock mode, a lock lamp, not shown, arranged on the dashboard is lit.

The driving force control system 1 includes the 2/4WD•ECU (automatic-mode engagement force-calculating means, lock mode execution means, lock-mode engagement force-limiting means, clutch engagement force-selecting means, driving force- calculating means)11. The 2/4WD•ECU 11 is formed by a microcomputer, similarly to the FI/AT•ECU 12 and the ABS•ECU 13, and connected to the ECU's 12, 13. The signals from the sensors 20 to 25 and the lock switch signal LOCKSW are input to the 2/4WD•ECU 11 by serial communication between the 2/4WD•ECU 11 and the ECU's 12, 13. In response to these signals, the 2/4WD•ECU 11 executes a driving force control process for controlling the driving forces (torques) distributed to the rear wheels W3, W4, as described in the following, based on control programs read from the ROM, by using flag values and calculation values, referred to hereinafter, read from the RAM.

Figure 2:
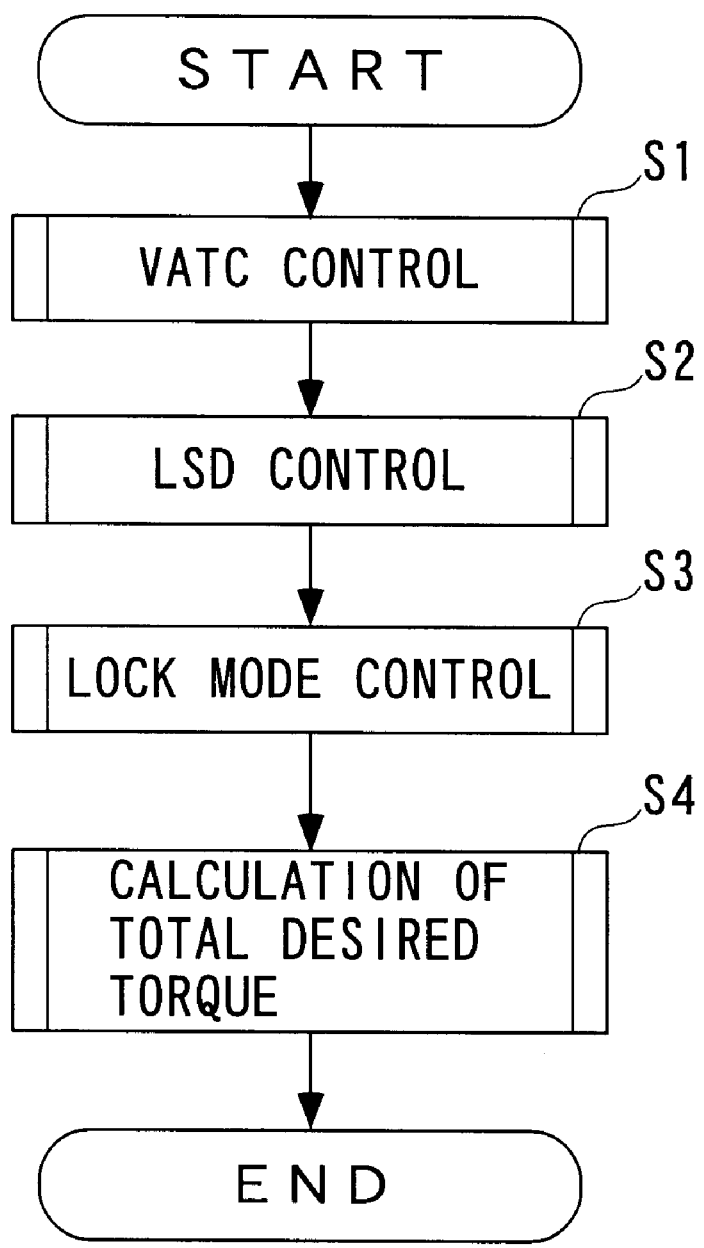
FIG. 2 is a flowchart showing a main routine for carrying out a driving force control process.

In the following, the driving force control process executed by the 2/4WD•ECU 11 will be described. FIG. 2 shows a main routine for carrying out the driving force control process. As shown in the figure, in the present process, an automatic mode control process including a VATC control process and an LSD control process is executed, and when lock mode-executing conditions are satisfied, a lock mode control process is executed.

First, a VATC control process is carried out at a step S1. In this process, as described in detail hereinafter, by executing a dive torque-calculating process, a front-rear distribution torque control process, and a control amount-limiting process, a final desired VATC torque value TOBJM of a VATC torque to be distributed to each of the left and right rear wheels W3, W4 is calculated based on an accelerating condition of the vehicle 2, etc.

At the following step S2, as described in detail hereinafter, the LSD control process included in the automatic mode control process is carried out to calculate an LSD torque TLSD.

At the following step S3, as described in detail hereinafter, when the lock mode-executing conditions including the depression of the lock switch 26 are satisfied, the lock mode control process is executed to calculate a lock-mode transmitted torque LOCKD (lock-mode engagement force).

Then, at the following step S4, a total desired torque-calculating process, described in detail hereinafter, is executed, followed by terminating the program. In the total desired torque-calculating process, left and right final desired transmitted torques MDTL, MDTR to be distributed to the respective left and right rear wheels W3, W4 are calculated based on the final desired VATC torque value TOBJM and the LSD torque calculated in the automatic mode, or the lock-mode transmitted torque LOCKD calculated in the lock mode. Then, drive currents corresponding to the respective left and right final desired transmitted torques MDTL, MDTR are supplied to the respective electromagnetic clutches 10, 10, whereby the engagement forces of the electromagnetic clutches 10, 10 are controlled for control of torques to be distributed to the respective rear wheels W3, W4.

Next, the aforementioned VATC control process executed at the step S1 will be described in more detail. It should be noted that in the following description, a mark # is added to each of heads of fixed values that are stored beforehand in the ROM as data items and table values, so as to show the fixed values in a state distinguishable from other variables that are stored in the RAM and updated.

Figure 3:
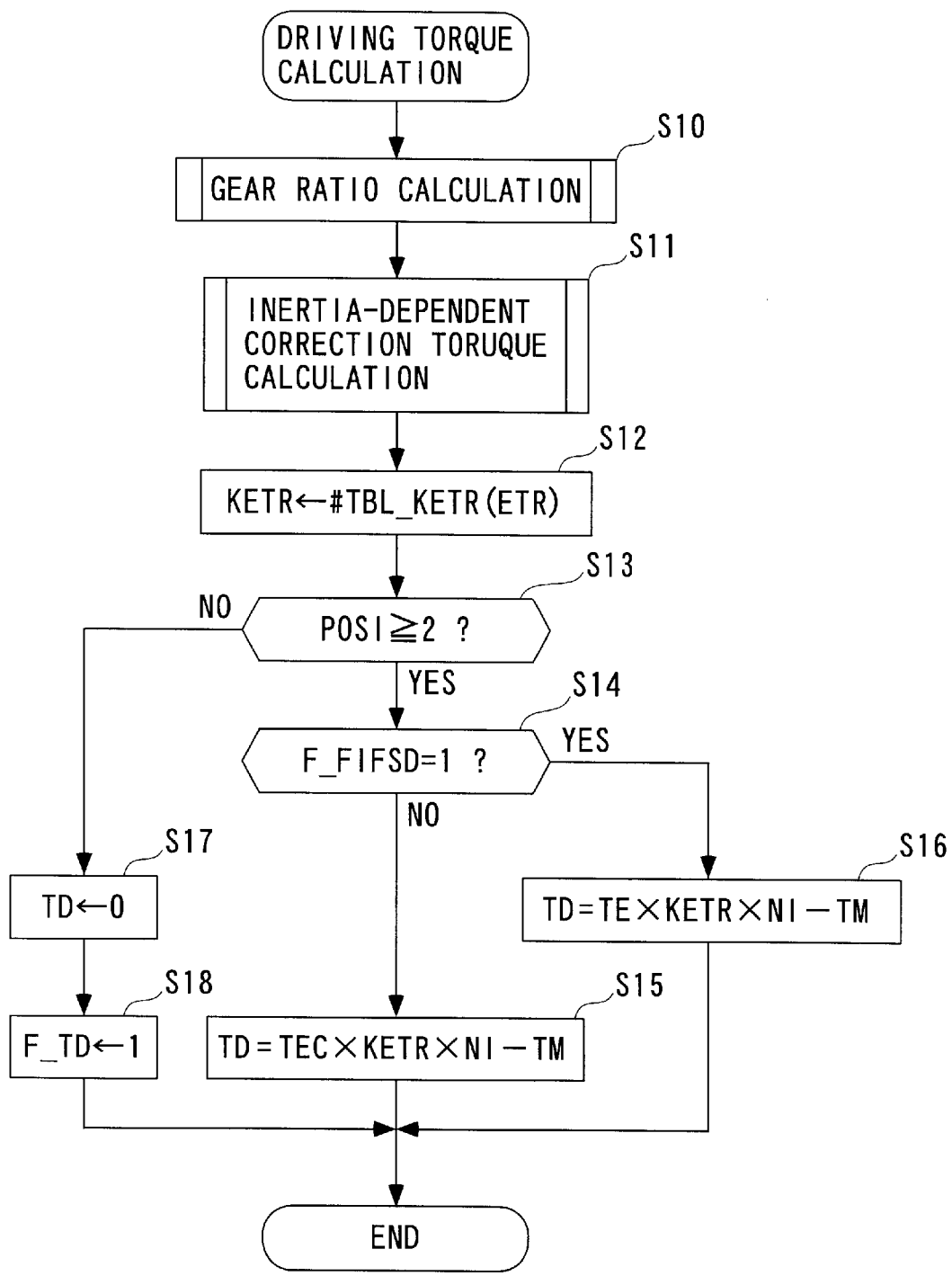
FIG. 3 is a flowchart showing a main routine for carrying out a drive torque-calculating process included in a VATC control process.

First, description will be made of the drive torque-calculating process included in the VATC control process. The drive torque-calculating process is executed to calculate a drive torque (demanded torque) TD output from the output shaft of the automatic transmission 4, based on an engine torque TEC output from the engine 3. FIG. 3 shows a main routine for the drive torque calculation, which is executed by an interrupt handling routine at predetermined time intervals according to the settings of a program timer.

As shown in FIG. 3, in the drive torque-calculating process, first, a gear ratio N1 is calculated by a gear ratio-calculating process at a step S10, which will be described in detail hereinafter.

Then, the program proceeds to a step S11, wherein an inertia-dependent correction torque TM is calculated by an inertia-dependent correction torque-calculating process, which will also be described in detail hereinafter. The inertia-dependent correction torque TM is of a correction amount for causing gear position dependency of torque required for rotating of the wheels W1 to W4 in acceleration of the vehicle 2 to reflect on the calculation of the drive torque TD, since the required torque varies with the gear position of the vehicle 2.

Figure 4:
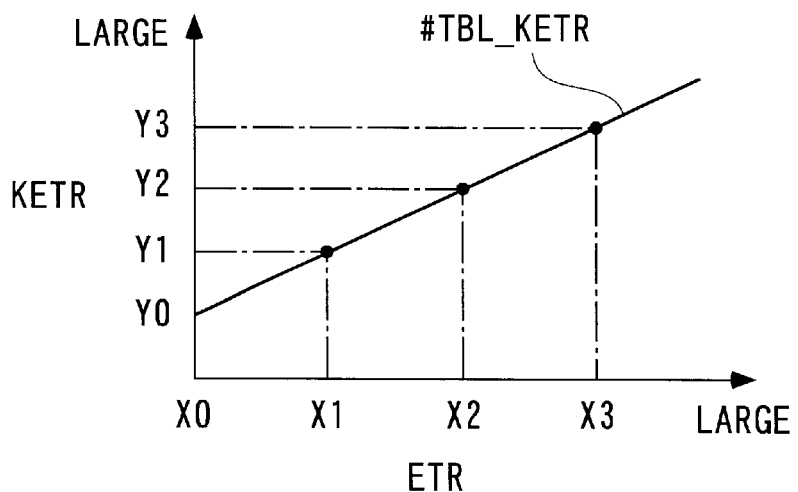
FIG. 4 is a diagram showing an example of an ETR-KETR table.

Then, the program proceeds to a step S12, wherein a table value #TBL__KETR is retrieved from an ETR-KETR table an example of which is shown in FIG. 4 according the output/input rotational speed ratio ETR of the torque converter 4a, and set to a toque converter-dependent amplification factor KETR.

As shown in FIG. 4, the table value #TBL__KETR is linear or proportional to the output/input rotational speed ratio ETR, that is, the ETR-KETR table is configured such that the table value #TBL__KETR becomes larger as the output/input rotational speed ratio ETR is larger. It should be noted that a straight line in FIG. 4 indicates the table value #TBL__KETR and that a symbol "#TBL__KETR (ETR)" at the step S12 in FIG. 3 indicates that the table value #TBL__KETR is determined according to the output/input rotational speed ratio ETR. Similar symbols in the following flowcharts should be interpreted similarly.

Then, the program proceeds to a step S13, wherein it is determined whether or not the POSI value is equal to or larger than 2. If the answer to the question is affirmative (YES), i.e. if the shift position is one of "1" to "D5" and "R", the program proceeds to a step S14, wherein it is determined whether or not a fail-safe flag F__FIFSD assumes "1". The fail-safe flag F__FIFSD is set to "1" when abnormality of the engine 3 is detected, and otherwise, it is set to "0".

If the answer to the question of the step S14 is negative (NO), i.e. if the engine 3 is normally operating, at the following step S15, the drive torque TD is calculated based on the gear ratio NI, the inertia-dependent correction torque TM, and the toque converter-dependent amplification factor KETR by using the following equation:

$$TD = TEC \times KETR \times NI - TM \qquad (1)$$

wherein TEC represents a value of a basic engine torque TE calculated based on the intake pipe absolute pressure PBA and the engine rotational speed NE, which is corrected e.g. in dependence on various parameters, such as the engine coolant temperature and intake air temperature, followed by terminating the program.

On the other hand, if the answer to the question of the step S14 is affirmative (YES), i.e. if abnormality of the engine is detected, at a step S16, the drive torque TD is calculated by using the following equation:

$$TD = TE \times KETR \times NI - TM \qquad (2)$$

Then, the program is terminated.

If the answer to the question of the step S13 is negative (NO), which means that the shift position is "N" or "P", or the shift lever is in the no-position state, the program proceeds to a step S17, wherein the value of the drive torque TD is set to "0". Further, at a step S18, a drive torque flag F_TD is set to "1", followed by terminating the program. The drive torque flag F_TD is set to "1" when the drive torque TD is equal to or lower than 0, i.e. during stoppage or deceleration of the vehicle, whereas it is set to "0" when the drive torque TD is equal to or larger than 0, i.e. during acceleration of the vehicle.

Figure 5:
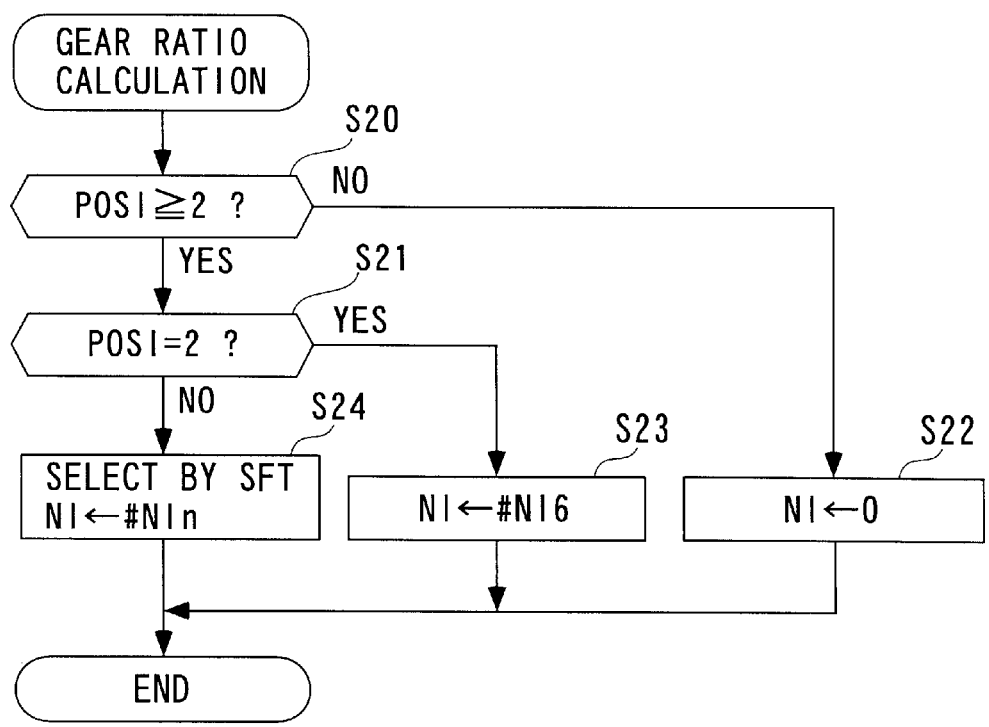
FIG. 5 is a flowchart showing a routine for carrying out a gear ratio-calculating process which is executed at a step S10 in FIG. 3.

Next, the gear ratio-calculating process executed at the step S10 in FIG. 3 will be described with reference to FIG. 5. The process is executed to calculate a gear ratio NI based on the POSI value and the SFT value.

In the gear ratio-calculating process, first, it is determined at a step S20 whether or not the POSI value is equal to or larger than 2. If the answer to the question is negative (NO), i.e. if POSI=1 or 0 holds, which means that the shift position is "N" or "P" or the shift lever is in the no-position state, the gear ratio NI is set to 0 at a step S22, followed by terminating the program.

On the other hand, if the answer to the question of the step S20 is affirmative (YES), the program proceeds to a step S21, wherein it is determined whether or not POSI=2 holds. If the answer to the question is affirmative (YES), i.e. if the shift position is "R", the gear ratio NI is set to a predetermined value #NI6 for reverse drive operation of the vehicle at a step S23, followed by terminating the program.

If the answer to the question of the step S21 is negative (NO), i.e. if POSI≧3 holds, the program proceeds to a step S24, and the gear ratio NI is set to one of predetermined values #NIn (n=1 to 5) for forward drive operation of the vehicle, which is selected according to the SFT value, followed by terminating the program. In this case, the predetermined values #NI1 to NI5 are set in a manner corresponding to the values 1 to 5 of the SFT value, respectively, and such that as the gear position is lower, the corresponding predetermined value #NIn is larger.

Figure 6:
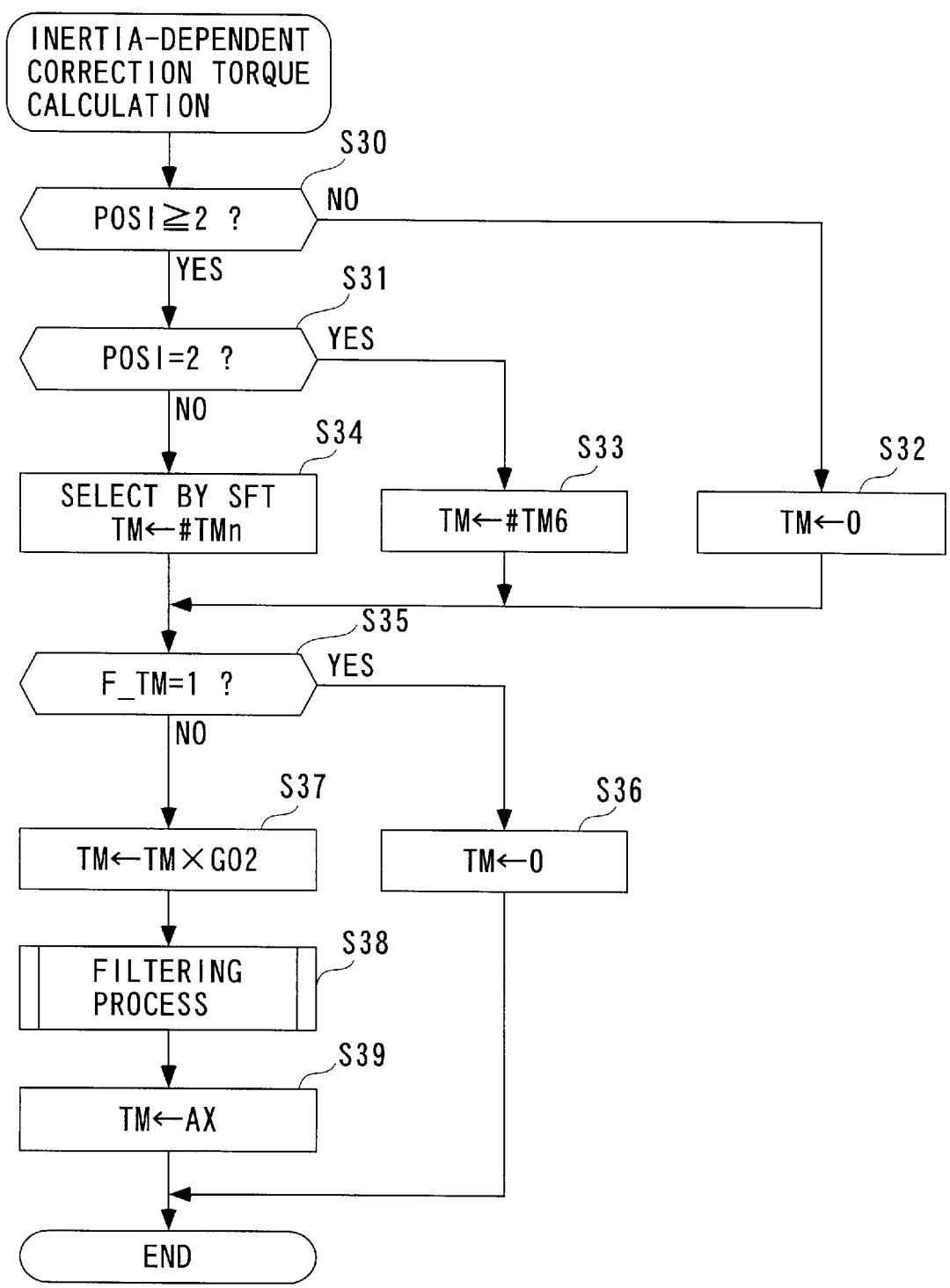
FIG. 6 is a flowchart showing a routine for carrying out an inertia-dependent correction torque-calculating process which is executed at a step S11 in FIG. 3.

Next, the inertia-dependent correction torque-calculating process executed at the step S11 will be described with reference to FIG. 6. This process is executed to calculate the inertia-dependent correction torque TM based on the POSI value, the SFT value, and an average front-wheel acceleration GO2.

As shown in the figure, in the process, first at steps S30 to 34, the inertia-dependent correction torque TM is calculated based on the POSI value and the SFT value similarly to calculation of the gear ratio NI.

More specifically, if POSI=1 or 0 holds at the step S30, the inertia-dependent correction torque TM is set to 0 at a step S32.

If POSI=2 holds at the steps S30 and S31, the inertia-dependent correction torque TM is set to a predetermined value #TM6 for reverse drive operation of the vehicle at a step S33.

Further, if POSI≧3 holds at the step S30 and S31, the inertia-dependent correction torque TM is set to one of predetermined values #TMn (n=1 to 5) for forward drive operation of the vehicle at the step S34. In this case, similarly to the predetermined values #NI1 to NI5 used in the gear ratio-calculating process, the predetermined values #TM1 to TM5 are set in a manner corresponding to the values 1 to 5 of the SFT value, respectively, and such that as the gear position is lower, the corresponding predetermined value #TMn is larger.

At a step S35 following the above steps S32 to S34, it is determined whether or not a flag F_TM assumes "1". The flag F_TM is set to "1" when the average front-wheel acceleration GO2 is equal to or lower than "0", and set to "0" when the average front-wheel acceleration GO2 is higher than "0". The average front-wheel acceleration GO2 is calculated by determining a left front-wheel acceleration GOL from a difference between the present value VW1n of a left front-wheel speed VW1 and the immediately preceding value of the same and a right front-wheel acceleration GOR similarly to the left front-wheel acceleration GOL, and then averaging the left front-wheel acceleration GOL and the right front-wheel acceleration GOR. An averaged rear-wheel acceleration GO3 is calculated similarly to the averaged front-wheel acceleration GO2.

If the answer to the question of the step S35 is affirmative (YES), i.e. if the vehicle is decelerating or in stoppage, the inertia-dependent correction torque TM is set to 0 at a step S36, followed by terminating the program.

On the other hand, if the answer to the question of the step S35 is negative (NO), i.e. if the vehicle is accelerating, at a step S37, the inertia-dependent correction torque TM is set to a value obtained by multiplying the inertia-dependent correction torque TM obtained at the steps S32 to S34 by the average front-wheel acceleration GO2.

Then, the program proceeds to a step S38, wherein a filtered value AX of the inertia-dependent correction torque TM is determined by subjecting the inertia-dependent correction torque TM obtained at the step S37 to low-pass filtering. Then, at the following step S39, the inertia-dependent correction torque TM is set to the filtered value AX determined at the step S38, followed by terminating the program.

Figure 7:
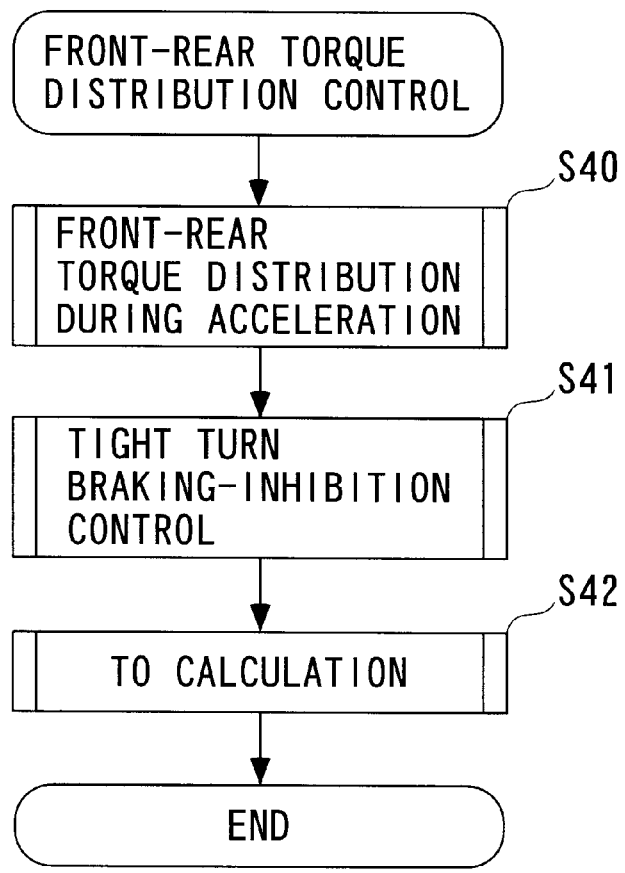
FIG. 7 is a flowchart showing a main routine for carrying out a front-rear distribution torque control process included in the VATC control process.

Next, description will be made of a front-rear distribution torque control process included in the VATC control process. This process is executed to calculate a VATC torque T0. FIG. 7 shows a main routine for carrying out the front-rear distribution torque control process, which is executed by an interrupt handling routine at predetermined time intervals according to the settings of a program timer.

As shown in FIG. 7, in this process, first, a front-rear torque-distributing process during acceleration is carried out at a step S40. In this process, an intermediate VATC torque value T1 is calculated as described hereinbelow.

At the following step S41, a tight turn braking-inhibiting control process is executed. In the process, a tight turn braking-inhibiting coefficient T4 is calculated as described hereinafter.

Figure 8:
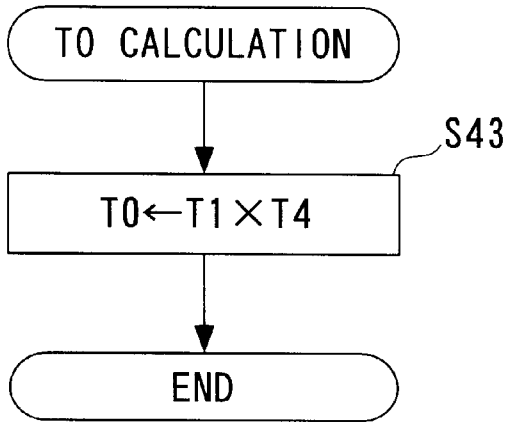
FIG. 8 is a flowchart showing a routine for carrying out a T0-calculating process which is executed at a step S42 in FIG. 7.

At the final step S42, a T0-calculating process is executed. In this process, as shown in FIG. 8, at a step S43, the intermediate VATC torque value T1, which is determined at the step S40, is multiplied by the tight turn braking-inhibiting coefficient T4 determined at the step S41, to thereby obtain a value T1×T4, and the VATC torque T0 is set to the value T1×T4 after lower limit-checking thereof.

Figure 9:
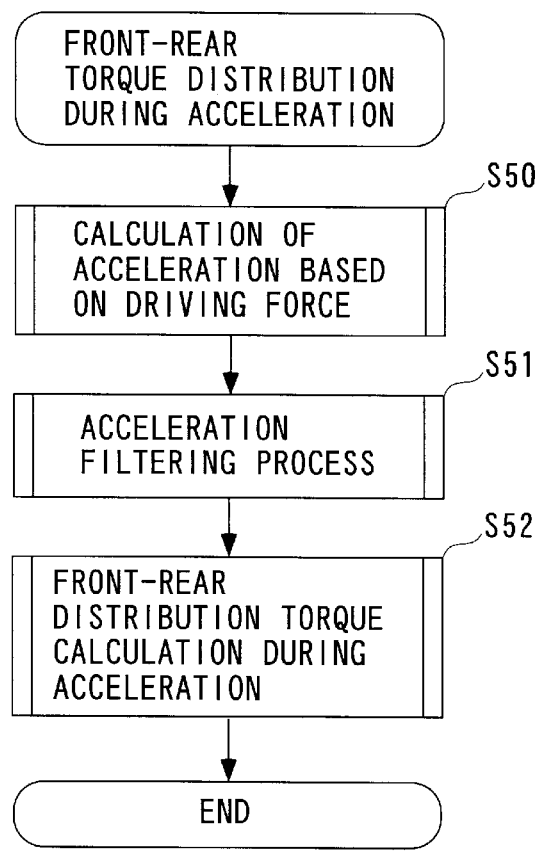
FIG. 9 is a flowchart showing a main routine for carrying out a front-rear distribution control process during acceleration which is executed at a step S40 in FIG. 7.

In the following, the front-rear torque-distributing process during acceleration, which is executed at the step S40, will be described in detail. FIG. 9 shows a main routine for carrying out the process. In this process, first, a process for calculating an acceleration based a driving force is executed at a step S50 to calculate a vehicle acceleration XGF based on the drive torque TD.

Then, the program proceeds to a step S51, wherein an acceleration-filtering process is carried out to calculate a filtered value XGFiF of the vehicle acceleration XGF. Then, at a step S52, the intermediate VATC torque value T1 is calculated by a process for calculating front-rear distribution torque during acceleration, followed by terminating the program.

Figure 10:
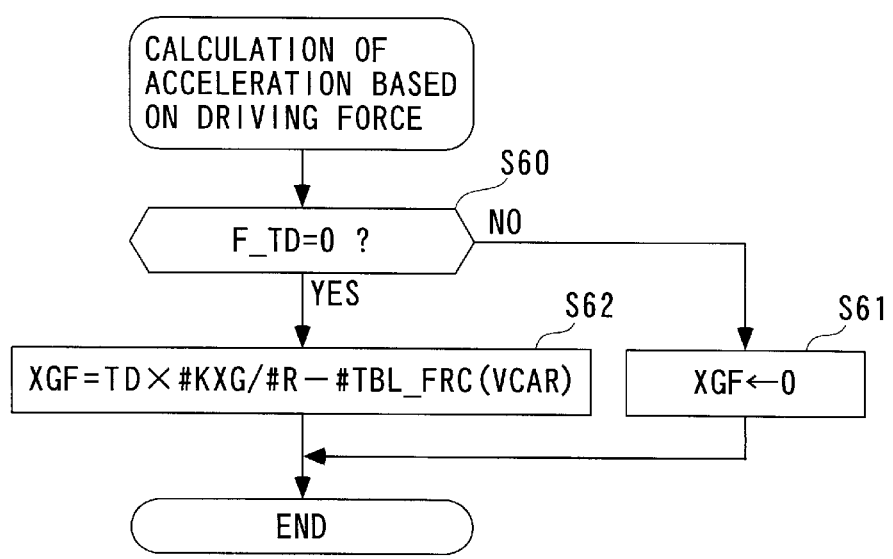
FIG. 10 is a flowchart showing a routine for carrying a process for calculating acceleration based on a driving force, which is executed at a step S50 in FIG. 9.

In the following, the process for calculating an acceleration based on a driving force, which is executed at the step S50, will be described with reference to FIG. 10. In this process, first, it is determined at a step S60 whether or not the drive torque flag F_TD assumes "0".

If the answer to the question is negative (NO), i.e. if the vehicle is decelerating or in stoppage and hence the drive torque TD is equal to or smaller than 0 as described hereinbefore, the program proceeds to a step S61, and the vehicle acceleration XGF is set to 0, followed by terminating the program.

On the other hand, if the answer to the question of the step S60 is affirmative (YES), i.e. if the vehicle is accelerating and hence the drive torque TD is larger than 0 as described hereinbefore, the program proceeds to a step S62, wherein the vehicle acceleration XGF is calculated by using the following equation (3):

$$XGF = TD \times \#KXG/\#R - \#TBL\_FRC \quad (3)$$

wherein #KXG represents the reciprocal of the weight of the vehicle 2; #R represents the diameter of each of the wheels of the vehicle 2; and #TBL_FRC represents a table value of a running resistance FRC of the vehicle 2 followed by terminating the program.

Figure 11:
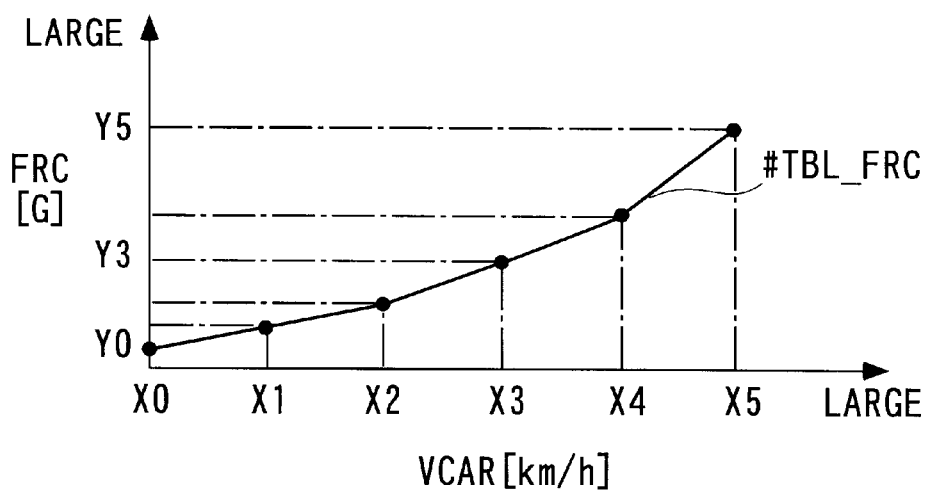
FIG. 11 is a diagram showing an example of a VCAR-FRC table.

The table value #TBL_FRC of the running resistance FRC is retrieved from a VCAR-FRC table an example of which is shown in FIG. 11, according to the vehicle speed VCAR. As shown in the figure, the VCAR-FRC table is configured such that the table value #TBL_FRC assumes a larger value as the vehicle speed VCAR is higher. It should be noted that the vehicle speed VCAR is obtained by correcting the lower one of left and right rear-wheel speeds VW3, VW4 depending on the accelerating condition or decelerating condition of the vehicle.

As described above, the vehicle acceleration XGF is calculated as a value obtained by subtracting the running resistance FRC of the vehicle 2 from a vehicle acceleration value calculated based on the drive torque TD. In other words, the vehicle acceleration XGF is calculated as a surplus vehicle acceleration used only for actual acceleration of the vehicle 2, and hence it faithfully reflects an actual accelerating condition of the vehicle 2.

Figure 12:
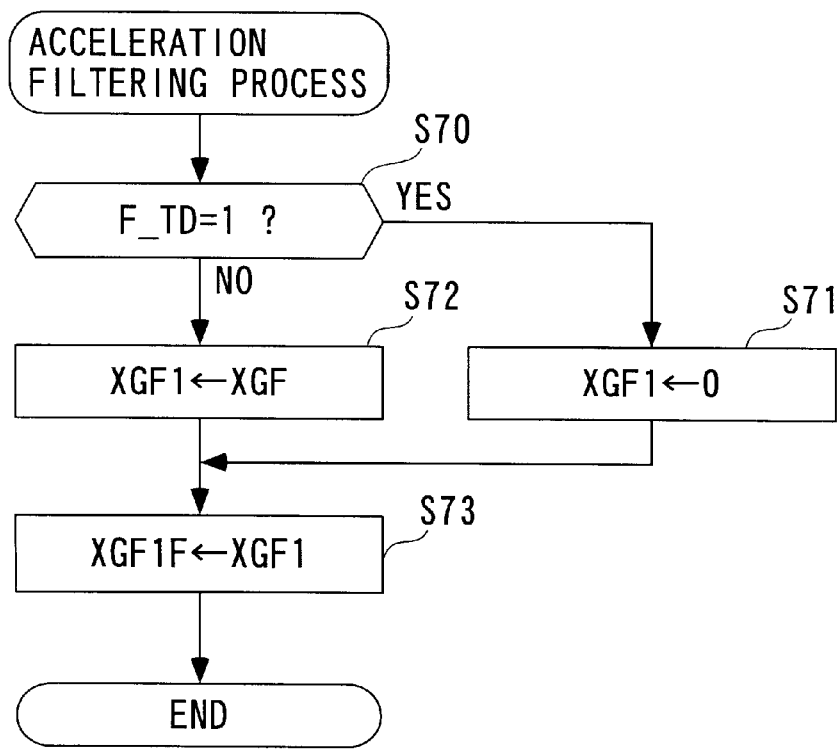
FIG. 12 is a flowchart showing a routine for carrying out an acceleration-filtering process which is executed at a step S51 in FIG. 9.

Next, the acceleration-filtering process executed at the step S51 will be described with reference to FIG. 12. As shown in the figure, in this process, if the drive torque flag F_TD assumes "1" at a step S70, i.e. if the vehicle is decelerating or in stoppage and hence the drive torque TD is equal to or smaller than 0, an intermediate value XGF1 is set to 0 at a step S71.

On the other hand, if the drive torque flag F_TD assumes "0" at the step S70, i.e. if the vehicle is accelerating and the drive torque TD is larger than 0, the intermediate value XGF1 is set to the vehicle acceleration XGF at a step S72.

At a step S73 following the steps S71, 72, a filtered vehicle acceleration XGF1F is set to the intermediate value XGF1, followed by terminating the program. As described above, the filtered vehicle acceleration XGF1F is set to the vehicle acceleration XGF during acceleration of the vehicle, whereas it is set to 0 during deceleration or stoppage of the vehicle.

Figure 13:
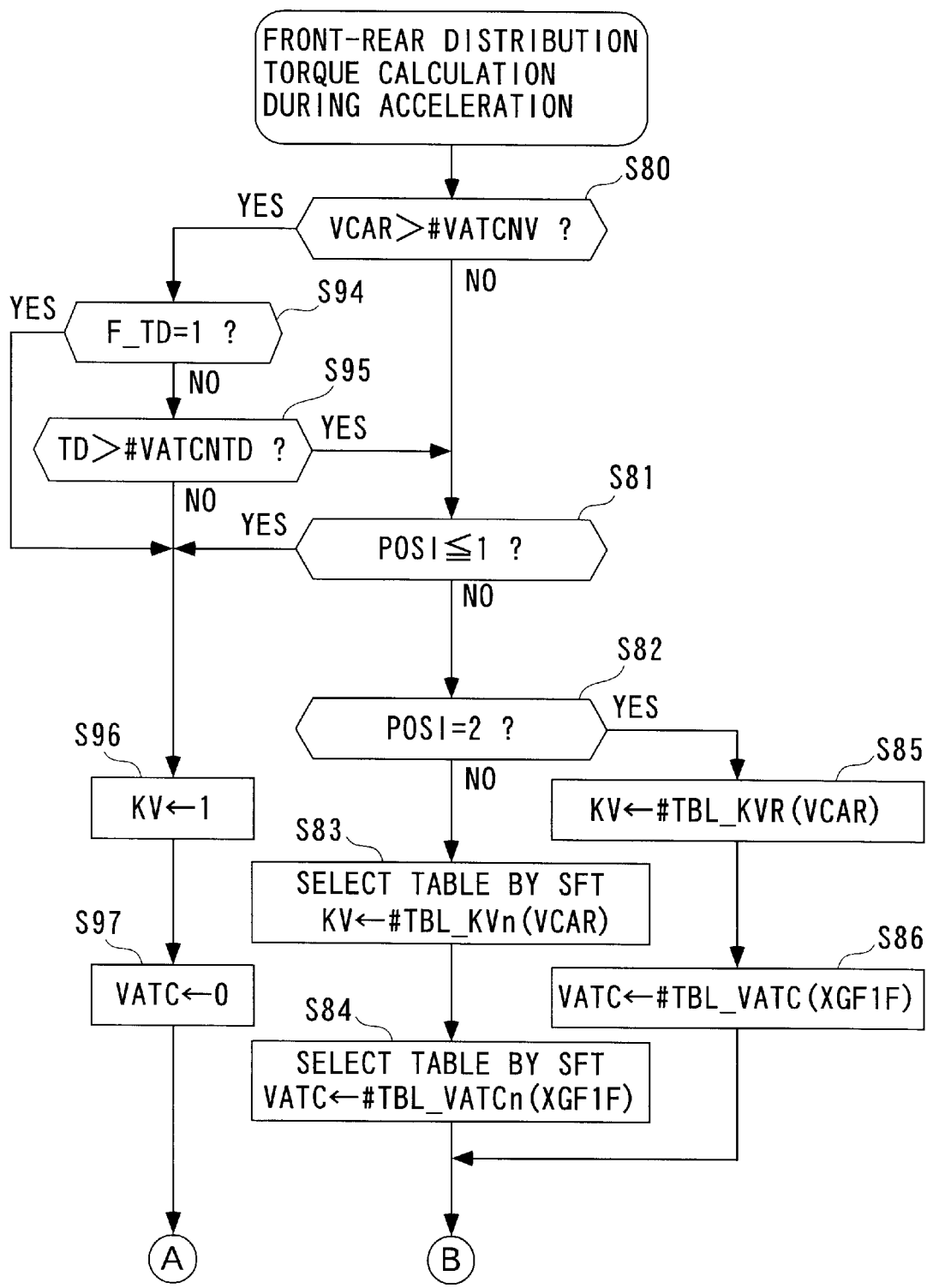
FIG. 13 is a flowchart showing a routine for carrying out part of the front-rear distribution torque-calculating process during acceleration, which is executed at a step S52 in FIG. 9.

In the following, the process for calculating the front-rear distribution torque during acceleration, which is executed at the step S52, will be described with reference to FIGS. 13 to 21. Here, a case of the vehicle 2 being started after stoppage is taken as an example, and the description will be made following a sequence of operations carried out during the start of the vehicle 2. As shown in FIG. 13, in the present process, first, it is determined at a step S80 whether or not the vehicle speed VCAR is higher than a predetermined speed #VATCNV.

During stoppage of the vehicle, VCAR=0 holds, and hence the answer to the question of the step S80 is negative (NO). Therefore, the program proceeds to a step S81, wherein it is determined whether or not the POSI value is equal to or smaller than 1. When none of the shift positions from the "1" to "D5" and "R" has been selected, the answer to this question is affirmative (YES), so that a VATC-adjusting coefficient KV is set to a value of 1 at a step S96, and then a basic VATC torque value (driving force) is set to a value of 0 at a step S97.

Figure 14:
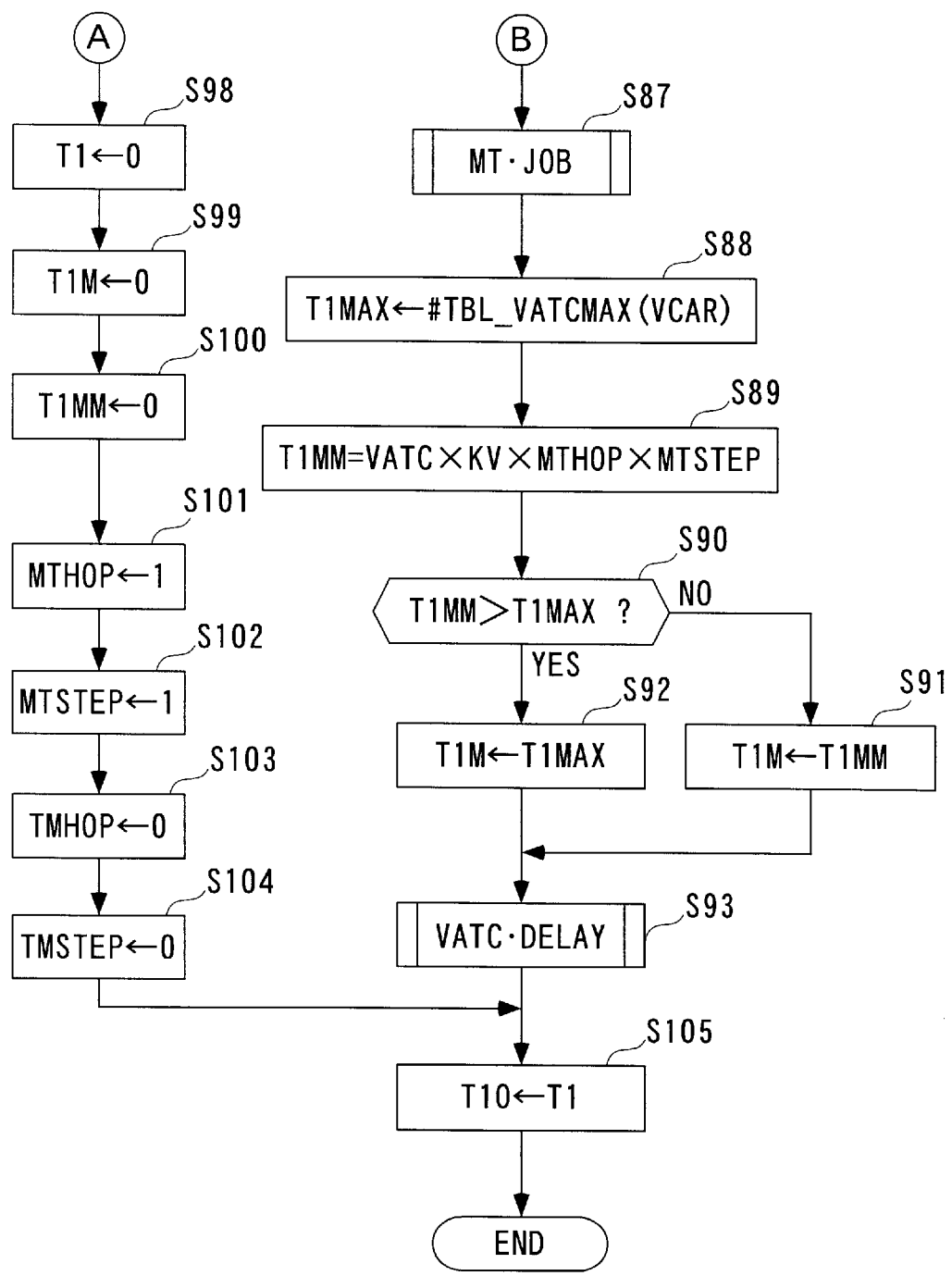
FIG. 14 is a continuation of the FIG. 13 flowchart.

Then, at respective steps S98 to S100 in FIG. 14, the immediate VATC torque value T1, a desired VATC torque value T1M and a corrected VATC torque value T1MM are set to 0. Further, a HOP correction coefficient MTHOP and a STEP correction coefficient MTSTEP are set to 1 at respective steps S101 and S102, and a count TMHOP of a HOP timer and a count TMSTEP of a STEP timer are set to 0 at respective steps S103 and S104.

Then, at a step S105, the immediately preceding value T1O of the intermediate VATC torque value T1 is updated to the intermediate VATC torque value T1 (=0) determined at a step S99, followed by terminating the program.

On the other hand, if one of shift positions "1" to "D5" and "R" is selected during stoppage of the vehicle, the answer to the question of the step S81 becomes negative (NO), so that the program proceeds to a step S82, wherein it is determined whether or not the POSI value is equal to 2.

Figure 15:
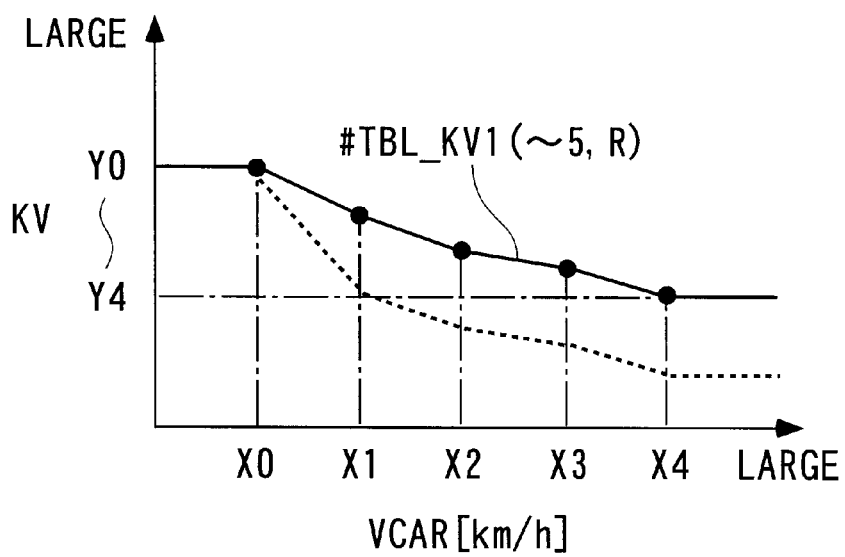
FIG. 15 is a diagram showing an example of a VCAR-KV table.

If the answer to the question is negative (NO), i.e. if a shift position for forward drive operation (i.e. one of "1" to "D5") is selected, the program proceeds to a step S83, wherein a table value #TBL_KVn (n=1 to 5) of the VATC-adjusting coefficient KV is retrieved from a VCAR-KV table an example of which is shown in FIG. 15 according to the vehicle speed VCAR and the SFT value, and set to the VATC-adjusting coefficient KV.

There are provided five kinds of VCAR-KV tables for the first to fifth speed positions indicated by the respective SFT values 1 to 5. FIG. 15 shows the VCAR-KV table for the first speed position. As shown in the figure, the table value #TBL_KV1 assumes a predetermined value Y0 for a predetermined value X0 and values lower than X0 of the vehicle speed VCAR, and assumes a predetermined value Y4 lower than the predetermined value Y0 for a predetermined speed X4 and values higher than X4 of the vehicle speed VCAR. Within a range of the vehicle speed VCA between the predetermined values X0 and X4, the table value #TBL_KV1 is set to a smaller value as the vehicle speed VCAR is higher. The reason for this is that as the vehicle speed VCAR is higher, the kinetic energy of the vehicle 2 is larger, which makes the front wheels W1, W2 less prone to slip, so that torque required for driving the rear wheels W3, W4 is smaller.

Further, the VCAR-KV tables are configured similarly to each other such that the table values #TBL__KV generally exhibit a similar tendency with respect to the vehicle speed VCAR, but at the same time are different from each other in that in a VCAR-KV table for a higher gear position, each individual table value #TBL__KV is smaller than a corresponding one in another VCAR-KV table for a lower gear position, with respect to an identical vehicle speed VCAR value (see another table value #TBL__KV indicated by a dotted curve in FIG. 15). Therefore, each individual table value #TBL__KV for the first speed position is set to a larger value than any other corresponding ones in the other VCA-KV table. The reason for this is that as the gear ratio is larger, the inertial mass of the output-side gears is larger, and hence a larger torque is required for driving each of the rear wheels W3, W4.

Figure 16:
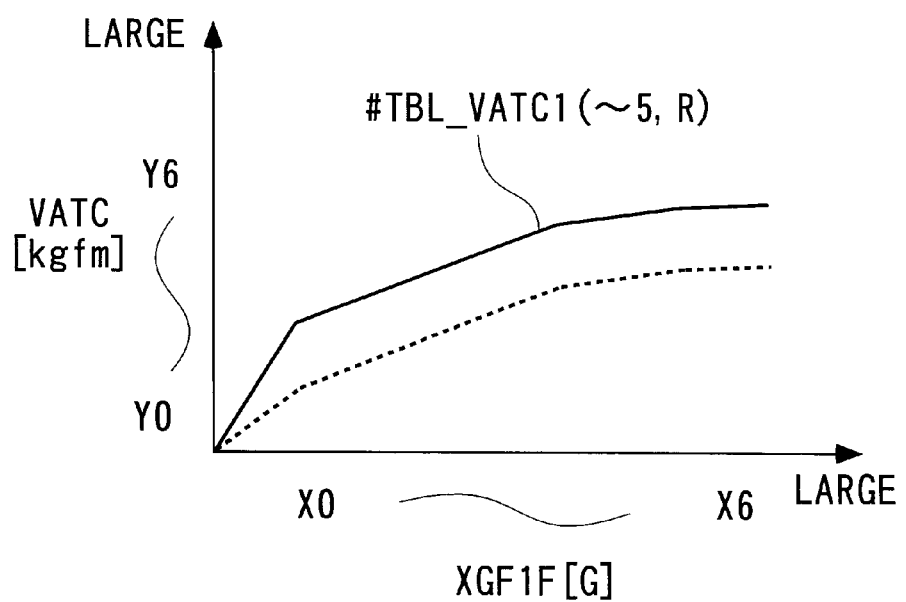
FIG. 16 is a diagram showing an example of an XGF1F-VATC table.

Then, the program proceeds to a step S84, wherein a table value #TBL__VATCn (n=1 to 5) of the basic VATC torque value VATC is retrieved from an XGF1F-VATC table an example of which is shown in FIG. 16 according to the filtered vehicle acceleration XGF1F and the SFT value, and set to the basic VATC torque value VATC.

Similarly to the VCAR-KV tables, there are provided five kinds of XGFLF-VATC tables for the respective first to fifth speed positions indicated by the respective to the SFT values 1 to 5. FIG. 16 shows an XGL1F-VATC table for the first speed position. As shown in the figure, the table value #TBL__VATC assumes a larger value as the filtered vehicle acceleration XGF1F is higher. This is because as the filtered vehicle acceleration XGF1F is higher, torque required for driving the rear wheels W3, W4 is larger.

The XGL1F-VATC tables are configured similarly to each other such that table values #TBL__VATC in the respective tables exhibit a similar tendency with respect to the filtered vehicle acceleration XGF1F, but at the same time are different from each other in that in an XGF1F-VATC table for a higher speed position, each individual table value #TBL__VATC is smaller than a corresponding one in an XGL1F-VATC table for a lower speed position, with respect to an identical filtered vehicle acceleration XGL1F value (see another table value #TBL__VATC indicated by a dotted curve in FIG. 15). Therefore, each individual table value #TBL__VATC for the first speed position is set to a larger value than any other corresponding ones in the other VCAR-KV tables. The reason for this is that, as described above, as the gear ratio is larger, the inertial mass of the output gears is larger, and hence a larger torque is required for driving each of the rear wheels W3, W4.

If "R" is selected as a shift position during stoppage of the vehicle, the answer to the question of the step S82 becomes affirmative (YES), the program proceeds to a step S85, wherein, similarly to the step S83, a table value #TBL__KVR is retrieved from a VCAR-KV table for the reverse gear position according to the vehicle speed VCAR, and set to the VATC-adjusting coefficient KV. Also in the VCAR-KV table for the reverse gear position, each individual table value #TBL__KVR is set differently from corresponding ones in the respective VCAR-KV tables for the first to fifth speed positions, but the general tendency of the table value #TBL__KVR with respect to the vehicle speed VCAR is similar to those in the other VCAR-KV tables.

Then, the program proceeds to a step S86, wherein, a table value #TBL__VATR is retrieved from a XGL1F-VATC table for the reverse gear position according to the filtered vehicle acceleration XGF1F, and set to the basic VATC torque value VATC. Also in the XGL1F-VATC table for the reverse gear position, each individual table value #TBL__VATCR is set differently from other corresponding ones in the respective XGL1F-VATC tables for the first to fifth speed positions, but the general tendency of the table value #TBL__VATCR with respect to the filtered vehicle acceleration XGF1F is similar to those in the other XGF1F-VATC tables.

After execution of the above steps S84, S86, the program proceeds to a step S87 in FIG. 14, wherein an MT•JOB process is carried out. In the MT•JOB process, as described hereinafter, the HOP correction coefficient MTHOP and the STEP correction coefficient MTSTEP are calculated.

Then, the program proceeds to a step S88, wherein a table value #TBL__VATCMAX of a limit VATC torque value T1MAX is retrieved from a VCAR-T1MAX table an example of which is shown in FIG. 17 according to the vehicle speed VCAR, and set to the limit VACT value T1MAX.

As shown in FIG. 17, in the VCAR-T1MAX table, the table value #TBL__VATCMAX assumes a predetermined value Y0 for a predetermined value X0 or values lower than X0 of the vehicle speed VCAR, and set to a predetermined value Y9 smaller than the predetermined value Y0 for a predetermined value X9 and values higher than X0 of the vehicle speed VCAR. Further, the VCAR-T1MAX table is configured such that as the vehicle speed VCAR increases from X0 to X9, the table value #TBL__VATCMAX is set to a smaller value. The reason for this is that as the vehicle speed VCAR is higher, the front wheels W1, W2 are less prone to slip, so that a smaller amount of torque is required for driving the rear wheels W3, W4.

Then, the program proceeds to a step S89, wherein the corrected VATC torque value T1MM is calculated by using the following equation (4):

$$T1MM = VATC \times KV \times MTHOP \times MTSTEP \quad (4)$$

Then, it is determined at step S90 whether or not the corrected VATC torque value T1MM is larger than the limit VATC torque value T1MAX obtained at the step S88. If the answer to the question is negative (NO), the desired VATC torque value TIM is set to the corrected VATC torque value T1MM at a step S91, whereas if the answer to the question is affirmative (YES), the desired VATC torque value TIM is set to the limit VATC torque value T1MAX at a step S92.

After execution of the step S91 or S92, the program proceeds to a step S93, wherein a VATC DELAY process is carried out. In the VATC DELAY process, the intermediate VATC torque value T1 is calculated as a value obtained by correcting the present value of the desired VATC torque value T1M so as to prevent a large difference from occurring between the present value of the desired VATC torque value T1M and the immediately preceding value of the same (i.e. for reduction of a torque step).

Then, at the step S105, the immediately preceding value T1O of the intermediate VATC torque value T1 is set to the intermediate VATC torque value T1 determined at the step S93, followed by terminating the program.

As described above, the calculation of the intermediate VATC torque value T1 is started at the start of the vehicle 2 after stoppage and continued until the answer to the question of the step S80 becomes affirmative (YES), i.e. until the vehicle speed VCAR exceeds the predetermined speed #VATCNV.

Then, when the vehicle speed VCAR being progressively increased after the start of the vehicle 2 exceeds the predetermined speed #VATCNV, i.e. when the answer to the question of the step S80 becomes affirmative (YES), the program proceeds to a step S94, wherein it is determined whether or not the drive torque flag $F_{13}$ TD assumes "1".

If the answer to the question is negative (NO), which means that the vehicle 2 is accelerating, the program proceeds to a step S95, wherein it is determined whether or not the drive torque TD is larger than a predetermined value #VATCCNTD. If the answer to the question is affirmative (YES), which means that the vehicle 2 is accelerating, and the vehicle speed VCAR and the drive torque TD assume large values, the program proceeds to the steps S81 et seq., and the intermediate VATC torque value T1 is calculated as described above.

On the other hand, if the answer to the question of the step S95 is negative (NO), i.e. if the drive torque TD is equal to or smaller than the predetermined value #VATCCNTD even during acceleration of the vehicle 2, the program proceeds to the steps S96 et seq., and the intermediate VATC torque value T1 is set to the value of 0 as described above.

When acceleration of the vehicle 2 is terminated and deceleration of the same is started, i.e. when the answer to the question of the step S94 becomes affirmative (YES), the program skips over the step S95 to the steps S96 et seq., and the intermediate VATC torque value T1 is set to the value of 0.

As described above, the intermediate VATC torque value T1 is calculated, in the front-rear distribution torque-calculating process, based on the filtered vehicle acceleration XGF1F determined at the step S51 in FIG. 9, so that the value T1 can faithfully reflect an actual accelerating condition of the vehicle 2.

Figure 18:
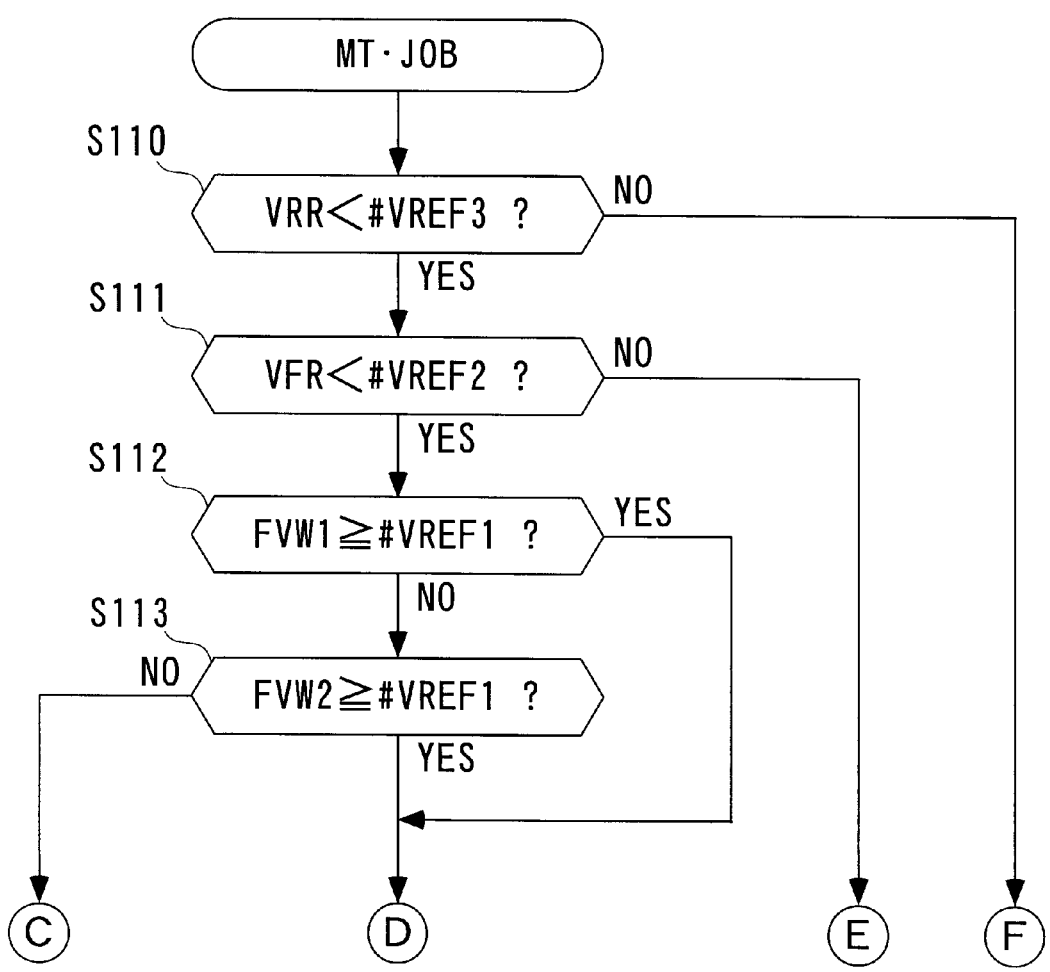
FIG. 18 is a flowchart showing a routine for carrying out an MT·JOB process which is executed at a step S87 in FIG. 14.

In the following, the aforementioned MT·JOB process executed at the step S87 will be described with reference to FIGS. 18 and 19. In this description, a case of the vehicle 2 being started on an icy road after stoppage is taken as an example, and a sequence of operations carried out after the start of the vehicle 2 is followed. In the present process, first, it is determined at a step S110 whether or not an average rear-wheel speed VRR is lower than a third predetermined speed #VREF3.

The average rear-wheel speed VRR is obtained by averaging left and right filtered rear-wheel speeds FVW3, FVW4 which are obtained, respectively, by subjecting the detected left and right rear-wheel speeds VW3, VW4 to predetermined filtering processing. Further, the third predetermined speed #VREF3 is set to a value which is expected to be obtained when the two rear wheels W3, W4 are each positively rotating.

During stoppage of the vehicle 2, the answer to the question of the step S110 is affirmative (YES), so that the program proceeds to a step S111, wherein it is determined whether or not an average front-wheel speed VFR is lower than a second predetermined speed #VREF2. Similarly to the average rear-wheel speed VRR, the average front-wheel speed VFR is obtained by averaging left and right filtered front-wheel speeds FVW1, FVW2 which are obtained, respectively, by subjecting the detected left and right front-wheel speeds VW1, VW2 to predetermined filtering processing.

The second predetermined speed #VREF2 is also set to a value which is expected to be obtained when the two front wheels W1, W2 are each positively rotating. Further, in the present embodiment, the second predetermined speed #VREF2 is set to the same value as the third predetermined speed #VREF3 (e.g. 5 km/h) so as to distribute torque to the two rear wheels W3, W4 until it is judged that the rear wheels W3, W4 have started to be positively rotating. It should be noted that the third predetermined speed #VREF3 may be set to a slightly higher value than the second predetermined speed #VREF2.

During stoppage of the vehicle 2, the answer to the question of the step S111 is affirmative (YES), so that the program proceeds to a step S112, wherein it is determined whether or not a filtered left front-wheel speed FVW1 is equal to or higher than a first predetermined speed #VREF1. The first predetermined speed #VREF1 is also set to a value which is expected to be obtained when the left front wheel W1 or the right front wheel W2 is positively rotating. Further, in the present embodiment, the first predetermined speed #VREF1 is set to the same value as the second and third predetermined speeds #VREF2 and #VREF3 (e.g. 5 km/h).

When the vehicle 2 is in stoppage, the answer to the question of the step S112 is negative (NO), so that the program proceeds to a step S113, wherein it is determined whether or not a filtered right front-wheel speed FVW2 is equal to or higher than the first predetermined speed #VREF1. During stoppage of the vehicle 2, the answer to the question of the step S113 is negative (NO), so that the program proceeds to a step S114 in FIG. 19, wherein the count TMHOP of the HOP timer is set to 0. Further, at a step S115, the count TMSTEP of the STEP timer is set to 0.

Figure 20:
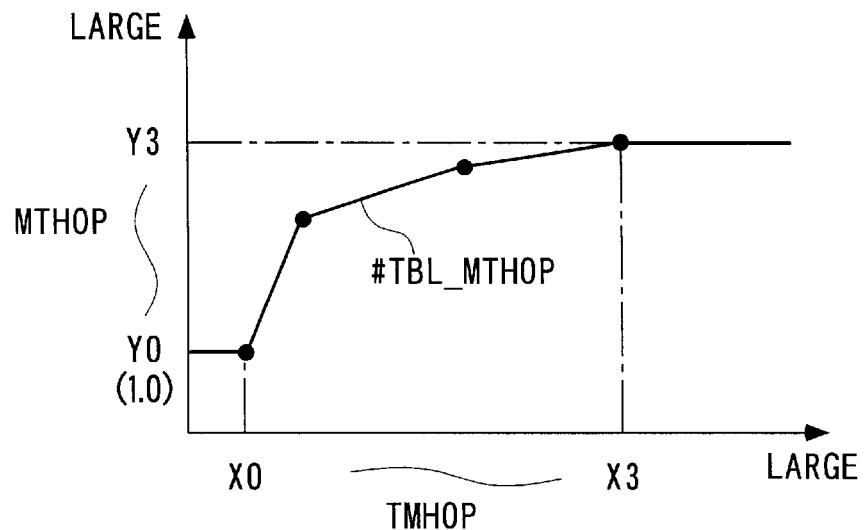
FIG. 20 is a diagram showing an example of a TMHOP-MTHOP table.

Then, the program proceeds to a step S126, wherein a table value #TBL_MTHOP (TMHOP) is retrieved from a TMHOP-MTHOP table an example of which is shown in FIG. 20 according to the HOP timer count TMHOP, and set to the HOP correction coefficient MTHOP.

As shown in FIG. 20, in the TMHOP-MTHOP table, the table value #TBL_MTHOP (TMHOP) is set to a predetermined value Y0 (1.0) for a predetermined value X0 (>0) and values smaller than X0 of the HOP timer count TMHOP, and to a predetermined value Y3 larger than the predetermined value Y0 for a predetermined value X3 and values larger than X3 of the count TMHOP. Further, the TMHOP-MTHOP table is configured such that as the HOP timer count TMHOP increases from X0 to X3, the table value #TBL_TMHOP assumes a larger value. The table value #TBL_TMHOP is thus set so as to progressively increase torque distributed to the rear wheels W3, W4 with the lapse of time, thereby improving startability of the vehicle 2 e.g. on a low-$\mu$ road surface such as an icy road surface. In the present loop, TMHOP =0 holds at the step S114, so that the HOP correction coefficient MTHOP is set to 1.0.

Figure 21:
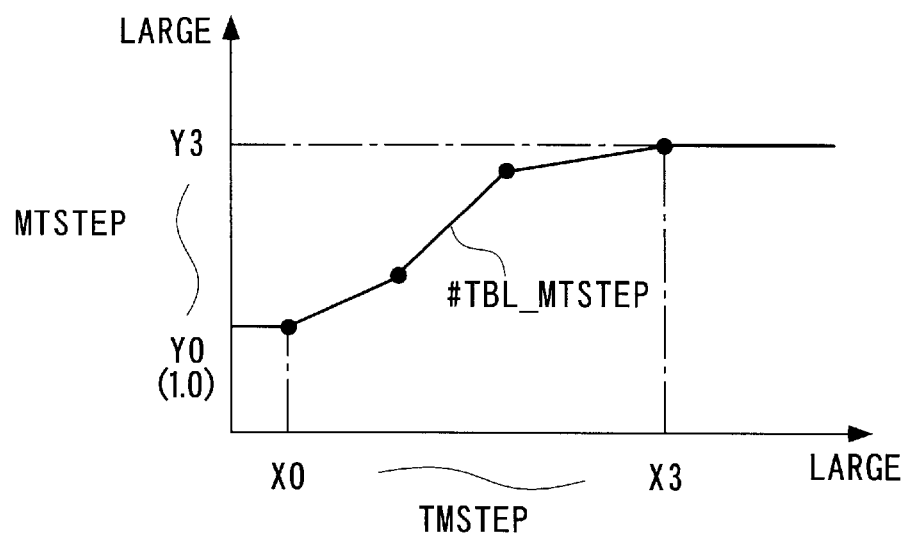
FIG. 21 is a diagram showing an example of a TMSTEP-MTSTEP table.

Then, at a step S127, a table value #TBL_MTSTEP (TMSTEP)is retrieved from a TMSTEP-MTSTEP table an example of which is shown in FIG. 21 according to the STEP timer count TMSTEP, and set to the STEP correction coefficient MTSTEP, followed by terminating the program.

As shown in the figure, the TMSTEP-MTSTEP table is configured such that it generally exhibits a similar tendency to that of the above TMHOP-MTHOP table. More specifically, the table value #TBL_MTSTEP (TMSTEP) is set to a predetermined value Y0 (1.0) for a predetermined value X0 (>0) and values smaller than X0 of the STEP timer count TMSTEP, and to a predetermined value Y3 larger than the predetermined value Y0 for a predetermined value X3 (predetermined value #TMS1 referred to hereinafter) and values larger than X3 of the count TMSTEP. Further, the TMSTEP-MTSTEP table is configured such that as the STEP timer count TMSTEP increases from X0 to X3, the table value #TBL_MTSTEP assumes a larger value. The table value #TBL_MTSTEP is thus set so as to progressively increase torque distributed to the rear wheels W3, W4 with the lapse of time, thereby improving startability of the vehicle 2 e.g. on a low-$\mu$ road surface such as an icy road surface, as described above. In the present loop, TMSTEP=0 holds at the step S115, so that the STEP correction coefficient MTSTEP is set to 1.0.

On the other hand, if the answer to the question of one of the steps 112, 113 is affirmative (YES) after the start of the vehicle 2 on the icy road surface, for instance, i.e. if the average front-wheel speed VFR is below the second predetermined speed #VREF2, but one of the filtered left and right front-wheel speeds FVW1, FVW2 is equal to or higher than the first predetermined speed #VREF1 and the other is below the same, which means that a difference in speed has been produced between the front wheels W1 and W2 (e.g. occurrence of slipping of one of the front wheels), the program proceeds to a step S116, wherein it is determined whether or not the HOP timer count TMHOP has reached an upper limit count #TMH1 thereof. The upper limit count #TMH1 is set to the predetermined count X3.

When the present loop is being first executed, the answer to the question of the step S116 is negative (NO), so that the program proceeds to a step S117, wherein the HOP timer count TMHOP is incremented. Then, the steps 126, 127 are executed to set the HOP correction coefficient MTHOP and the STEP correction coefficient MTSTEP, respectively, as described above, followed by terminating the program. On the other hand, if the answer to the question of the step S116 is affirmative (YES), i.e. if the HOP timer count TMHOP has reached the upper limit count #TMH1, the step S117 is skipped, and the steps 126, 127 are executed, followed by terminating the program.

On the other hand, if the answer to the question of the step S111 is negative (NO), i.e. the average rear-wheel speed VRR is lower than the third predetermined speed #VREF3 and the average front-wheel speed VFR is equal to or higher than the second predetermined speed #VREF2 (=the third predetermined speed #VREF3), which means that the average front-wheel speed VFR is higher than the average rear-wheel speed VRR. It is judged that the front wheels are slipping, and the program proceeds to a step S118 in FIG. 19, wherein it is determined whether or not the STEP timer count TMSTEP has reached the upper limit count #TMS1. The upper limit count #TMS1 is set to the aforementioned predetermined count X3 of the STEP timer count TMSTEP.

When the present loop is being first executed, the answer to the question of the step S118 is negative (NO), so that the STEP timer count TMSTEP is incremented at a step S119, followed by the program proceeding to the steps S126 et seq. On the other hand, if the answer to the question of the step S118 is affirmative (YES), i.e. if the STEP timer count TMSTEP has reached the upper limit count #TMS1, the step S119 is skipped, and the steps 126, 127 are executed, followed by terminating the program.

Figure 19:
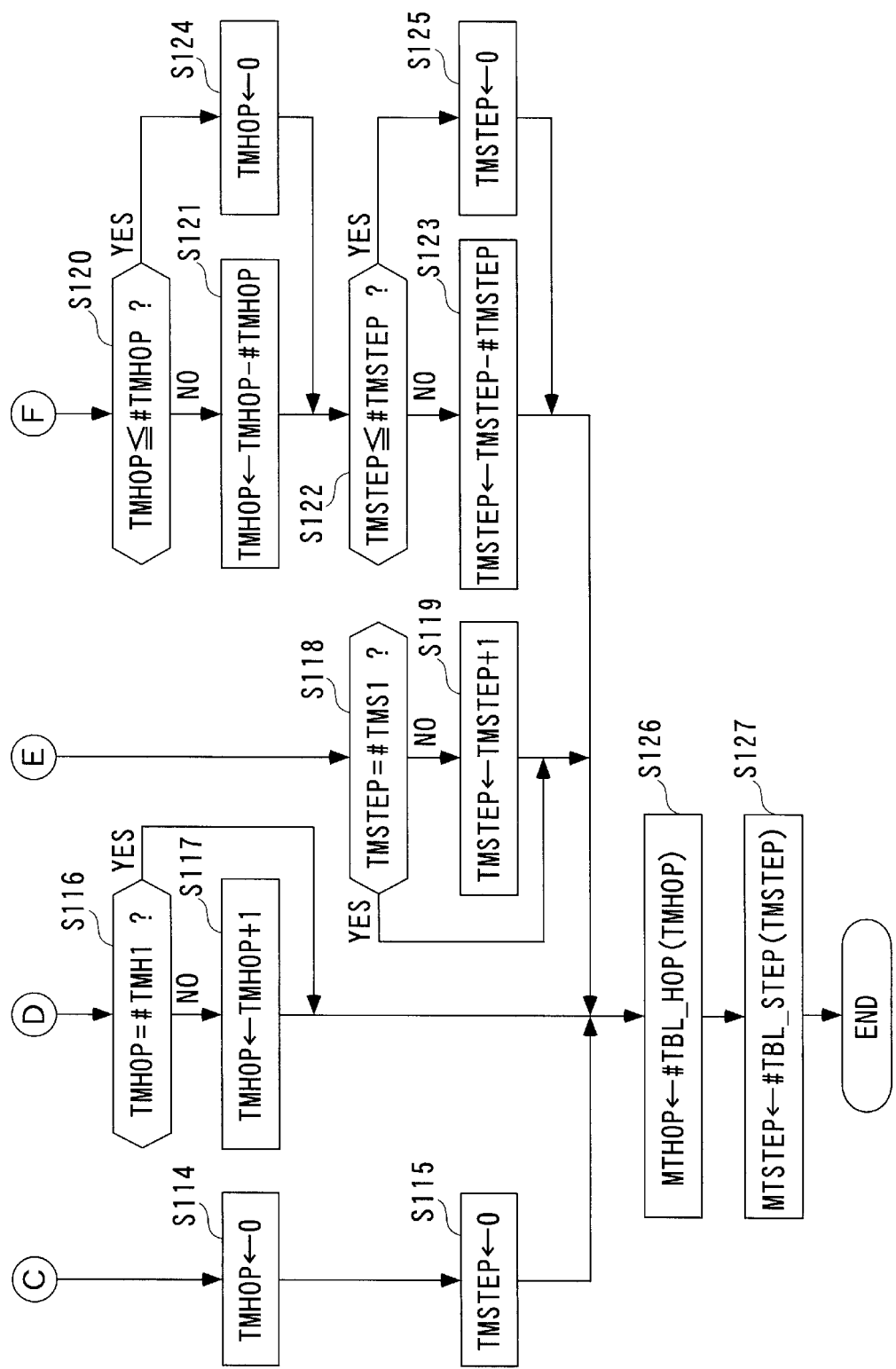
FIG. 19 is a continuation of the FIG. 18 flowchart.

If the answer to the question of the step S110 is negative (NO), which means that the filtered left and right rear-wheel speeds FVW3, FVW4 have been progressively increased with the lapse of time and the average rear-wheel speed VRR has become equal to or higher than the third predetermined speed #VREF3, the program proceeds to a step S120 in FIG. 19, wherein it is determined whether or not the HOP timer count TMHOP is equal to or smaller than a predetermined threshold value #TMHOP.

If the answer to the question is negative (NO), the program proceeds to a step S121, wherein the predetermined threshold value #TMHOP is subtracted from the HOP timer count TMHOP.

Then, the program proceeds to a step S122, wherein it is determined whether or not the STEP timer count TMSTEP is equal to or smaller than a predetermined threshold value #TMSTEP.

If the answer to the question is negative (NO), the predetermined threshold value #TMSTEP is subtracted from the STEP timer count TMSTEP at a step S123, followed by the program proceeding to the steps S126 et seq.

On the other hand, if the answer to the question of the step S120 is affirmative (YES), the HOP timer count TMHOP is set to 0 at a step S124, followed by the program proceeding to the step S122.

When the answer to the question of the step S122 becomes affirmative (YES) with the lapse of time, the STEP timer count TMSTEP is set to 0 at a step S125, followed by the program proceeding to the step S126.

In the MT·JOB process described above, when one of the filtered left and right front-wheel speeds FVW1, FVW2 is equal to or higher than the first predetermined speed #VREF1 and the other is lower than the same, the HOP correction coefficient MTHOP is held at a larger value than 1.0 until the average front-wheel speed VFR becomes equal to or higher than the second predetermined speed #VREF2, whereby the intermediate VATC torque value T1 calculated at the step S93 in FIG. 14 is increased, and at the same time, the HOP correction coefficient MTHOP is progressively increased with the lapse of time, whereby the intermediate VATC torque value T1 is also progressively increased.

Further, when the average front-wheel speed VFR is equal to or higher than the second predetermined speed #VREF2, the STEP correction coefficient MTSTEP is held at a larger value than 1.0 until the average rear-wheel speed VRR becomes equal to or higher than the third predetermined speed #VREF3, whereby the intermediate VATC torque value T1 is increased, and at the same time, the STEP correction coefficient MTSTEP is progressively increased with the lapse of time, whereby the intermediate VATC torque value T1 is also progressively increased. In short, when one of the left and right front wheels W1, W2 is slipping, or when both of them are slipping, the intermediate VATC torque value T1 is progressively increased until the average rear-wheel speed VRR becomes equal to the third predetermined speed #VREF3.

Further, from a time point when the average rear-wheel speed VRR has become equal to or higher than the third predetermined speed #VREF3, the HOP correction coefficient MTHOP and the STEP correction coefficient MTSTEP are progressively decreased, whereby the intermediate VATC torque value T1 is also progressively decreased, so that occurrence of a torque step can be prevented.

Figure 22:
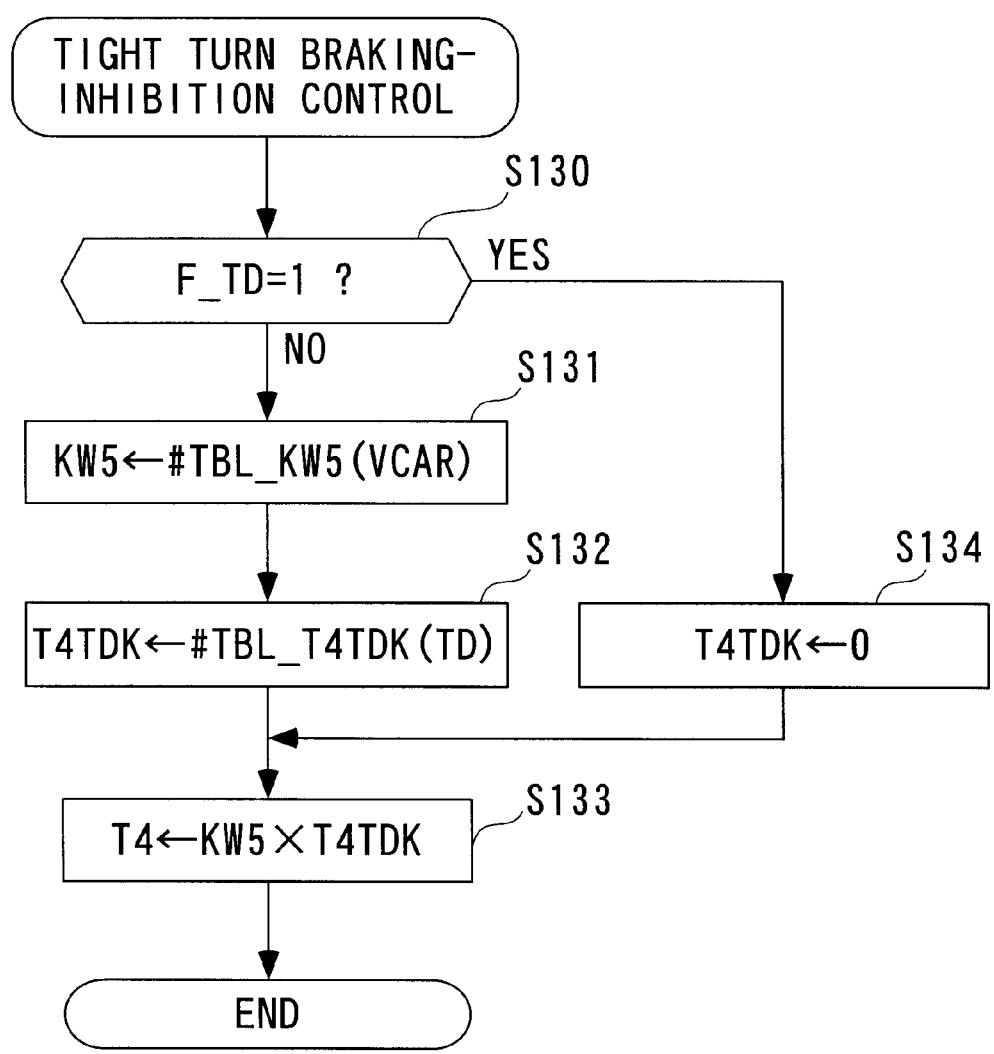
FIG. 22 is a flowchart showing a routine for carrying out a tight turn braking-inhibiting control process which is executed at a step S41 in FIG. 7.

In the following, description will be made, with reference to FIG. 22, of the tight turn braking-inhibiting control process executed at the step S41 of the front-rear distribution torque control process described above. In the tight turn braking-inhibiting control process, as described below, the aforementioned tight turn braking-inhibiting coefficient T4 is calculated based on the vehicle speed VCAR and the drive torque TD. First, it is determined at a step S130 whether or not the drive torque flag $F_{13}$ TD assumes "1".

Figure 23:
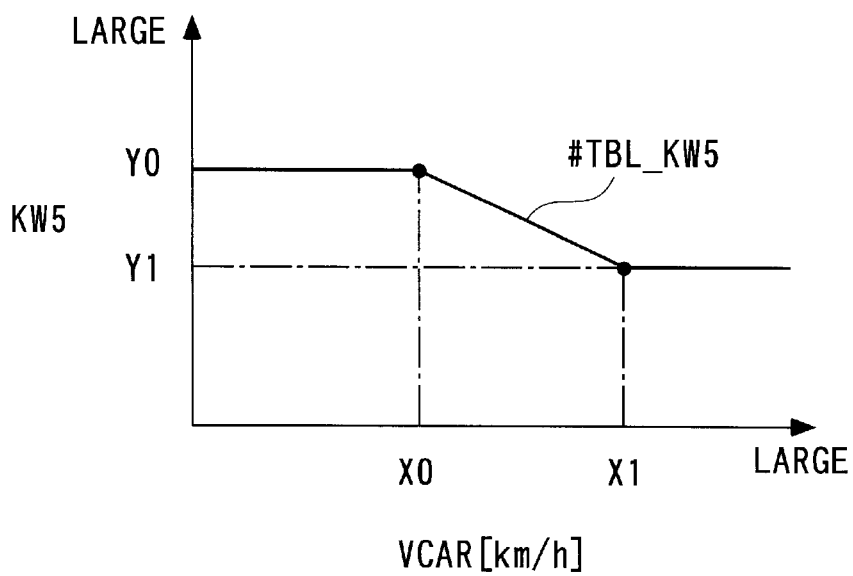
FIG. 23 is a diagram showing an example of a VCAR-KW5 table.

If the answer to the question is negative (NO), which means that the vehicle 2 is accelerating, the program proceeds to a step S131, wherein a table value #TBL_KW5 of a vehicle speed-dependent correction coefficient KW5 is retrieved from a VCAR-KW5 table an example of which is shown in FIG. 23 according to the vehicle speed VCAR, and set to the vehicle speed-dependent correction coefficient KW5.

As shown in FIG. 23, in the VCAR-KW5 table, the table value #TBL_KW5 is set to a predetermined value Y0 for a predetermined speed X0 and values lower than X0 of the vehicle speed VCAR, and to a predetermined value Y1 smaller than the predetermined value Y0 for a predetermined speed X1 and values higher than X1 of the vehicle speed VCAR. Further, the VCAR-KW5 table is configured such that as the vehicle speed VCAR increases from X0 to X1, the table value #TBL_KW5 linearly decreases. The table value #TBL_KW5 is thus set so as to reduce the tight turn braking-inhibiting coefficient T4 as the vehicle speed VCAR is higher because a tight turn braking force becomes larger as the vehicle speed VCAR is larger.

Figure 24:
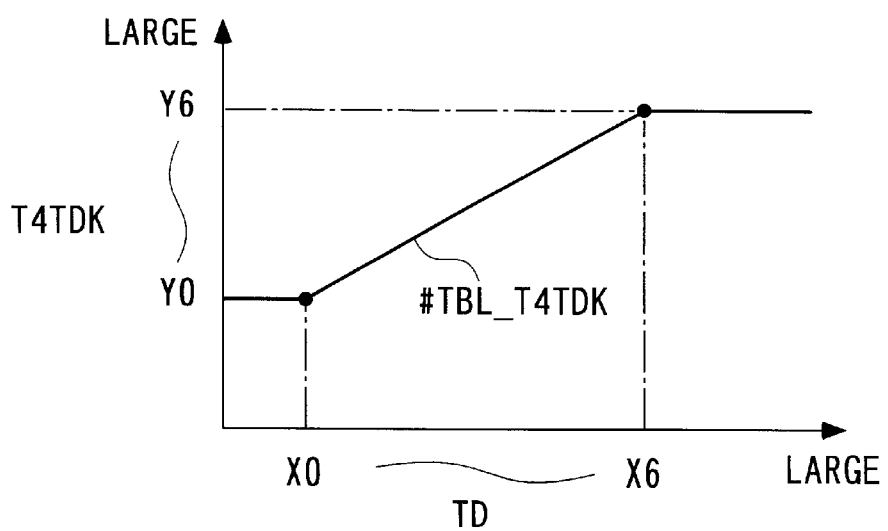
FIG. 24 is a diagram showing an example of a TD-T4TDK table.

Then, the program proceeds to a step S132, wherein a table value #TBL_T4TDK of a drive torque-dependent correction coefficient T4TDK is retrieved from a TD-T4TDK table an example of which is shown in FIG. 24 according to the drive torque TD to obtain, and set to the coefficient T4TDK.

As shown in the figure, in the TD-T4TDK table, the table value #TBL_T4TDK is set to a predetermined value Y0 for a predetermined value X0 and values smaller than X0 of the drive torque TD, and to a predetermined value Y6 larger than the predetermined value Y0 for a predetermined value X6 and values larger than X6 of the drive torque TD. Further, TD-T4TDK table is configured such that as the drive torque TD increases from X0 to X6, the table value #TBL_T4TDK assumes a larger value. The table value #TBL_T4TDK is thus set so as to increase the tight turn braking-inhibiting coefficient T4 as the drive torque is larger because with an increase in the drive torque TD, the degree of the advancing force of the vehicle 2 overcoming a tight turn braking force becomes larger, which makes tight turn braking less prone to occur.

Then, at a step S133, the tight turn braking-inhibiting coefficient T4 is set to the product of the vehicle speed-dependent correction coefficient KW5 obtained at the step S131 and the drive torque-dependent correction coefficient T4TDK obtained at the step S132, followed by terminating the program.

On the other hand, if the answer to the question of the step S130 is affirmative (YES), i.e. if the vehicle is in stoppage or being decelerated, the drive torque-dependent correction coefficient T4TDK is set to 0 at a step S134, followed by the program proceeding to the step S133. Thus, the drive torque-dependent correction coefficient T4TDK is held at 0 during the stoppage or deceleration of the vehicle 2.

By setting the VATC torque T0 to a value obtained by multiplying the intermediate VATC torque value T1 by the tight turn braking-inhibiting coefficient T4 as described hereinbefore in the description of the T0-calculating process executed at the step S42 of the front-rear distribution torque control process, it is possible to reliably prevent occurrence of tight turn braking phenomenon.

Next, the control amount-limiting process included in the VATC control process executed at the step S1 in FIG. 2 will be described with reference to FIG. 25. In the control amount-limiting process, as described below, the final desired VATC torque value TOBJM is calculated based on the POSI value and an initial flag F_IGDLY2.

Figure 26:
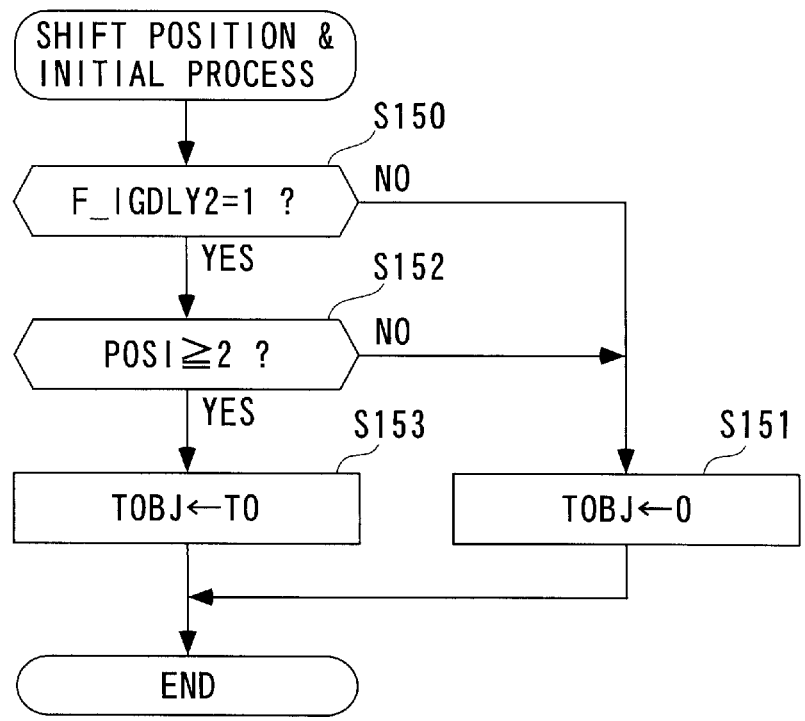
FIG. 26 is a flowchart showing a routine for carrying out a shift position & initial process which is executed at a step S140 in FIG. 25.

First, at a step S140, a shift position & initial process is executed to determine a semi-final desired VATC torque value TOBJ. In the following, the shift position & initial process will be described with reference to FIG. 26.

In the process, first, it is determined at a step S150 whether or not the initial flag F_IGDLY2 assumes "1". The initial flag F_IGDLY2 is held at "0" until a predetermined time period (e.g. 1 sec.) elapses after the start of the engine 3, and set to "1" after the lapse of the predetermined time period.

If the answer to the question of the step S150 is negative (NO), which means that the engine 3 has just been started, the semi-final desired VATC torque value TOBJ is set to 0 at a step S151, followed by terminating the program. The step is executed to inhibit calculation of the semi-final desired VATC torque value TOBJ because the operating condition of the engine 3 is unstable immediately after the start.

On the other hand, if the answer to the question of the step S150 is affirmative (YES), which means that the predetermined time period has elapsed after the start of the engine 3, the program proceeds to a step S152, wherein it is determined whether or not the POSI value is equal to or larger than 2.

If the answer to the question is negative (NO), which means that the shift position is "N" or "P", or that the shift lever is in the no-position state, the semi-final desired VATC torque value TOBJ is set to 0 at the step S151, followed by terminating the program. The reason why the semi-final desired VATC torque value TOBJ is set to 0 is that it is not required to distribute torque to the rear wheels W3, W4 when the shift position is "N" or "P", or when the shift lever is in the no-position state.

On the other hand, if the answer to the question of the step S152 is affirmative (YES), i.e. if POSI≧2 holds which means that a shift position for forward or reverse drive operation is selected, at the following step 153, the semi-final desired VATC torque value TOBJ is set to the VATC torque T0 calculated by the T0-calculating process executed at the step S42, followed by terminating the program. The VATC torque T0 is obtained by multiplying the intermediate VATC torque value T1 by the tight turn braking-inhibiting coefficient T4 as described hereinbefore, so that the VATC torque T0 faithfully reflects the actual accelerating condition of the vehicle 2.

Figure 25:
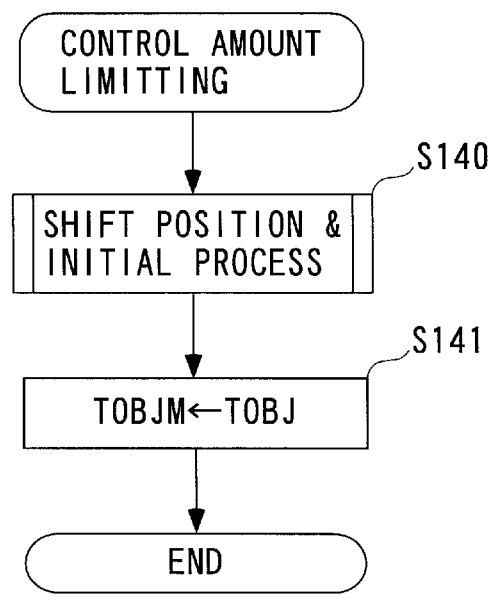
FIG. 25 is a flowchart showing a main routine for carrying out a control amount-limiting process.

After the shift position & initial process is executed at the step S140 as described above, the program proceeds to a step S141 in FIG. 25, and the final desired VATC torque value TOBJM is set to the semi-final desired VATC torque value TOBJ obtained at the step S140, followed by terminating the program.

As described above, in the VATC control process, the final desired VATC torque value TOBJM is calculated only when the engine 3 is in a stable operating condition after its start, and when a shift position for forward or reverse drive operation is selected and it is required to distribute torque to the rear wheels W3, W4. Further, the final desired VATC torque value TOBJM is set to the VATC torque T0 which faithfully reflects the actual accelerating condition of the vehicle 2, and hence, differently from a conventional method in which torque to be distributed is calculated based on the throttle opening, the present embodiment makes it possible to distribute a proper amount of torque to the rear wheels W3, W4 based on the final desired VATC torque value TOBJM while reflecting the actual accelerating condition of the vehicle 2 thereon, thereby enhancing the startability and fuel economy of the vehicle 2.

As described above, the VATC torque T0 is calculated based on the intermediate VATC torque value T1, which is progressively increased by the MT•JOB process until the average rear-wheel speed VRR becomes equal to or higher than the third predetermined speed #VREF3, when one of the filtered left and right front-wheel speeds FVW1, FVW2 is equal to or higher than the first predetermined speed #VREF1 and at the same time the other is lower than the same, or when the average rear-wheel speed VRR is lower the third predetermined speed #VREF 3 and the average front-wheel speed VFR is equal to or higher than the second predetermined speed #VREF2 (=the third predetermined speed #VREF 3), in other words, when at least one of the left and right front wheels W1, W2 is slipping or when a difference in speed is produced between the front wheels and the rear wheels.

Thus, the final desired VATC torque value TOBJM can be properly determined according to the slipping state of the front wheels W1, W2. Particularly, according to the present embodiment, in cases where the filtered vehicle acceleration XGF1F of the vehicle 2 tends to be smaller by stepping on the accelerator pedal slowly or softly e.g. during the start of the vehicle 2 on an icy road surface, it is possible to start the vehicle 2 smoothly when at least one of the front wheels W1, W2 is slipping since the final desired VATC torque value TOBJM of torque distributed to the rear wheels W3, W4 is increased, as described above.

Figure 27:
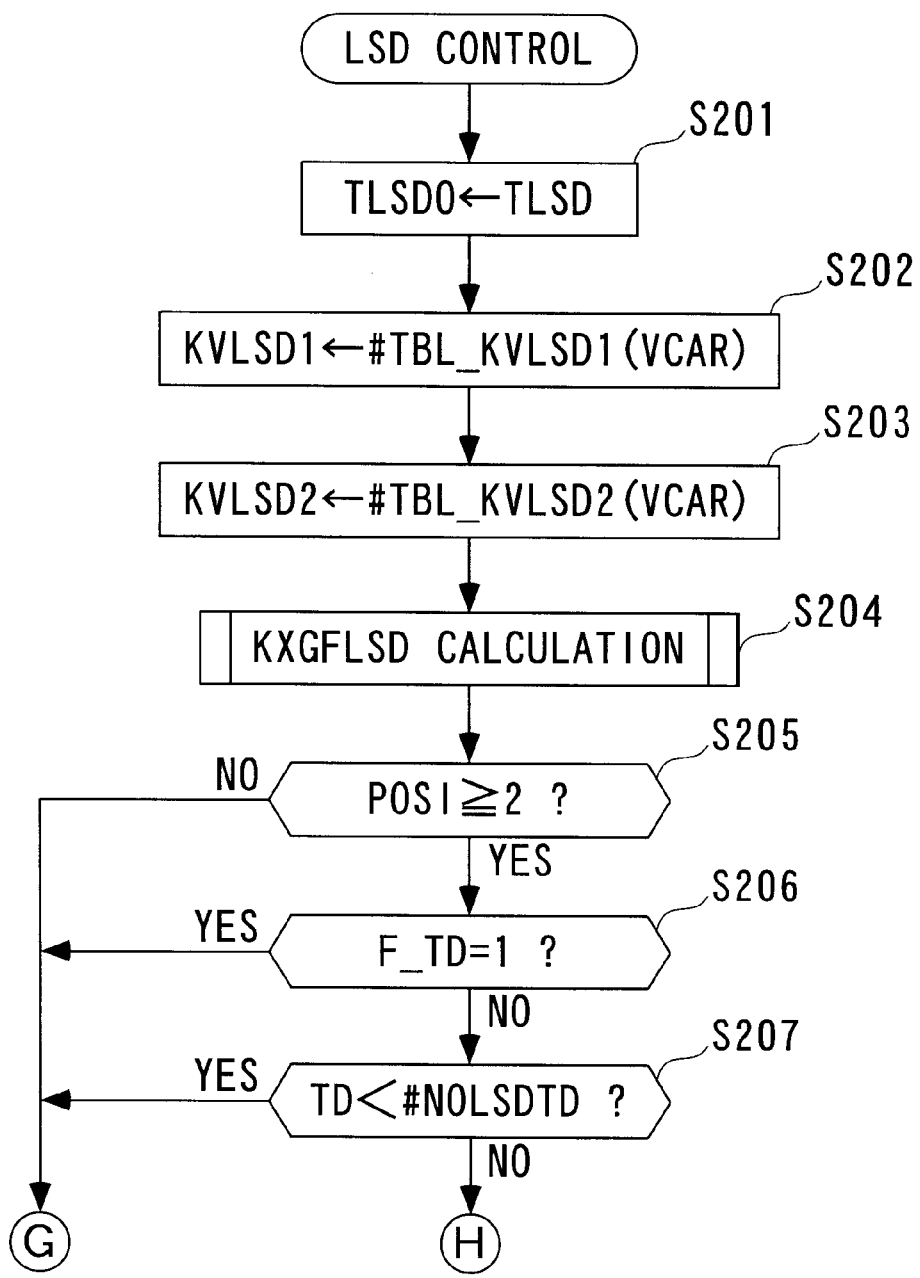
FIG. 27 is a flowchart showing part of a main routine for carrying out an LSD control process.
Figure 28:
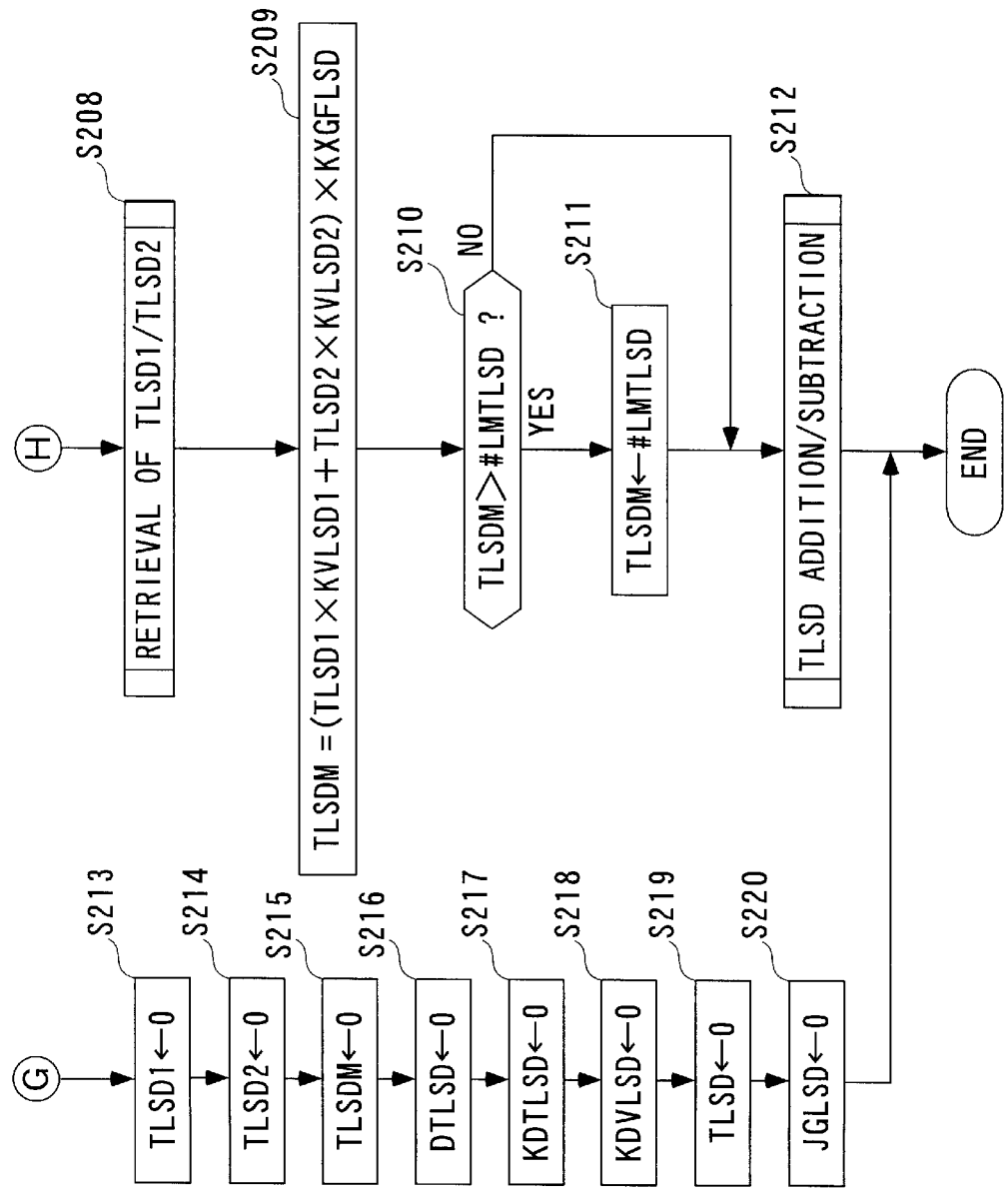
FIG. 28 is a continuation of the FIG. 27 flowchart.

In the following, the LSD control process executed at the step S2 will be described with reference to FIGS. 27 and 28. This process is executed to calculate the LSD torque TLSD based on the front-wheel and rear-wheel speeds VW1 to VW4, the drive torque TD, and so forth. As shown in the figures, in the process, first at a step S201, an LSD torque TLSD calculated in the immediately preceding loop is set to a preceding value TLSDO of the LSD torque.

Then, the program proceeds to a step S202, wherein a table value #TBL_KVLSD1 is retrieved from a VCAR-KVLSD1 table an example of which is shown in FIG. 29 according to the vehicle speed VCAR, and set to a TLSD1 correction coefficient KVLSD1. The vehicle speed VCAR is determined by correcting the smaller one of the left and right rear-wheel speeds VW3, VW4 in dependence on the accelerating or decelerating condition of the vehicle 2.

As shown in FIG. 29, in the VCAR-KVLSD1 table, the table value #TBL_KVLSD1 is set to a predetermined value Y0 (1.0) for a predetermined value X0 of the vehicle speed VCAR and values of the same smaller X0, and to a predetermined value Y1 smaller than the predetermined value Y0 for a predetermined value X1 of the vehicle speed VCAR and values of the same larger than X1. Further, the VCAR-KVLSD1 table is configured such that the table value #TBL_KVLSD1 linearly decreases as the vehicle speed VCAR increases from X0 to tX1. The reason for this is that as the vehicle speed VCAR is higher, the front wheels W1, W2 as the main drive wheels are less prone to slip, so that smaller amounts of torque are required for driving the rear wheels W3, W4.

Then, the program proceeds to a step S203, wherein a table value #TBL_KVLSD2 is retrieved from a VCAR-KVLSD2 table configured similarly to the VCAR-KVLSD1 in FIG. 29, according to the vehicle speed VCAR, and set to a TLSD2 correction coefficient KVLSD2.

The VCAR-KVLSD2 table is configured similarly to the VCAR-KVLSD1 table in FIG. 29 such that the table value #TBL_KVLSD2 exhibits a similar tendency to the table value #TBL_KVLSD1 shown in FIG. 4 with respect to the vehicle speed VCAR, but each individual table value #TBL_KVLSD2 is different from a corresponding individual table value #TBL_KVLSD1. The reason for this is that, as described above, as the vehicle speed VCAR is higher, the front wheels W1, W2 as the main drive wheels are less prone to slip, so that smaller amounts of torque are required for driving the rear wheels W3, W4.

Then, the program proceeds to a step S204, wherein an KXGFLSD-calculating process, described in detail hereinafter, is executed to calculate an acceleration-dependent LSD correction coefficient KXGFLSD.

Thereafter, the program proceeds to a step S205, wherein it is determined whether or not the POSI value is equal to or larger than 2. If the answer to the question is affirmative (YES), which means that the shift position is any of the "1" to "D5" and "R", the program proceeds to a step S206, wherein it is determined whether or not a drive torque flag F_TD assumes "1".

If the answer to the question of the step S206 is negative (NO), i.e. if the vehicle is accelerating, the program proceeds to a step S207, wherein it is determined whether or not the drive torque TD is smaller than a predetermined value #NOLSDTD.

If the answer to the question of the step S207 is negative (NO), i.e. if TD≧#NOLSDTD holds, the program proceeds to a step S208 in FIG. 28, wherein first and second LSD torques TLSD1, TLSD2 are determined by a TLSD1/TLSD2 retrieving process described in detail hereinafter.

Then, the program proceeds to a step S209, wherein a desired LSD torque value TLSDM is calculated by using the following equation (5):

$$TLSDM = (TLSD1 \times KVLSD1 + TLSD2 \times KVLSD2) \times KXGFLSD \quad (5)$$

At the following steps 210, 211, limit-checking of the desired LSD torque value TLSDM obtained as above is carried out. More specifically, it is determined at the step S210 whether or not the desired LSD torque value TLSDM is larger than an upper limit value #LMTLSD, and if TLSDM >#LMTLSD holds, the program proceeds to the step S211, wherein the desired LSD torque value TLSDM is set to the upper limit value #LMTLSD.

On the other hand, if TLSDM≦#LMTLSD holds at the step S210, the step S211 is skipped.

After execution of the limit-checking process at the steps S210, S211, the LSD torque TLSD is calculated by a TLSD adding/subtracting process, described in detail hereinafter, at a step S212, followed by terminating the program.

If the answer to the question of the step S205 is negative (NO), i.e. if POSI=1 or 0 holds, which means that the shift position is "N" or "P" or the shift lever is in no-position, the first LSD torque TLSD1, the second LSD torque TLSD2 and the desired LSD torque value TLSDM are set to 0 at respective steps S213 to S215.

Then, at respective steps S216 to 220, a difference DTLSD, first and second addition/subtraction adjusting coefficients KDTLSD and KDVLSD, the LSD torque TLSD, and a front-wheel/rear-wheel slip ratio threshold JGLSD are set to 0, followed by terminating the program. The difference, coefficients and threshold are described in detail hereinafter.

Figure 30:
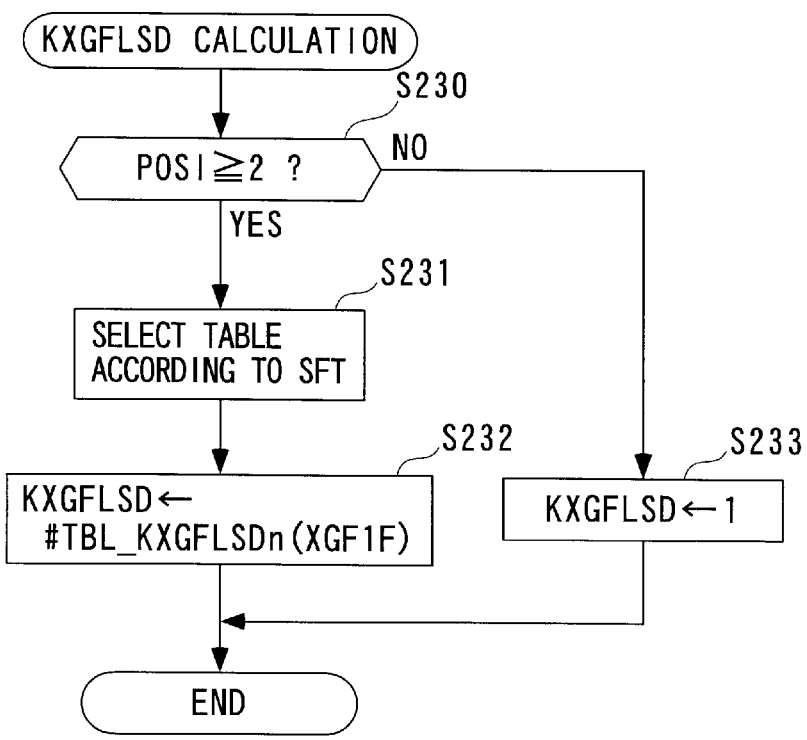
FIG. 30 is a flowchart showing a routine for carrying out a KXGFLSD-calculating process.

In the following, the KXGFLSD-calculating process executed at the step S204 will be described in detail with reference to FIG. 30. As described below, the process is executed to calculate the acceleration-dependent LSD correction coefficient KXGFLSD based on the POSI value, the SFT value, and the filtered vehicle acceleration XGF1F. First, it is determined at a step S230 whether or not the POSI value is equal to or larger than 2.

Figure 31:
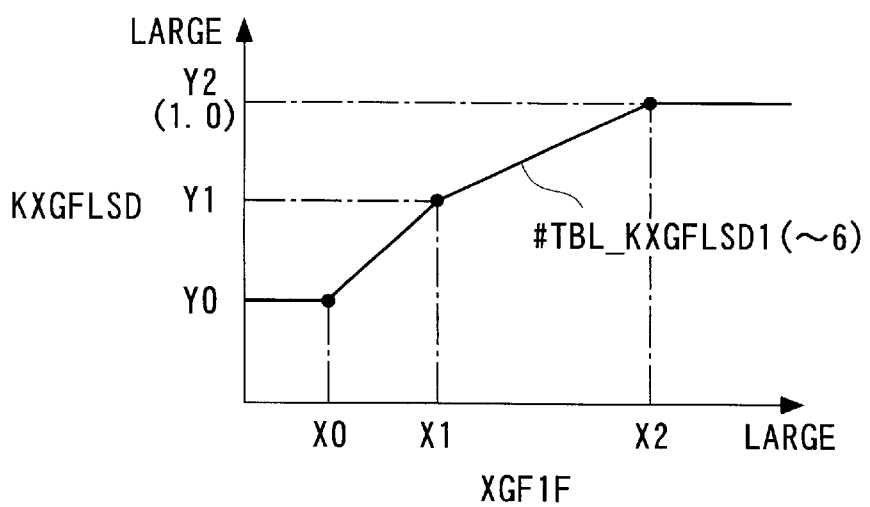
FIG. 31 is a diagram showing an example of an XGF1F-KXGFLSD table.

If the answer to the question is affirmative (YES), which means that the shift position is one of "1" to "D5" and "R", the program proceeds to a step S231, wherein one of XGF1F-KXGFLSDn tables (n=1 to 6) an example of which is shown in FIG. 31 is selected according to the SFT value. Then, at the following step S232, a table value #TBL_KXGFLSDn is retrieved from the selected XGF1F-KXGFLSDn table according to the filtered vehicle acceleration XGF1F, and set to the acceleration-dependent LSD correction coefficient KXGFLSD, followed by terminating the program.

AS the XGF1F-KXGFLSDn tables for selection at the step S231, there are provided six tables for the respective first to fifth speed gear positions and reverse gear position in a manner corresponding respectively to the SFT values 1 to 6. FIG. 31 shows the XGF1F-KXGFLSDn table for the first speed gear position. As shown in the figure, the table value #TBL__KXGFLSD1 is set to a predetermined value Y0 for a predetermined speed X0 of the filtered vehicle acceleration XGF1F and values of the same smaller than X0, and to a predetermined value Y2 (1.0) larger than the predetermined value Y0 for a predetermined speed X2 of the filtered vehicle acceleration XGF1F and values of the same larger than X2. Further, the XGF1F-KXGFLSDn table is configured such that the table value #TBL__KXGFLSD1 decreases as the filtered vehicle acceleration XGF1F decreases from X2 to X0.

The table value #TBL__KXGFLSD1 is set as described above so as to decrease the LSD torque TLSD when acceleration of the vehicle 2 is not required, e.g. during release of the accelerator pedal. Further, the LSD torque TLSD is calculated, as described hereinafter, based on parameters indicative of speeds and accelerations of the wheels W1 to W4 besides the acceleration-dependent LSD correction coefficient KXGFLSD, so that if the LSD torque TLSD is calculated without using the acceleration-dependent LSD correction coefficient KXGFLSD, the output torque from the engine 3, i.e. a parameter indicative of the drive torque for driving the wheels W1 to W4 is omitted, which may cause disagreement between the LSD torque TLSD and torque required for the acceleration of the vehicle 2. For this reason, the table value #TBL__KXGFLSD1 is set as above for proper distribution of the LSD torque TLSD to the rear wheels W3, W4 which agrees with torque required for the acceleration of the vehicle 2. Thus, for example, when the accelerator pedal is not stepped on since the surface resistance μ of a road is small, and hence the filtered vehicle acceleration XGL1F is low, it is possible to prevent a larger LSD torque TLSD than a torque required for acceleration of the vehicle 2 from being distributed to the rear wheels W3, W4. As a result, slip of the rear wheels W3, W4 caused by such excessively large torque can be prevented. In short, it is possible to correct the LSD torque TLSD properly according to the surface resistance μ of the road.

Further, the XGF1F-KXGLSDn tables are configured similarly to each other such that the table values #TBL__KXGLSDn generally exhibit a similar tendency with respect to the filtered vehicle acceleration XGF1F, but at the same time are different from each other in that in a XGF1F-KXGLSDn table for a higher gear position, each individual table value #TBL__KXGLSDn is smaller than a corresponding one in a XGF1F-KXGLSDn table for a lower gear position, with respect to an identical filtered vehicle acceleration XGL1F. The reason for this is that as the gear position is one for lower vehicle speeds, the inertial mass of the output-side gears and a demand by the driver for acceleration are larger, and hence a larger torque is required for driving the rear wheels W3, W4.

On the other hand, if the answer to the question of the step S230 is negative (NO), i.e. if the shift position is "N" or "P", or in no-position, the acceleration-dependent LSD correction coefficient KXGFLSD is set to 1 at a step S233, followed by terminating the program.

Figure 32:
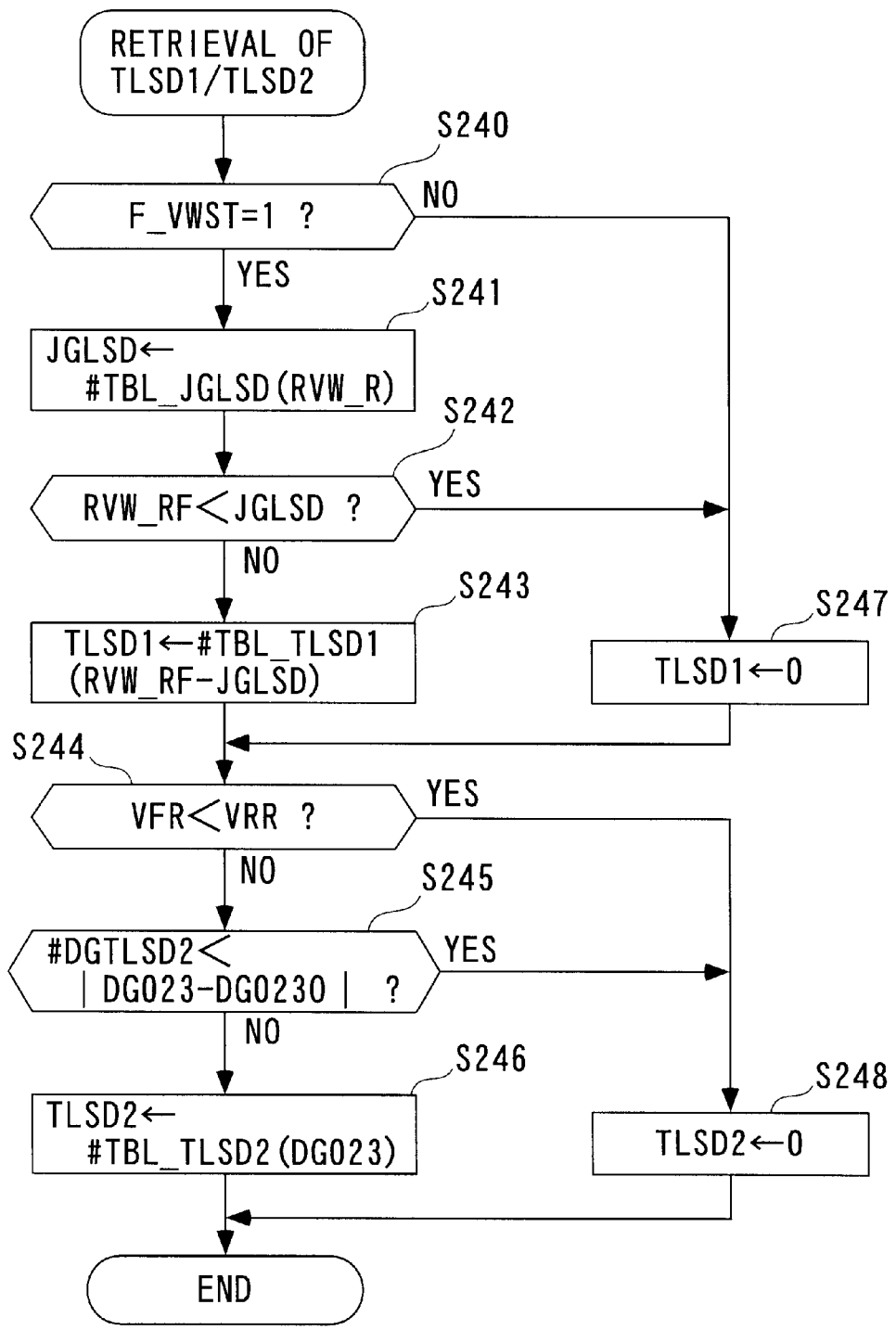
FIG. 32 is a flowchart showing a routine for carrying out a TLSD1/TLSD2-retrieving process.

Next, the TLSD1/TLSD2 retrieving process executed at the step S208 will be described in detail with reference to FIG. 32. As shown in the figure, in the process, first, it is determined at a step S240 whether or not a running flag F__VWST assumes "1". The running flag F__VWST is set to "1" when the front-wheel and rear-wheel speeds VW1 to VW4 are all equal to or higher than a predetermined speed (e.g. 5 km/h), which means that the vehicle 2 is running, and set to "0" otherwise, i.e. when the vehicle 2 is not running or in like conditions.

Figure 33:
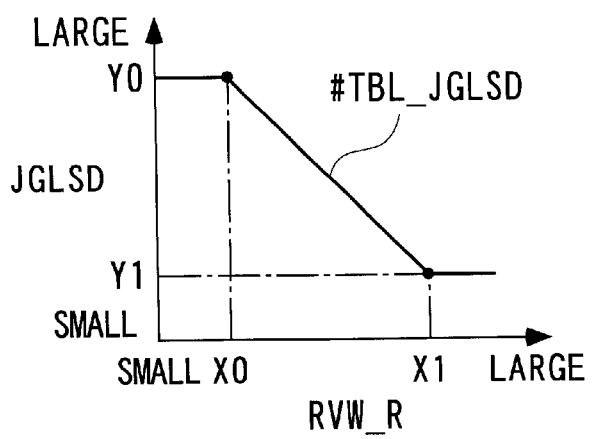
FIG. 33 is a diagram showing an example of an RVW_R-JGLSD table.

If the answer to the question is affirmative (YES), i.e. if the vehicle is running, the program proceeds to a step S241, wherein a table value #TBL__JGLSD is retrieved from an RVW_R-JGLSD table an example of which is shown in FIG. 33 according to a left/right rear-wheel speed ratio RVW_R, and set to the front-wheel/rear-wheel slip ratio threshold JGLSD. The left/right rear-wheel speed ratio RVW_R is determined by dividing the smaller one of respective values of the left and right rear-wheel speeds VW3 and VW4 by the larger one of the values, and converting the thus obtained value or quotient to a percentage. More specifically, when VW3<VW4 holds, RVW_R is equal to (VW3/VW4)×100 (%), while when VW3>VW4 holds, RVW_R is equal to (VW4/VW3)×100 (%). Further, when VW3=VW4 holds, RVW_R is equal to 100 (%).

As shown in FIG. 33, in the RVW_R-JGLSD table, the table value #TBL__JGLSD is set to a predetermined value Y0 (1.0) for a predetermined value X0 of the left/right rear-wheel speed ratio RVW_R or values of the same smaller X0, and to a predetermined value Y1 smaller than the predetermined value Y0 for a predetermined value X1 of the left/right rear-wheel speed ratio RVW_R or values of the same larger X1. Further, the RVW_R-JGLSD table is set such that the table value #TBL__JGLSD linearly increases as the left/right rear-wheel speed ratio RVW_R decreases from X1 to X0. The table value #TBL__JGLSD is thus set so as to reduce the first LSD torque TLSD1 or part of torque to be distributed to the rear wheels W3, W4, which is determined at a step S243, referred to hereinafter, as the left/right rear-wheel speed ratio RVW_R becomes larger, i.e. as the difference in speed between the rear wheels W3 and W4 becomes larger.

Then, the program proceeds to a step S242, wherein it is determined whether or not the front-wheel/rear-wheel slip ratio threshold JGLSD obtained at the step S241 is larger than a front-wheel/rear-wheel slip ratio RVW_RF. The ratio RVW_RF is obtained by dividing an average rear-wheel speed VRR by an average front-wheel speed VFR and converting the thus obtained value or quotient to a percentage (RVW_RF =(VRR/VFR)×100 (%)).

Although in the present embodiment, at the step S242, the front-wheel/rear-wheel slip ratio threshold JGLSD is determined according to the left/right rear-wheel speed ratio RVW_R, this is not limitative but the difference between the left and right rear-wheel speeds VW3 and VW4 may be used in place of the left/right rear-wheel speed ratio RVW_R to determine the front-wheel/rear-wheel slip ratio threshold JGLSD.

Figure 34:
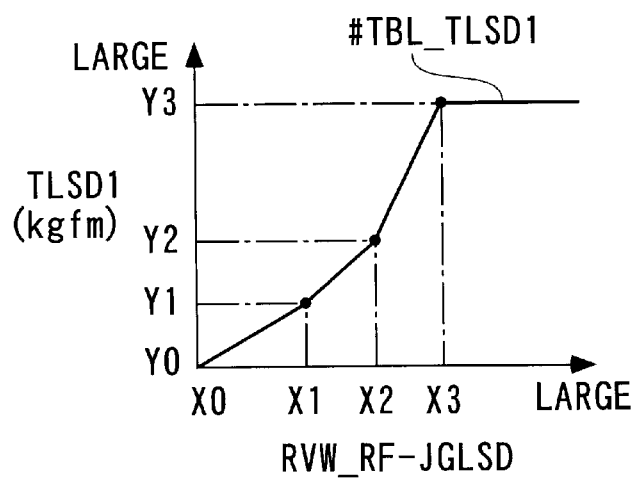
FIG. 34 is a diagram showing an example of an [RVW_RF-JCLSD]-TLSD1 table.

If the answer to the question of the step S242 is negative (NO), i.e. if RVW_RF≧JGLSD holds, the program proceeds to a step S243, wherein a table value #TBL__TLSD1 is retrieved from an [RVW_RF-JGLSD]-TLSD1 table an example of which is shown in FIG. 34 according to the difference between the front-wheel/rear-wheel slip ratio RVW_RF and the front-wheel/rear-wheel slip ratio threshold JGLSD, and set to the first LSD torque TLSD1.

As shown in FIG. 34, in the [RVW_RF-JGLSD]-TLSD1 table, the table value #TBL__TLSD1 is set to a predetermined value Y3 for a predetermined value X3 of the difference [RVW_RF-JGLSD] and values of the same larger than X3. Further, the [RVW_RF-JGLSD]-TLSD1 table is set such that the table value #TBL__TLSD1 decreases as the difference [RVW_RF-JGLSD] decreases from X3 to X0. The table value #TBL_TLSD1 is thus set so as to reduce the first LSD torque TLSD1 or part of torque to be distributed to the rear wheels W3, W4 as the difference [RVW_RF-JGLSD] becomes smaller, i.e. as the difference in speed between the rear wheels W3 and W4 becomes larger, thereby preventing occurrence of a tight turn braking phenomenon.

Although in the above embodiment, at the step S243, the first LSD torque TLSD1 is determined according to the difference [RVW_RF-JGLSD], this is not limitative but a ratio (RVW_RF/JGLSD) between the front-wheel/rear-wheel slip ratio RVW_RF and the front-wheel/rear-wheel slip ratio threshold JGLSD may be used in place of the difference [RVW_RF-JGLSD] to determine the first LSD torque TLSD1.

Then, the program proceeds to a step 244, wherein it is determined whether or not the average front-wheel speed VFR is lower than the average rear-wheel speed VRR. If the answer to the question is negative (NO), i.e. if VFR≧VRR holds, the program proceeds to a step S245, wherein it is determined whether or not the absolute value of the difference |DG023−DG023O| between the difference DG023 (=G02−G03) between an average front-wheel acceleration G02 and an average rear-wheel acceleration G03 and the immediately preceding value of the difference DG023 is larger than a predetermined threshold #DGTLSD2.

Figure 35:
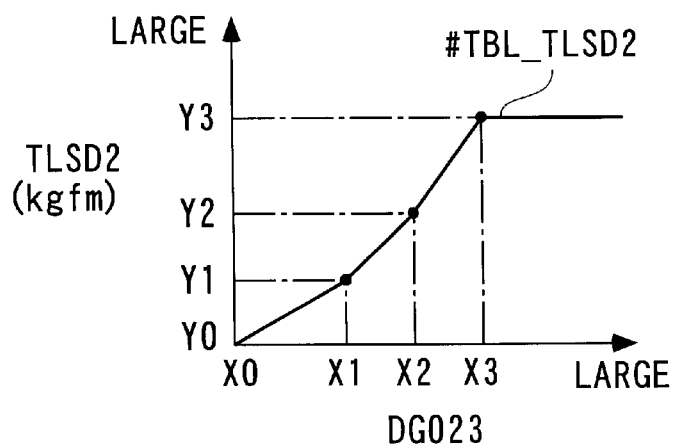
FIG. 35 is a diagram showing an example of a DG023-TLSD2 table.

If the answer to the question of the step S245 is negative (NO), i.e. if |DG023−DG023O|≦#DGTLSD2 holds, the program proceeds to a step S246, wherein a table value #TBL_TLSD2 is retrieved from a DG023-TLSD2 table an example of which is shown in FIG. 35 according to the difference DG023, and set to the second LSD torque TLSD2, followed by terminating the program.

As shown in FIG. 35, in the DG023-TLSD2 table, the table value #TBL_TLSD2 is set to a predetermined value Y3 for a predetermined value X3 of the difference DG023 and values of the same larger than X3. Further, the DG023-TLSD2 table is configured such that the table value #TBL_TLSD2 increases as the difference DG023 increases from X0 to X3. The table value #TBL_TLSD2 is thus set so as to increase the second LSD torque TLSD2 or part of torque to be distributed to the rear wheels W3, W4 as the difference DG023 is larger, i.e. as the extent to which the average front-wheel acceleration G02 exceeds the average rear-wheel acceleration G03 is larger, thereby enhancing the response of slippage-eliminating control carried out on the front wheels W1, W2.

Although in the present embodiment, at the step S246, the second LSD torque TLSD2 is determined based on the difference DG023, this is not limitative but a ratio (G02/G03) between the average front-wheel acceleration G02 and the average rear-wheel acceleration G03 may be used in place of the difference DG023 to determine the second LSD torque TLSD2.

On the other hand, if the answer to the question of the step S240 is negative (NO), or if the answer to the question of the step S242 is affirmative (YES), the first LSD torque TLSD1 is set to 0 at a step S247, followed by the program proceeding to the steps S244 et seq. In other words, when the vehicle 2 is in stoppage or running straight, the first LSD torque TLSD1 is not distributed to the rear wheels W3, W4.

If the answer to the question of the step S244 or S245 is affirmative (YES), the second LSD torque TLSD2 is set to 0 at a step S248, followed by terminating the program. More specifically, if VRF≧VRR holds, which means that the front wheels W1, W2 are slipping, or if the absolute value of the difference |DG023−DG023O|≧#DGTSLD2 holds, which means that the absolute value of the difference |DG023−DG023O| is so large as will cause a torque step (stepped increase in torque), the second LSD torque TLSD2 is not distributed to the rear wheels W3, W4.

Next, the TLSD adding/subtracting process executed at the step S212 will be described. In this process, the LSD torque TLSD is calculated, based on the desired LSD torque value TLSDM determined at the step S211, by using the following equation (6):

$$TLSD = TLSDO + KDTLSD \times KVTLSD \times DTLSD \tag{6}$$

wherein DTLSD represents the difference (=TLSDM−TLSDO) between the desired LSD torque value TLSDM and the immediately preceding value TLSDO of the LSD torque TLSD. When TLSDM>TLSDO holds, the difference DTLSD assumes a positive value, whereas when TLSDM<TLSDO holds, it assumes a negative value. Further, when TLSDM=TLSDO holds, the difference DTLSD is equal to 0. Accordingly, when TLSDM ≠TLSDO holds, the second term KDTLSD×KVTLSD×DTLSD on the right side of the equation (6) is added to or subtracted from the immediately preceding value TLSDO in dependence on whether the difference DTLSD assumes a positive value or a negative value.

Figure 36:
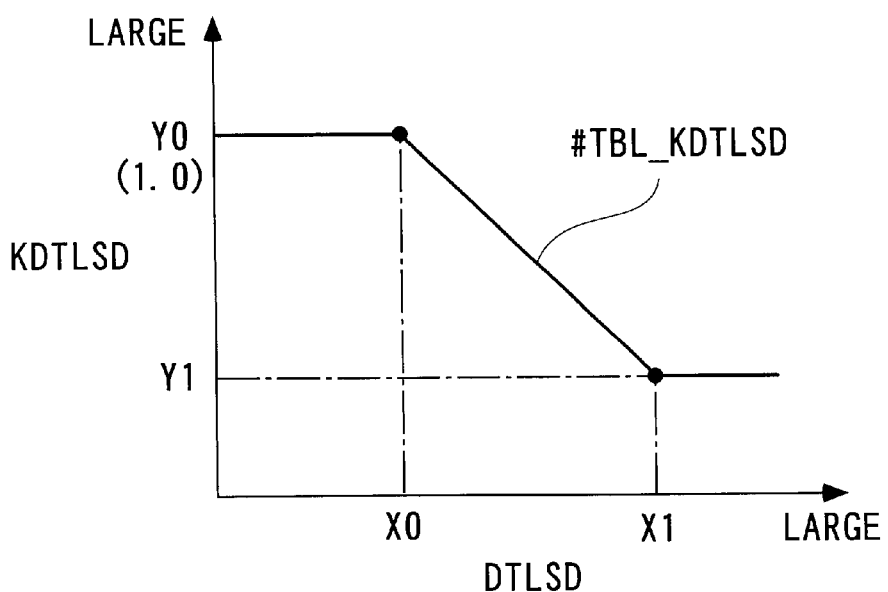
FIG. 36 is a diagram showing an example of a DTLSD-KDTLSD table.

Further, the first addition/subtraction adjusting coefficient KDTLSD in the equation (6) is set to a table value #TBL_KDLSD retrieved from a DTLSD-KDTLSD table an example of which is shown in FIG. 36 according to the difference DTLSD. As shown in the figure, the table value #TBL_KDLSD is set to a predetermined value Y0 (1.0) for a predetermined value X0 of the difference DTLSD or values of the same smaller than X0, and to a predetermined value Y1 smaller than the predetermined value Y0 for a predetermined value X1 of the difference DTLSD and values of the same larger than X1. Further, the DTLSD-KDTLSD table is configured such that the table value #TBL_KDTLSD linearly decreases as the difference DTLSD increases from X0 to X1. The table value #TBL_KDTLSD is thus set so as to prevent occurrence of a large torque step since the torque step becomes larger as the difference DTLSD becomes larger.

There are two kinds of DTLSD-KDTLSD tables provided for selection in dependence on whether the difference DTLSD is positive or negative. The two kinds of DTLSD-KDTLSD tables are configured similarly to each other such that the table values "#TBL_KDLSD exhibit similar tendency, but each individual table value #TBL_KDLSD is different from a corresponding individual table value #TBL_KDLSD.

Figure 37:
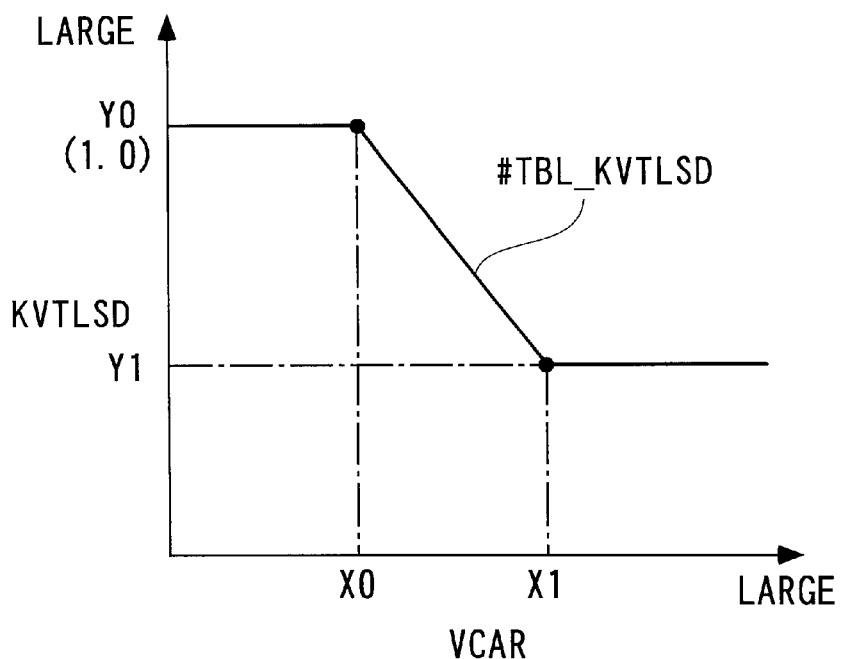
FIG. 37 is a diagram showing an example of a VCAR-KVTLSD table.

On the other hand, the second addition/subtraction adjusting coefficient KVTLSD in the equation (6) is set to a table value #TBL_KVLSD retrieved from a VCAR-KDTLSD table an example of which is shown in FIG. 37 according to the vehicle speed VCAR. As shown in the figure, the table value #TBL_KVTLSD is set to a predetermined value Y0 (1.0) for a predetermined speed X0 of the vehicle speed VCAR and values of the same smaller than X0, and a predetermined value Y1 smaller than the predetermined value Y0 for a predetermined speed X1 of the vehicle speed VCAR and values of the same larger than X1. Further, the VCAR-KDTLSD table is configured such that the table value #TBL_KVTLSD linearly decreases as the vehicle speed VCAR increases from X0 to X1. The table value #TBL_KVTLSD is thus set so as to prevent occurrence of a large torque step since the torque step becomes larger as the vehicle speed VCAR becomes higher.

According to the driving force control system of the above embodiment, the LSD torque TLSD is calculated based on the first LSD torque TLSD1, the second LSD torque TLSD2, and the acceleration-dependent LSD correction coefficient KXGFLSD. When the first LSD torque TLSD1 for use in the calculation of the LSD torque TLSD is calculated, the difference [RVW_RF−JGLSD] is determined based on the wheel speeds VW1 to VW4 detected by the wheel speed sensors 25, and the first LSD torque TLSD1 is calculated such that it assumes a smaller value as the difference [RVW_RF−JGLSD] is smaller, i.e. as the difference in speed between the left and right rear wheels VW3, VW4 is larger. As a result, the engagement forces of the left and right electromagnetic clutches 10, 10 can be set such that even when a tight turn braking force acts on the vehicle 2 when the vehicle 2 is performing cornering at a relatively low-speed on a road surface having a high frictional resistance e.g. on a paved road surface, one of the rear wheels W3, W4 is inhibited from rotating by the braking force, while the other is allowed to rotate with slip of the associated clutch, whereby it is possible to prevent occurrence of tight turn braking phenomenon. As a result, the above-mentioned advantageous effects can be obtained by using only the wheel speed sensors 25, and omitting the use of sensors conventionally used, such as a steering angle sensor, a yaw rate sensor, and a lateral acceleration sensor, whereby manufacturing costs can be reduced.

Further, when the second LSD torque TLSD2 is calculated, the second LSD torque TLSD2 to be distributed to the rear wheels W3, W4 is set to a larger value as the difference DGO23 is larger, i.e. as the extent to which the average front-wheel acceleration GO2 exceeds the average rear-wheel acceleration GO3 is larger, causing an increased amount of slip of the front wheels W1, W2. That is, the slippage- eliminating control for the front wheels W1, W2 can be carried out based on the difference DGO23 between the average front-wheel acceleration GO2 and the average rear-wheel acceleration GO3, which reflects a slipping state of the front wheels W1, W2 on more of a real time basis, so that it is possible to enhance the response of the slippage-eliminating control compared with the prior art in which the slippage-eliminating control is started after detection of a difference in speed between the main drive wheels and the auxiliary drive wheels.

Further, the TLSD1 correction coefficient KVLSD1 and the TLSD2 correction coefficient KVLSD2 for multiplying the respective first and second LSD torques TLSD1 and TLSD2 are set such that each of the coefficients KVLSD1 and KVLSD2 is linearly reduced as the vehicle speed VCAR increases from the predetermined value X0 to the predetermined value X1. Therefore, torque to be distributed to the rear wheels W3, W4 is controlled such that it becomes smaller as the vehicle speed VCAR increases. In the four-wheel drive vehicle 2, in general, as the vehicle speed VCAR becomes larger, the front wheels W1, W2 are less prone to slip, and hence the amounts of the torque required for driving the rear wheels W3, W4 are decreased. Therefore, the above control makes it possible to make the operating state of the vehicle 2 progressively closer to the front-wheel drive mode as the torque for driving the rear wheels W3, W4 decreases. As a result, it is possible to reduce the size of the driving system of the vehicle 2 including the electromagnetic clutches 10, 10. Further, since the operating state of the vehicle 2 becomes closer to the two-wheel drive mode as the vehicle speed VCAR becomes higher, it is possible to reduce the rotational resistance of the driving system by an extent that the operating state of the vehicle becomes closer to the two-wheel drive mode, thereby improving the fuel economy of the engine.

Moreover, between the predetermined values X0 and X2 of the filtered vehicle acceleration XGF1F, as the filtered vehicle acceleration XGF1F is smaller, the acceleration-dependent LSD correction coefficient KXGFLSD is set to a smaller value. Further, the acceleration-dependent LSD correction coefficient KXGFLSD is set such that the correction coefficient KXGFLSD assumes a larger value for a lower-speed gear position than for a higher-speed gear position with respect to an identical value of the filtered vehicle acceleration XGL1F. As a result, when acceleration is not demanded e.g. during release of the accelerator pedal, the LSD torque TLSD can be decreased accordingly. Further, it is also possible to increase the LSD torque TLSD as the gear position is one for lower vehicle speeds, i.e. as larger amounts of the torque are required for driving the rear wheels W3, W4 with an increase in each of the inertial mass of the output-side gears and the driver's demand for acceleration. In addition, since the acceleration-dependent LSD correction coefficient KXGFLSD can be obtained based on the filtered vehicle acceleration XGF1F determined based on the drive torque TD, it is possible to determine the LSD torque TLSD as an appropriate value commensurate with a torque demanded by the acceleration of the vehicle 2. Thus, differently from the prior art in which the LSD torque TLSD is determined e.g. from the difference in speed between the front and rear wheels, the present embodiment makes it possible to prevent the LSD torque TLSD from exceeding the torque demanded by the acceleration of the vehicle 2, thereby preventing the slip of the rear wheels W3, W4 on a road having a small surface resistance $\mu$ as described herein above.

Next, the lock mode control process executed at the step S3 in FIG. 2 will be described with reference to FIGS. 38 and 39.

Figure 38:
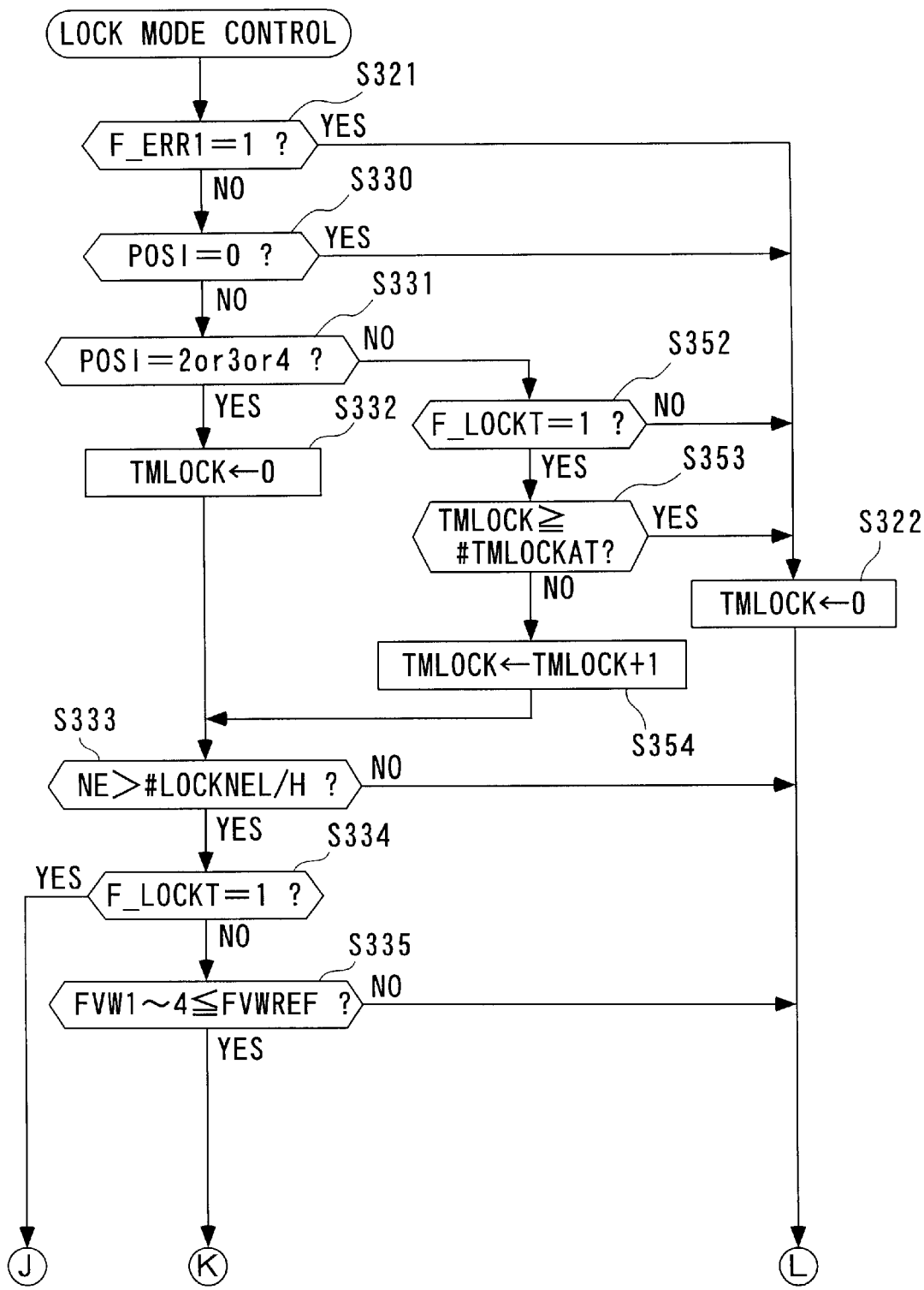
FIG. 38 is a flowchart showing a main flow for carrying out a lock mode control process which is executed at a step S3 in FIG. 2.
Figure 39:
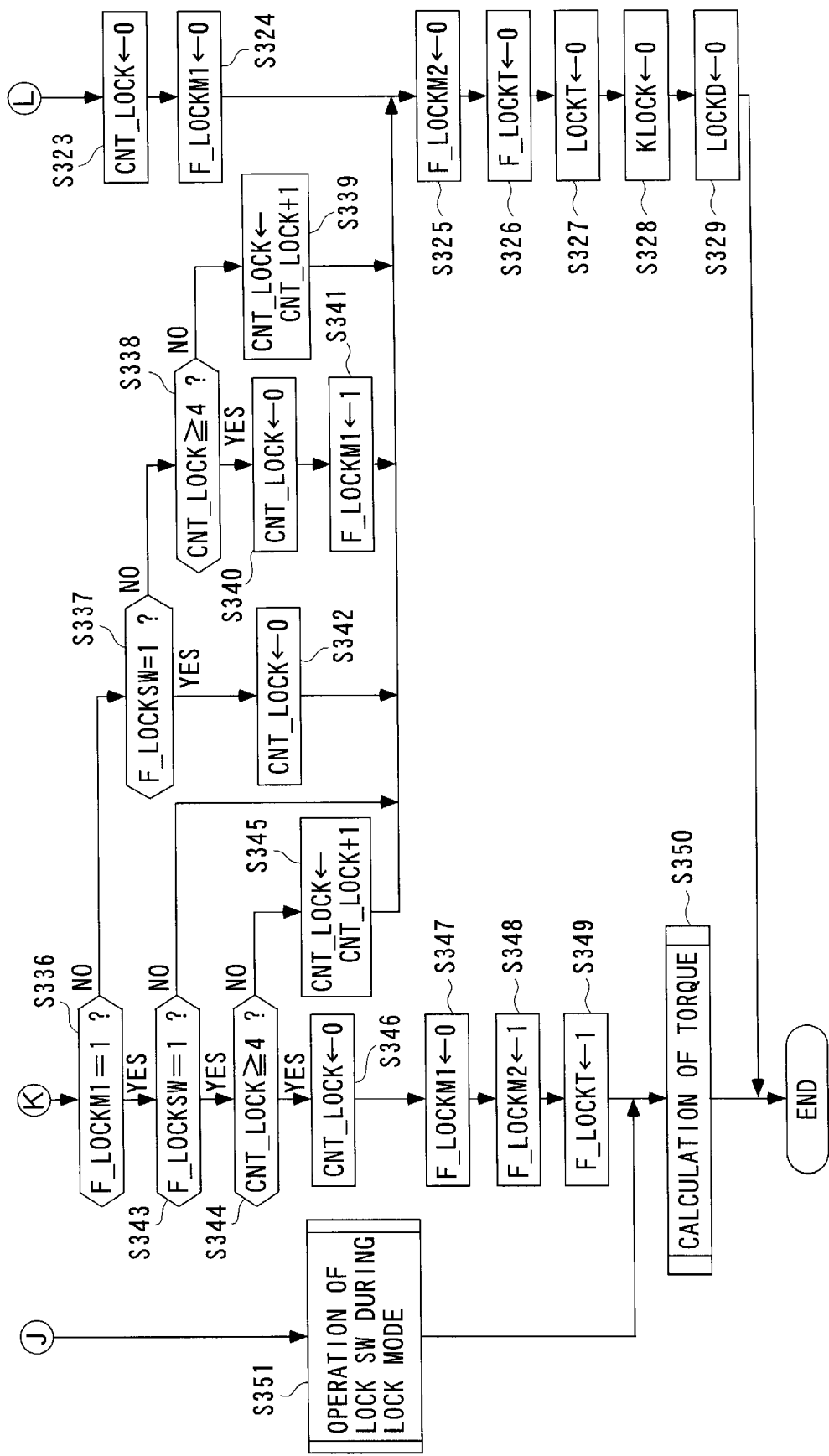
FIG. 39 is a continuation of the FIG. 38 flowchart.

FIGS. 38 and 39 show a main routine for carrying out a lock mode control process. This program is executed at predetermined time intervals. It should be noted that in the following description, a mark # is added to each of heads of fixed values that are stored beforehand in the ROM as data items and table values, so as to show the fixed values in a state distinguishable from other variables that are stored in the RAM and updated.

In the lock mode control process, first, it is determined at a step S321 whether or not a fail flag F_ERR1 assumes "1". If the answer to the question is affirmative (YES), i.e. if failure of the control system has already been determined, the program proceeds to steps S322 to S329 without executing the lock mode, whereby a lock mode cancellation timer TMLOCK, a lock counter CNT_LOCK, a lock mode-setting switching condition satisfaction flag F_LOCKM1, a lock mode-canceling switching condition satisfaction flag F_LOCKM2, a lock mode flag F_LOCKT, a basic value LOCKT of the lock-mode transmitted torque, a power-saving coefficient KLOCK, and the lock-mode transmitted torque LOCKD, all referred to hereinafter, are set to "0", at respective steps, followed by terminating the program.

On the other hand, if the answer to the question of the step S321 is negative (NO), it is determined at a step S330 whether or not the POSI value detected by the shift position sensor 21 is equal to 0. If the answer to the question is affirmative (YES), i.e. if the shift lever is in the no-position state, the program proceeds to the steps S322 et seq., whereas if the answer to the question of the step S330 is negative (NO), it is determined at a step S331 whether or not the POSI value is equal to 2, 3 or 4, i.e. whether or not the shift position is "R", "1", or "2" (i.e. in any of predetermined low-speed shift positions).

If the answer to the question of the step S331 is affirmative (YES), i.e. if the shift position is any one of "R", "1" and "2", the count of the lock mode cancellation timer TMLOCK is reset to "0" at a step S332. Then, it is determined at a step S333 whether or not the engine rotational speed NE is higher than a predetermined rotational speed #LOCKNEL/H (e.g. 300/500 rpm) with a hysteresis. If the answer to the question is negative (NO), i.e. if NE≦#LOCKNEL/H holds, it is judged that the engine 3 is substantially in stoppage, and the steps S323 et seq. are carried out without executing the lock mode, followed by terminating the program.

If the answer to the question of the step S333 is affirmative (YES), i.e. if NE>#LOCKNEL/H holds, it is determined at a step S334 whether or not the lock mode flag F_LOCKT assumes "1". When the present loop is executed without satisfying lock mode-executing conditions, the flag F_LOCKT is set to "0" at the step S326, and hence the answer to the question of the step S334 is negative (NO). Consequently, the program proceeds to a step S335, wherein it is determined whether or not the four filtered wheel speeds FVW1 to FVW4 are all equal to or lower than a predetermined speed #FVWREF (e.g. 5 km/h) indicative of a predetermined low-speed condition of the vehicle 2. The filtered wheel speeds FVW1 to FVW4 are obtained by subjecting the wheel speeds VW1 to VW4 detected by respective vehicle speed sensors 25 to a predetermined filtering process. If the answer to the question of the step S335 is negative (NO), i.e. if at least one of the filtered wheel speeds FVW1 to FVW4 is above the predetermined speed #FVWREF, which means that the vehicle 2 is normally running, it is judged that the lock mode is not required, and the program proceeds to the steps S323 et seq. without executing the lock mode, followed by terminating the program.

If the answer to the question of the step S335 is affirmative (YES), i.e. if the four filtered wheel speeds FVW1 to FVW4 are all equal to or lower than the predetermined speed #FVWREF, it is judged that the lock mode-executing conditions concerning the vehicle 2 have been satisfied, and it is determined at steps S336 et seq. in FIG. 39 whether or not the lock mode-executing conditions concerning the lock switch 26 are satisfied. This part of the present process is carried out so as to determine whether the lock switch signal LOCKSW from the lock switch 26 is for executing the lock mode or canceling the same, since the lock switch 26 is formed by a momentary switch as described hereinbefore, as well as to prevent the switching operation from causing chattering in the lock mode control.

First, it is determined at the step S336 whether or not the lock mode-setting switching condition satisfaction flag F_LOCKM1 assumes "1". When the present loop is executed before the lock mode-executing conditions are satisfied, the flag F_LOCKM1 is set to "0" at the step S324, and hence the answer to the question of the step S336 is negative (NO), so that the program proceeds to a step S337, wherein it is determined whether or not the lock switch flag F_LOCKSW assumes "1". If the answer to the question is negative (NO), which means that the lock switch 26 is not being depressed, it is determined at a step S338 whether or not the count of the lock counter CNT_LOCK for use in preventing chattering is equal to or larger than 4. If the answer to the question is negative (NO), the count of the lock counter CNT_LOCK is incremented by 1 at a step S339.

On the other hand, if the answer to the question of the step S338 is affirmative (YES), i.e. if CNT_LOCK≧4 holds, which means that satisfaction of the lock mode-executing conditions of the vehicle 2 is confirmed more than three consecutive times, it is judged that conditions for receiving a lock switch signal LOCKSW for executing the lock mode are satisfied, and the count of the lock counter CNT_LOCK is reset to "0" at a step S340, and at the following step S341, the lock mode-setting switching condition satisfaction flag F_LOCKM1 is set to "1".

If the answer to the question of the step S337 is affirmative (YES), which means that the lock switch is depressed before satisfaction of the conditions for receiving the lock switch signal LOCKSW for executing the lock mode, the lock switch signal LOCKSW is ignored, and the count of the lock counter CNT_LOCK is reset to "0" at a step S342. After execution of the step S342, S339 or S341, the steps S325 et seq. are carried out, followed by terminating the program.

After execution of the step S341, i.e. after the conditions for receiving the lock switch signal LOCKSW for executing the lock mode are satisfied, the answer to the question of the step S336 is affirmative (YES), so that the program proceeds to a step S343, wherein it is determined again whether or not the lock switch flag F_LOCKSW assumes "1". If the answer to the question is negative (NO), i.e. if the lock switch 26 is not being depressed, the program proceeds to the steps S325 et seq., whereas if the answer to the question is affirmative (YES), i.e. if the lock switch 26 is being depressed, it is determined again at a step S344 whether or not the count of the lock counter CNT_LOCK is equal to or larger than 4. If the answer to the question of the step S344 is negative (NO), the count of the lock counter CNT LOCK is incremented by 1 at a step S345, and then the program proceeds to the steps S325 et seq.

On the other hand, if the answer to the question of the step S344 is affirmative (YES), i.e. if CNT_LOCK≧4 holds, which means that the input of the lock switch signal LOCKSW is confirmed more than three consecutive times, it is judged that the lock mode-executing conditions are finally satisfied, and the count of the lock counter CNT_LOCK is reset to "0" at a step S346. Further, at a step S347, the lock mode-setting switching condition satisfaction flag F_LOCKM1 is set to "0", and then at steps S348 and S349, the lock mode-canceling switching condition satisfaction flag F_LOCKM2 and the lock mode flag F_LOCKT are set to "1", respectively. Then, at a step S350, the lock-mode transmitted torque LOCKD is calculated, and the lock mode is executed, as described in detail hereinafter. When the lock mode is started, the lock lamp is lit to notify the driver of the lock mode of the driving force control.

Figure 40:
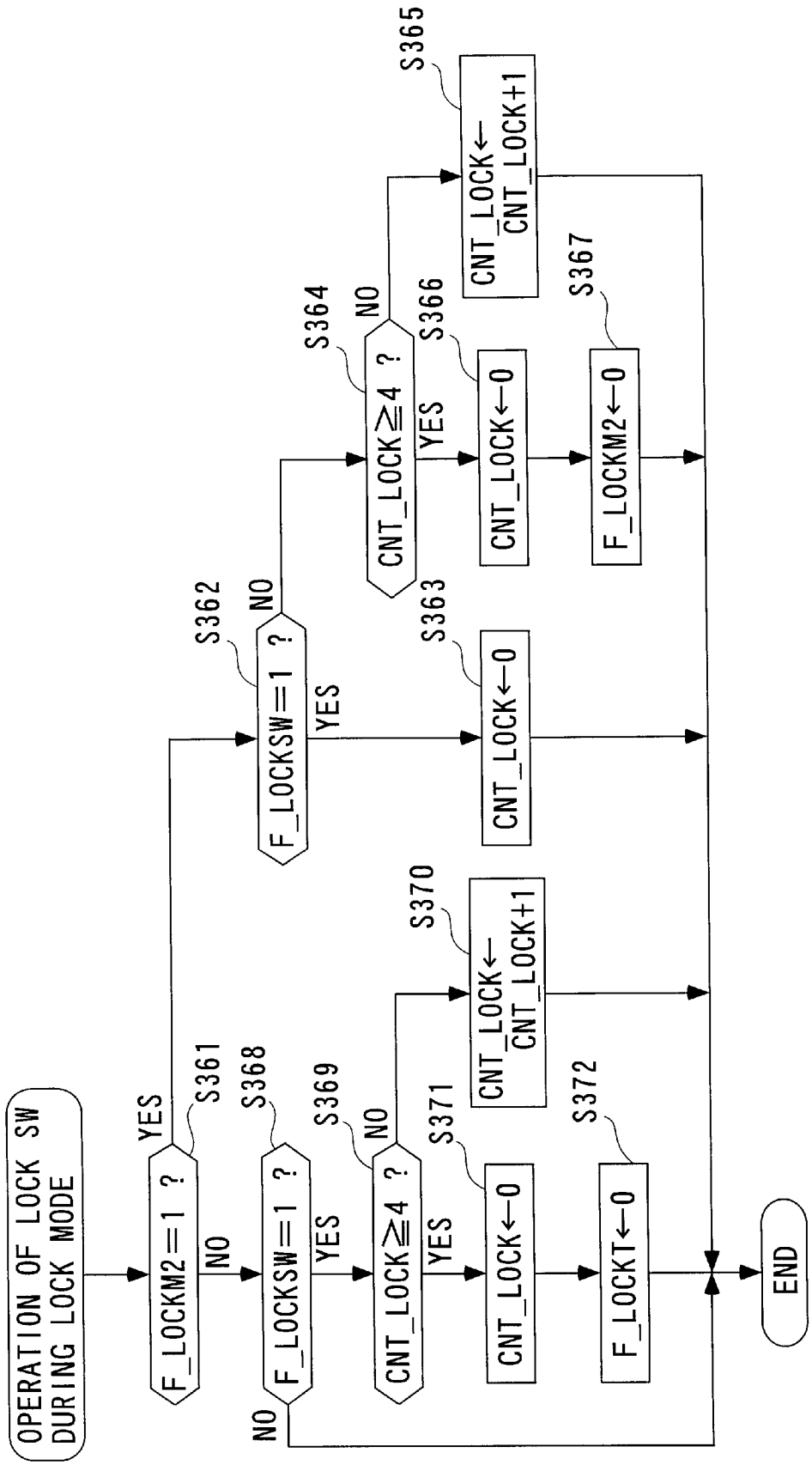
FIG. 40 is a flowchart showing a subroutine for carrying out processing in response to operation of a lock switch during a lock mode.

After the lock mode is started as described above, as long as the aforementioned conditions concerning the shift position POSI, the engine rotational speed NE, and so forth are maintained, the program passes through the step S334, with the answer to the question of this step being affirmative (YES), so that the program proceeds to a step S351, wherein processing in response to operation of the lock switch during the lock mode is carried out. FIG. 40 shows a subroutine for carrying out this processing, in which, first, it is determined at a step S361 whether or not the lock mode-canceling switching condition satisfaction flag F_LOCKM2 assumes "1". Immediately after the lock mode is started, the answer to the question is affirmative (YES), so that the program proceeds to a step S362, wherein it is determined whether or not the lock switch flag F_LOCKSW assumes "1". If the answer to the question is affirmative (YES), it is judged that the lock switch 26 is held in the depressed state after the vehicle 2 enters the lock mode, and the count of the lock counter CNT_LOCK is reset to "0" at a step S363, followed by terminating this program (subroutine).

If the answer to the question of the step S362 is negative (NO), i.e. if the lock switch 26 ceases to be operated or depressed after entering the lock mode, similarly to the steps S338 and S339, it is determined at a step S364 whether or not the count of the lock counter CNT_LOCK is equal to or larger than 4, and if the answer to the question is negative (NO), the count of the lock counter CNT_LOCK is incremented by 1 at a step S365, followed by terminating the program. On the other hand, if the answer to the question of the step S364 is affirmative (YES), i.e. if the termination of operation of the lock switch 26 is confirmed more than three consecutive times, it is judged that conditions for receiving the lock switch signal LOCKSW for cancellation of the lock mode are satisfied, so that the count of the lock counter CNT_LOCK is reset to "0" at a step S366, and at the same time the lock mode-canceling switching condition satisfaction flag F_LOCKM2 is set to "0" at a step S367, followed by terminating the program.

After execution of the step S367, the answer to the question of the step S361 is negative (NO), so that the program proceeds to a step S368, wherein it is determined again whether or not the lock switch flag F_LOCKSW assumes "1". If the answer to the question is negative (NO), i.e. if the lock switch 26 is not being operated during the lock mode, the program is terminated immediately. On the other hand, if the answer to the question of the step S368 is affirmative (YES), i.e. if the lock switch 26 is being depressed during the lock mode, it is determined again at a step S369 whether or not the count of the lock counter CNT_LOCK is equal to or larger than 4. If the answer to the question is negative (NO), the count of the lock counter CNT_LOCK is incremented by 1 at a step S370, whereas if the answer to the question is affirmative (YES), i.e. if the input of the lock switch signal LOCKSW is confirmed more than three consecutive times, it is judged that the lock mode should be cancelled, so that the count of the lock counter CNT_LOCK is reset to "0" at a step S371, and at the same time the lock mode flag F_LOCK is set to "0" at a step S372, followed by terminating the program. Thus, the lock mode is cancelled.

Figure 41:
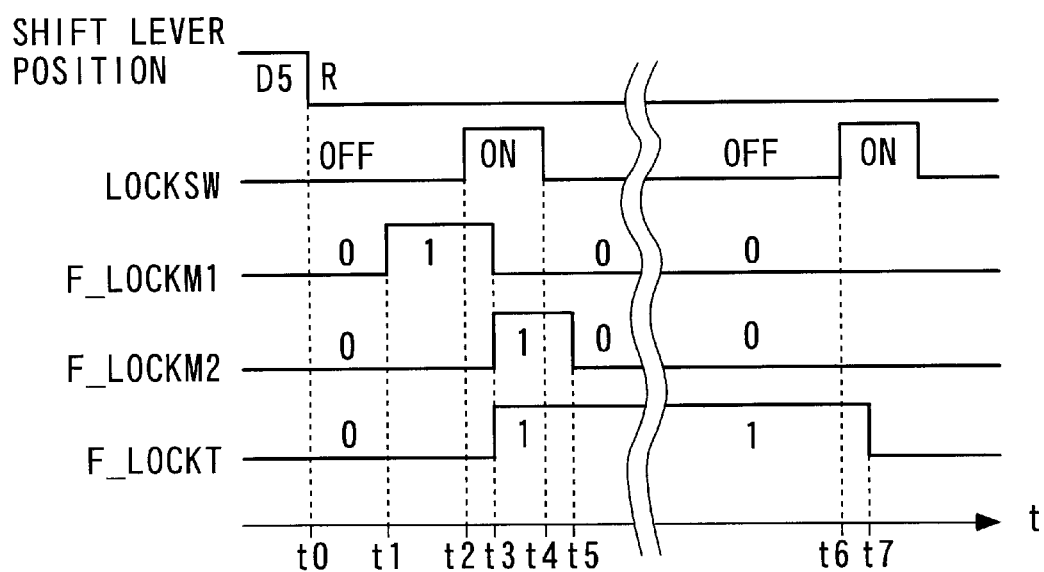
FIG. 41 is a timing chart showing the relationship between the operating state of the lock switch and execution/cancellation of the lock mode.

FIG. 41 shows an example of the relationship between the operating state of the lock switch 26 and the execution/cancellation of the lock mode. Assuming that the shift position is switched at a time t0 from "D5" to "R" and from this time on, the lock mode-executing conditions of the vehicle 2 are satisfied, first, the execution of the step S341 in FIG. 39 sets the lock mode-setting switching condition satisfaction flag F_LOCKM1 to "1" (time t1), and a lock mode execution-permitting state starts. When the lock switch 26 is depressed in this state (time t2), the answer to the question of the step S343 becomes affirmative (YES), and after the lapse of the counting time set to the lock counter CNT_LOCK (t3), the steps S347 to S349 are executed, whereby the flag F_LOCKM1 is set to "0", and the lock mode-canceling switching condition satisfaction flag F_LOCKM2 and the lock mode flag F-LOCKT are each set to "1", whereby the lock mode is started.

Thereafter, when the operation of the lock switch 26 is terminated (time t4), after the lapse of the counting time set to the lock counter CNT_LOCK (t5), the step S367 in FIG. 40 is executed, whereby the flag F_LOCKM2 is set to "0" again, and a lock mode cancellation-permitting state starts. When the lock switch 26 is depressed again in this state (time t6), the answer to the step S368 becomes affirmative (YES). Then, after the lapse of the counting time set to the lock counter CNT_LOCK (t7), the step S372 is executed, whereby the lock mode flag F_LOCK is set to "0", and the lock mode is cancelled. The lock mode control carried out as above makes it possible to execute (set) or cancel the lock mode properly in response to the lock switch signal LOCKSW from the lock switch 26 formed by a momentary switch. Further, the use of the lock counter CNT_LOCK makes it possible to avoid chattering of the lock mode control.

Referring again to FIG. 38, if the answer to the question of the step S331 is negative (NO), i.e. if the shift position is set to any of "D5", "D4", "3", "N" and "P", it is determined at a step S352 whether or not the lock mode flag F_LOCK assumes "1". If the answer to the question is negative (NO), i.e. if the lock mode is not being executed, the steps S322 et seq. are executed, followed by terminating the program. As described above, when the shift position is any of "D5", "D4", "3", "N" and "P", basically, the lock mode is not set irrespective of the operating state of the lock switch 26. The reason for this is that the driver generally operates the shift lever to select one of "R", "1", and "2" e.g. for extrication of the vehicle from its stuck condition, which requires large rear wheel-driving forces obtained by executing the lock mode. Thus, the lock mode control described hereinabove makes it possible to avoid unnecessarily executing the lock mode.

On the other hand, if the answer to the question of the step S352 is affirmative (YES), which means that the shift lever has been shifted to a shift position other than "R", "1", and "2" during the lock mode, it is determined at a step S353 whether or not the count of the lock mode cancellation timer TMLOCK is equal to or larger than a predetermined value #TMLOCKAT (e.g. a value equivalent to 3 sec.). If the answer to the question is negative (NO), i.e. if TMLOCK<#TMLOCKAT holds, the count of the timer TMLOCK is incremented at a step S354, followed by the program proceeding to the step S333. On the other hand, if the answer to the question of the step S353 is affirmative (YES), i.e. if TMLOCK≧#TMLOCKAT holds, the program proceeds to the steps S322 et seq., wherein the lock mode is cancelled.

As described above, when the shift lever is shifted to a shift position other than "R", "1", and "2" during the lock mode of the driving force control, the lock mode is automatically cancelled irrespective of the operating state of the lock switch 26. Consequently, it is possible to cancel the lock mode early, thereby shortening duration of the lock mode. Further, since the lock mode is cancelled after the lapse of the time period counted by the lock mode cancellation timer TMLOCK, even when the shift lever is temporarily shifted to a shift position other than "R", "1", and "2" e.g. during a quick operation of the shift lever carried out for extrication of the vehicle from its stuck condition, the lock mode is prevented from being cancelled, which makes it possible to maintain the large rear wheel-driving forces obtained by executing the lock mode. This makes it is possible to make the vehicle unstuck without difficulty.

Figure 42:
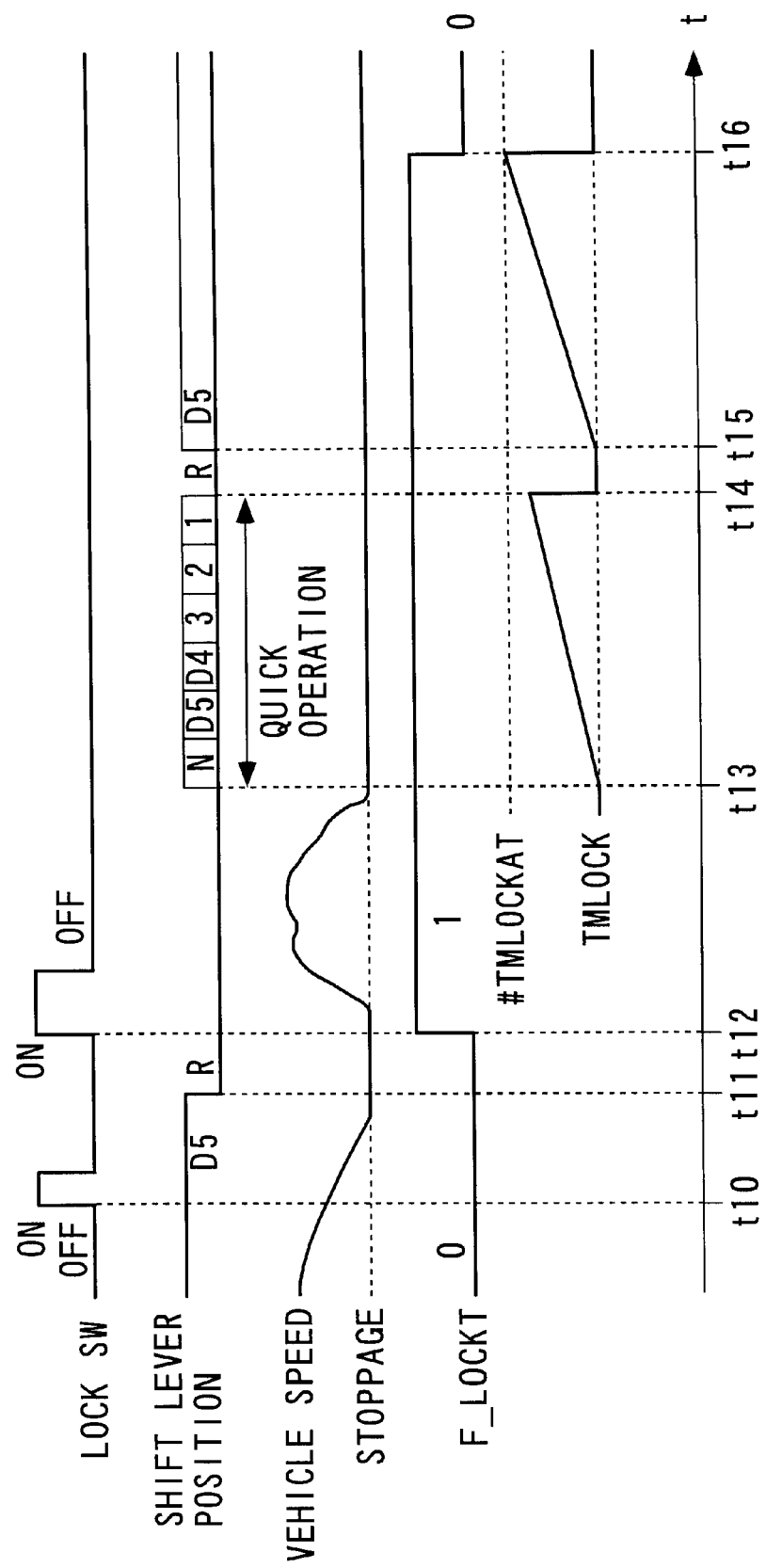
FIG. 42 is a timing chart showing the relationship between operating conditions of the vehicle, the operating state of the lock switch, and the execution/cancellation of the lock mode.

FIG. 42 shows a timing chart illustrating an example of the relationship between the operating conditions of the vehicle 2, the operating state of the lock switch 26, and the execution/cancellation of the lock mode. First, let it be assumed that the vehicle 2 is being decelerated with the shift position set to "D5". In this state, even if the lock switch 26 is depressed (time t10), the answers to the questions of the respective steps S331 and S352 in FIG. 38 are negative (NO), and hence the lock mode is not set. Thereafter, when the lock switch 26 is depressed (time t12) after the vehicle 2 stops and the shift position is set to "R" (time t11), the answer to the question of the step S343 in FIG. 39 becomes affirmative (YES), whereby the lock mode is executed.

Then, the vehicle 2 is started, stopped, and then restarted to get stuck, so the quick operation of the shift lever is carried out in the lock mode (time period t13 to t14). Since the count of the lock mode cancellation timer TMLOCK does not reach the predetermined value #TMLOCKAT during the time period (i.e. the answer to the question of the step S353 in FIG. 38 is negative (NO)), the lock mode is maintained, so that it is possible to make the vehicle unstuck without fail. Further, after completion of the quick operation (time t15), at a time point (time t16) when the count of the lock mode cancellation timer TMLOCK has reached the predetermined value #TMLOCKAT, the answer to the question of the step S353 becomes affirmative (YES), whereby the lock mode is automatically cancelled.

Figure 43:
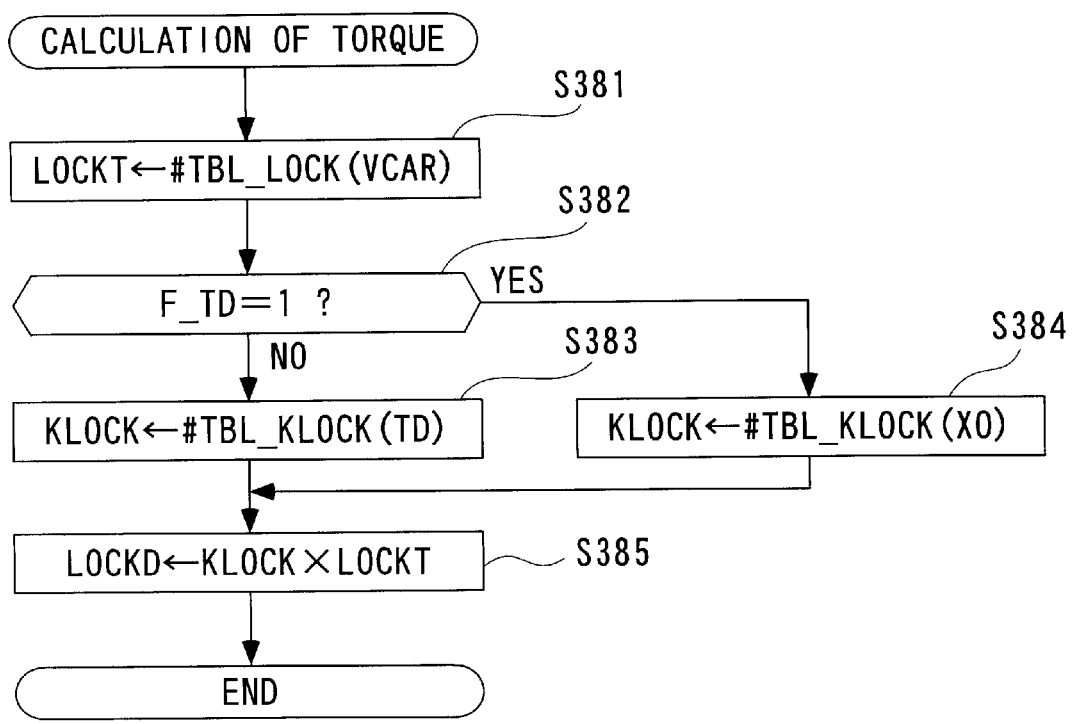
FIG. 43 is a flowchart showing a subroutine for a process for calculating lock-mode transmitted torque.
Figure 44:
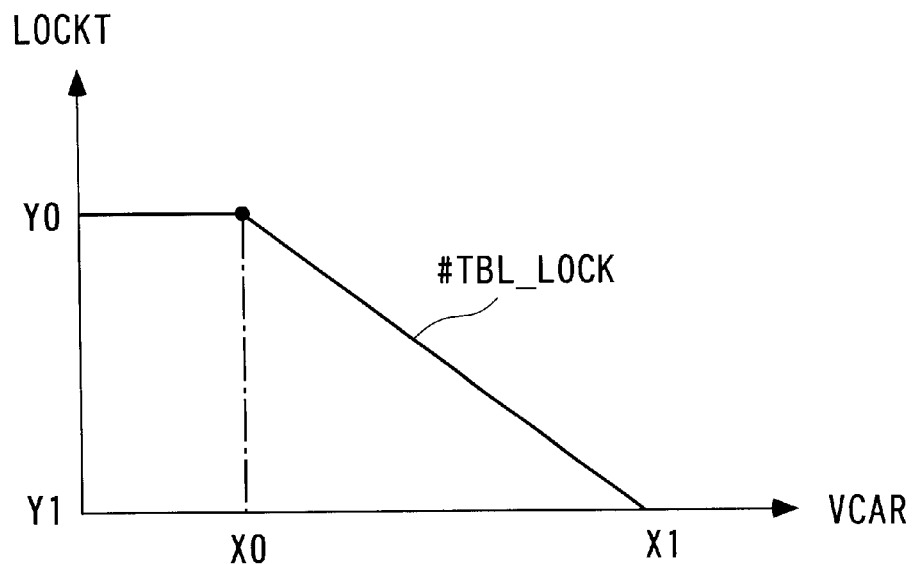
FIG. 44 is a diagram showing an example of a VCAR-LOCKT table.

Next, the process carried out at the step S350 in FIG. 39 for calculating the lock-mode transmitted torque LOCKD will be described with reference to FIG. 43. First, at a step S381, a table value #TBL_LOCK is retrieved from a VCAR-LOCKT table an example of which is shown in FIG. 44, according to a vehicle speed VCAR, and set to the basic value LOCKT of the lock-mode transmitted torque LOCKD. It should be noted that the vehicle speed VCAR is determined from the smaller one of the filtered left and right rear wheel speeds FVW3, FVW4.

In the VCAR-LOCKT table, the table value #TBL_LOCK is set to a predetermined maximum value Y0 (maximum transmitted torque) for a predetermined value X0 (e.g. 10 km/h) of the vehicle speed VCAR and values of the same smaller than X0, and to a predetermined minimum value Y1 (e.g. 0) for a predetermined value X1 (e.g. 30 km/h) of the vehicle speed VCAR and values of the same larger than X1. Further, the VCAR-LOCKT table is configured such that the table value #TBL_LOCK linearly decreases as the vehicle speed VCAR increases from X0 to X1. By thus setting the basic value LOCKT, it is possible to ensure the maximum lock-mode transmitted torque LOCKD when the vehicle speed VCAR is low. Further, since the lock-mode transmitted torque LOCKD is progressively reduced to 0 with an increase in the vehicle speed VCAR, it is possible to operate the electromagnetic clutches 10 efficiently according to the degree of necessity to transmit torque or driving forces to the rear wheels W3, W4.

Figure 45:
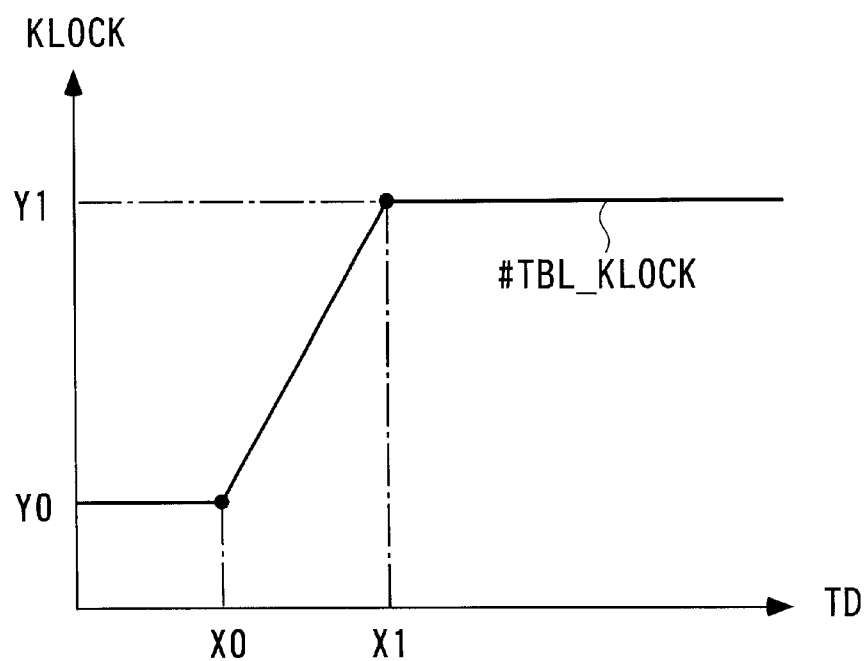
FIG. 45 is a diagram showing an example of a VCAR-KLOCK table.

Next, it is determined at a step S383 whether or not the drive torque flag F_TD assumes "1". If the answer to the question of the step S382 is negative (NO), i.e. if F_TD =0 holds, which means that the vehicle is accelerating, a table value #TBL_KLOCK is retrieved from a TD-KLOCK table an example of which is shown in FIG. 45 according to the drive torque TD, and set to the power-saving coefficient KLOCK. In this table, the table value #TBL_KLOCK is set to a predetermined value Y0 lower than 1.0 for a predetermined value X0 (e.g. 0) and values smaller than X0 of the drive torque TD, and set to a predetermined value Y1 (e.g. 1.0) for a predetermined value X1 and values larger than X1 of the drive torque TD. Further, the TD-KLOCK table is configured such that the table value #TBL_KLOCK linearly increases as the drive torque TD increases from the predetermined value X0 to the predetermined value X1.

On the other hand, if the answer to the question of the step S382 is affirmative (YES), i.e. if F_TD=1 holds, which means that the vehicle is decelerating or in stoppage, a table value #TBL_KLOCK corresponding to the predetermined torque X0 is obtained, and set to the power-saving coefficient KLOCK. More specifically, during the deceleration or stoppage of the vehicle, the power-saving coefficient KLOCK has the predetermined minimum value Y0 set thereto.

Then, the basic value LOCKT obtained at the step S381 is multiplied by the power-saving coefficient KLOCK set at the step S383 or S384 to calculate the lock-mode transmitted torque LOCKD at a step S385, followed by terminating the program.

According to the lock mode control process executed as above, when the vehicle is accelerating and the drive torque TD is equal to or larger than the predetermined torque X1, the power-saving coefficient KLOCK is set to 1.0, whereby the lock-mode transmitted torque LOCKD is set to the maximum transmitted torque (=LOCKT×KLOCK= LOCKT). At this time, the engagement forces of the respective electromagnetic clutches 10 are each controlled to a predetermined maximum engagement force corresponding to the maximum transmitted torque. Further, when the vehicle is accelerating and the drive torque TD is below the predetermined torque X1, the power-saving coefficient KLOCK is set as described above, whereby the lock-mode transmitted torque LOCKD is limited to be smaller than the maximum transmitted torque and set to a smaller value as the drive torque TD is smaller. For instance, when the vehicle is in a traffic-congested traveling condition, with the accelerator pedal being scarcely stepped on, the acceleration is low and the drive torque TD is very small, so that the lock-mode transmitted torque LOCKD is reduced to a large extent. On the other hand, during deceleration of the vehicle, the power-saving coefficient KLOCK is set to the minimum value Y0, whereby the lock-mode transmitted torque LOCKD is also set to the minimum value thereof.

As a result of the lock-mode transmitted torque LOCKD having been set as above, the engagement forces of the respective electromagnetic clutches 10 each controlled based on the lock-mode transmitted torque LOCKD can be limited properly based on the drive torque TD being actually output from the engine 3 to the main drive wheels W1, W2 such that the engagement forces of the clutches are smaller as the actual drive torque TD is smaller. This makes it possible to operate the electromagnetic clutches 10 in the lock mode economically and efficiently, thereby reducing electric power consumption to save much electricity, compared with the prior art in which the engagement forces of the electromagnetic clutches are each held at the predetermined maximum value.

Figure 46:
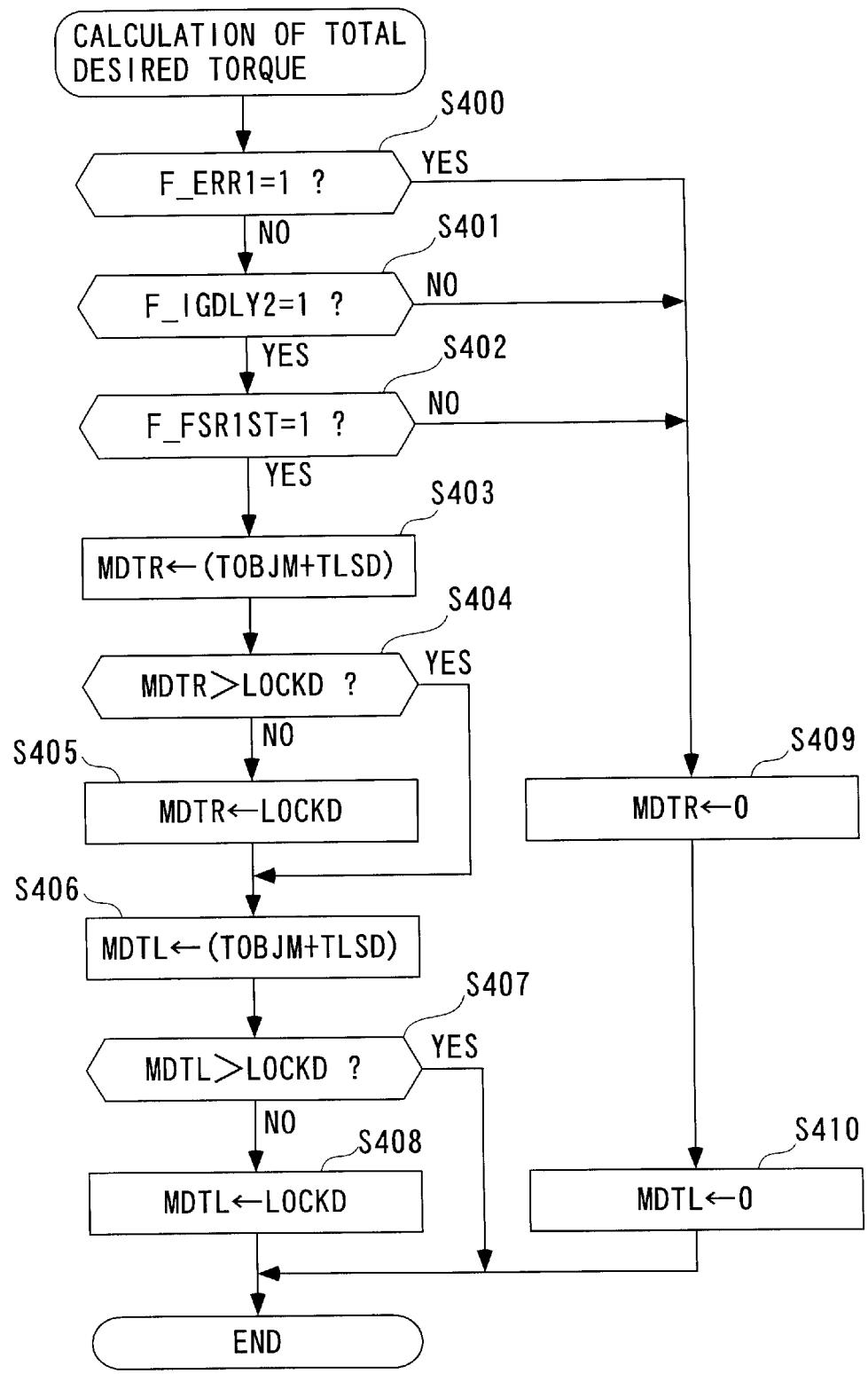
FIG. 46 is a flowchart showing a main routine for carrying out a total desired torque-calculating process which is executed at a step S4 in FIG. 2.

In the following, the total desired torque-calculating process executed at the step S4 in FIG. 2 will be described in detail with reference to FIG. 46. In the process, first, it is determined at steps S400 to S402 whether or not a failure has occurred in the control system.

More specifically, it is determined at the respective steps whether or not the fail flag F_ERR1, the initial flag F_IGDLY2 and a fail-safe power relay flag F_FSRIST are set to "1". The fail-safe power relay flag F_FSRIST is set to "1" when a power relay is in its ON state at a predetermined time point after an ignition switch, not shown, is turned on, and set to "0" when the power relay is in its OFF state.

If the answer to the question of the step S400 is affirmative (YES), or if the answers to the questions of the steps S401 and S402 are negative (NO), it is judged that a failure has occurred in the control system and that conditions for executing the present process have not been satisfied, and the left and right desired transmitted torques MDTL, MDTR are set to "0", at respective steps S409 and S410, followed by terminating the program.

On the other hand, if it is determined at the steps S400 to S402 that no failure has occurred in the control system, it is judged that the conditions for executing the present process have been satisfied, and the program proceeds to a step S403, wherein the right desired transmitted torque MDTR is set to the sum [TOBJ+TLSD] of the semi-final desired VATC torque value TOBJ and the LSD torque TLSD. The sum [TOBJ+TLSD] is obtained as a sum of the final desired VATC torque value TOBJ and the LSD torque TLSD calculated respectively in the VATC control process and the LSD control process of the automatic mode control process, and hence is hereinafter referred to as "the automatic-mode transmitted torque [TOBJ+TLSD]" (automatic-mode engagement force).

Then, the program proceeds to a step S404, wherein it is determined whether or not the right desired transmitted torque MDTR is larger than the lock-mode transmitted torque LOCKD calculated in the lock mode control process. When the lock mode is not being executed, LOCKD=0 holds, so that the answer to the question is affirmative (YES). Therefore, a step S405 is skipped, and the program proceeds to steps S406 et seq.

If the lock-mode transmitted torque LOCKD is larger than the right desired transmitted torque MDTR, during execution of the lock mode, i.e. if the answer to the question of the step S404 is negative (NO), the right desired transmitted torque MDTR is set to the lock-mode transmitted torque LOCKD at the step S405.

On the other hand, even during execution of the lock mode, if the lock-mode transmitted torque LOCKD is smaller than the right desired transmitted torque MDTR, the answer to the question of the step S404 is affirmative (YES), so that the right desired transmitted torque MDTR is set to the automatic-mode transmitted torque [TOBJ+TLSD]. Since the lock mode is normally executed when the maximum transmitted torque is required for extrication of the vehicle from a stuck condition, normally the answer to the question of the step S404 is negative (NO). However, the lock-mode transmitted torque LOCKD is normally limited to a smaller value than the maximum transmitted torque with an increase in the vehicle speed VCAR or with a decrease in the drive torque TD even in the lock mode as described above. In such a case, the answer to the question of the step S404 becomes affirmative (YES).

Then, at the steps S406 to S408, the left desired transmitted torque MDTL is determined similarly to the right desired transmitted torque MDTR detected at the steps S400 to S402, followed by terminating the program. As described above, in the total desired torque-calculating process, during execution of the lock mode, the left and right desired transmitted torques MDTL, MDTR are each set to the lock-mode transmitted torque LOCKD if the lock-mode transmitted torque LOCKD is equal to or larger than the automatic-mode transmitted torque [TOBJ+TLSD], and set to the automatic-mode transmitted torque [TOBJ+TLSD] if the lock-mode transmitted torque LOCKD is smaller than the automatic-mode transmitted torque [TOBJ+TLSD]. Further, the left and right desired transmitted torques MDTL, MDTR are set to an identical value, and drive currents corresponding to the respective left and right desired transmitted torques MDTL, MDTR are supplied to the left and right electromagnetic clutches 10, 10, respectively.

As described above, according to the driving force control system 1 of the present embodiment, the automatic-mode transmitted torque [TOBJ+TLSD] is calculated based on the drive torque TD calculated based on the intake pipe absolute pressure PBA of the engine 3, the engine rotational speed NE, and the like. Further, when the lock mode-executing conditions are satisfied, the lock-mode transmitted torque LOCKD is set to the maximum transmitted torque, and the electromagnetic clutches 10 are each controlled to the predetermined maximum engagement force which can lock the front wheels W1, W2 and the rear wheels W3, W4 to each other. Thus, the locking of the front wheels W1, W2 and the rear wheels W3, W4 can be effected in the lock mode, in a manner complying with the driver's intention as much as possible.

Further, when the vehicle speed VCAR is between the predetermined speeds X0 and X1, the lock-mode transmitted torque LOCKD is limited to a smaller value than the maximum transmitted torque as the vehicle speed VCAR is higher, i.e. as the front wheels W1, W2 are less prone to slip. Also, when the drive torque TD is between the predetermined torques X0 and X1, the lock-mode transmitted torque LOCKD is limited to a smaller value than the maximum transmitted torque as the drive torque TD is smaller, i.e. as there is less necessity of transmitting torques to the rear wheels W3, W4, e.g. during braking or when the vehicle is in a traffic-congested traveling condition, with the accelerator pedal being scarcely stepped on. Thus, time during which the engagement forces of the electromagnetic clutches 10 are held at the maximum can be minimized, which contributes to reduction of electric power consumed in driving the electromagnetic clutches 10, and makes it possible to operate the clutches 10 efficiently. This makes it possible to reduce the sizes of the clutches 10 and the driving system and improve the fuel economy of the engine.

Further, when the automatic-mode transmitted torque [TOBJ+TLSD] is above the lock-mode transmitted torque LOCKD, the left and right desired transmitted torques, i.e. the engagement forces of the electromagnetic clutches 10, 10, are each set to the automatic-mode transmitted torque [TOBJ+TLSD]. Thus, it is possible to transmit or distribute torque actually required by the vehicle 2 to the rear wheels W3, W4 in a manner complying with the driver's intention as much as possible, thereby controlling the engagement forces of the electromagnetic clutches 10 such that they are neither excessive nor short depending on the driving condition of the vehicle.

The present invention is not limited to the above embodiment, but it can be practiced in various forms. For instance, although in the above embodiment, the invention is applied to the driving force control system for a front-wheel drive-based part-time four-wheel drive vehicle, this is not limitative, but it is possible to apply the invention to a driving force control system for a rear-wheel drive-based part-time four-wheel drive vehicle. Further, clutches for controlling torque transmission to the rear wheels W3, W4 are not limited to the electromagnetic clutches 10, 10, but hydraulic clutches or the like capable of functioning as clutches may be employed.

It is further understood by those skilled in the art that the foregoing is a preferred embodiment of the invention, and that various changes and modifications may be made without departing from the spirit and scope thereof

What is claimed is:

1. A driving force control system for a four-wheel drive vehicle including a pair of front wheels, and a pair of rear wheels, one of said pairs being main drive wheels, and another of said pairs being auxiliary drive wheels, the driving force control system controlling engagement forces of clutches to thereby control driving forces distributed to said auxiliary drive wheels, the driving force control system comprising:

automatic-mode engagement force-calculating means for calculating automatic-mode engagement forces of said clutches based on operating conditions of said vehicle;

a lock switch operable by a driver;

lock mode execution means for executing a lock mode in which said engagement forces of said clutches are set to a lock-mode engagement force, including a lockable engagement force which can lock said main drive wheels and said auxiliary drive wheels to each other, when lock mode-executing conditions including operation of said lock switch by said driver are satisfied;

lock-mode engagement force-limiting means for limiting said lock-mode engagement force such that said lock-mode engagement is held below said lockable engagement force in dependence on a traveling condition of said vehicle; and clutch engagement force-selecting means for selecting the calculated automatic-mode engagement forces as said engagement forces of said clutches, when the calculated automatic-mode engagement forces are larger than the limited lock-mode engagement force, during execution of said lock mode.

2. A driving force control system according to claim 1, including means for detecting a vehicle speed of said vehicle, and wherein said lock-mode engagement force-limiting means limits said lock-mode engagement force such that said lock-mode engagement force become smaller as said vehicle speed of said vehicle is higher.

3. A driving force control system according to claim 1, further comprising driving force-calculating means for calculating a driving force of said main drive wheels, and wherein said lock-mode engagement force-limiting means limits said lock-mode engagement force such that said lock-mode engagement force becomes smaller as the calculated driving force of said main drive wheels is smaller.

4. A driving force control system according to claim 2, further comprising driving force-calculating means for calculating a driving force of said main drive wheels, and wherein said lock-mode engagement force-limiting means limits said lock-mode engagement force such that said lock-mode engagement force becomes smaller as the calculated driving force of said main drive wheels is smaller.

* * * * *